(12) United States Patent
Takeda et al.

(10) Patent No.: US 8,337,998 B2
(45) Date of Patent: Dec. 25, 2012

(54) STEEL MATERIAL FOR DISSIMILAR METAL JOINING, JOINED BODY OF DISSIMILAR METALS AND PROCESS FOR JOINING DISSIMILAR METAL MATERIALS

(75) Inventors: Mikako Takeda, Kobe (JP); Mamoru Nagao, Kobe (JP); Masao Kinefuchi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/358,705

(22) Filed: Jan. 26, 2012

(65) Prior Publication Data

US 2012/0121931 A1      May 17, 2012

Related U.S. Application Data

(62) Division of application No. 12/997,801, filed as application No. PCT/JP2009/058160 on Apr. 24, 2009, now Pat. No. 8,221,899.

(30) Foreign Application Priority Data

Jun. 13, 2008 (JP) ................................. 2008-155656
Jun. 13, 2008 (JP) ................................. 2008-155657
Jun. 13, 2008 (JP) ................................. 2008-155658

(51) Int. Cl.
*B32B 15/18*    (2006.01)
*C22C 38/02*    (2006.01)
*C22C 38/04*    (2006.01)
*B23K 20/12*    (2006.01)
*B23K 11/11*    (2006.01)

(52) U.S. Cl. ................ 428/653; 428/629; 428/472.2; 228/112.1; 228/262.41; 219/91.2

(58) Field of Classification Search ............ None
See application file for complete search history.

(56) References Cited

U.S. PATENT DOCUMENTS 6,342,310 B2 *    1/2002    Hashimoto et al. ........... 428/659
(Continued)

FOREIGN PATENT DOCUMENTS

EP            1 728 578            12/2006
(Continued)

OTHER PUBLICATIONS

International Search Report issued Aug. 4, 2009 in PCT/JP09/58160 filed Apr. 24, 2009.

(Continued)

*Primary Examiner* — John J Zimmerman
(74) *Attorney, Agent, or Firm* — Oblon, Spivak, McClelland, Maier & Neustadt, L.L.P.

(57) ABSTRACT

A joined body of dissimilar metals which is produced by joining a steel material and an aluminum alloy material, wherein the steel material to be joined has a specific composition and is specified in the compositions of outer surface oxide layer and inner oxide layer and the aluminum alloy material to be joined is an Al—Mg-base or Al—Zn—Mg-base aluminum alloy having a specific composition. In the joined body of dissimilar metals, a content of Fe at a joint interface on the aluminum alloy material side is regulated, and a reaction layer of Fe and Al is formed at the joint interface of the joined body of dissimilar metals. The joined body of dissimilar metals exhibits high joint strength.

13 Claims, 1 Drawing Sheet

U.S. PATENT DOCUMENTS

| | | | |
|---|---|---|---|
| 6,699,590 B2 * | 3/2004 | Takeda et al. | 428/629 |
| 7,521,129 B2 * | 4/2009 | Takeda et al. | 428/653 |
| 2005/0139293 A1 * | 6/2005 | Nomura et al. | 148/320 |
| 2006/0124907 A1 * | 6/2006 | Takada et al. | 252/500 |
| 2006/0275623 A1 | 12/2006 | Takeda et al. | |
| 2007/0212565 A1 | 9/2007 | Urushihara et al. | |
| 2009/0011269 A1 | 1/2009 | Urushihara et al. | |
| 2009/0053096 A1 * | 2/2009 | Miura et al. | 420/103 |

FOREIGN PATENT DOCUMENTS

| | | |
|---|---|---|
| EP | 1987904 A1 | 11/2008 |
| JP | 2002 294487 | 10/2002 |
| JP | 2006 167801 | 6/2006 |
| JP | 2006 289452 | 10/2006 |
| JP | 2006 336070 | 12/2006 |
| JP | 2007 144473 | 6/2007 |
| JP | 2007 260777 | 10/2007 |
| JP | 2007 283313 | 11/2007 |
| KR | 10-0785557 | 12/2006 |
| KR | 10-2008-0089501 | 10/2008 |
| WO | 2007 097378 | 8/2007 |

OTHER PUBLICATIONS

Metals Handbok Deskl Edotopm. "Aluminum and Aluminum Alloys, Chemical Compositions and International Designations", $2^{nd}$ Edition, ed. J.R. Davis, ASM International (1998), pp. 426-430.

* cited by examiner

STEEL MATERIAL FOR DISSIMILAR METAL JOINING, JOINED BODY OF DISSIMILAR METALS AND PROCESS FOR JOINING DISSIMILAR METAL MATERIALS

CROSS REFERENCE TO RELATED APPLICATIONS

The present application is a divisional of U.S. patent application Ser. No. 12/997,801, filed on Dec. 13, 2010, now U.S. Pat. No. 8,221,899, which is a 35 U.S.C. §371 National Stage patent application of International patent application PCT/JP2009/058160, filed on Apr. 24, 2009, which claims priority to Japanese patent applications JP 2008-155656, filed on Jun. 13, 2008, JP 2008-155657, filed on Jun. 13, 2008, and JP 2008-155658, filed on Jun. 13, 2008.

TECHNICAL FIELD

The present invention relates to a steel material for dissimilar metal joining (dissimilar joint) with an aluminum alloy material, a joined body of dissimilar metals in which a steel material and an aluminum alloy material are welding-joined, or a joined body of dissimilar metals in which a steel material and an aluminum material are jointed, and a process for joining dissimilar metal materials.

BACKGROUND ART

In recent years, for an earth environmental problem due to an exhaust gas etc., improvement in fuel consumption due to weight saving of a vehicle body of a transport machine such as an automobile has been pursued. In addition, enhancement of safety at vehicle body collision of an automobile without inhibiting this weight saving as much as possible has been also pursued. For this reason, particularly, for a vehicle body structure of an automobile, application of an aluminum alloy material which is lighter and is also excellent in energy absorbability, in place of a steel material which has previously been used, is increasing. The aluminum alloy material referred herein is a generic name of a rolled plate material, an extruded material, and a forged material of an aluminum alloy.

For example, use of aluminum alloy plates such as Al—Mg—Si-base AA to JIS 6000 series (hereinafter, simply referred to as 6000 series) and Al—Mg-base AA to JIS 5000 series (hereinafter, simply referred to as 5000 series) is studied for panels such as an outer panel (outer plate) and an inner panel (inner plate) of panel structures such as a hood, a fender, a door, a roof, and a trunk lid of an automobile.

In addition, as an energy absorbing member or a reinforcing material such as a bumper reinforcing material (also referred to as bumper reinforcement, or bumper armature) or a door reinforcing material (also referred to as door guard bar, or door beam), for securing safety of vehicle body collision of an automobile, aluminum alloy extruded materials such as Al—Zn—Mg-base AA to JIS 7000 series (hereinafter, simply referred to as 7000 series) and the 6000 series alloy are used. Further, an aluminum alloy forged material of the 6000 series alloy is used in an underbody part of an automobile such as a suspension arm.

These aluminum alloy materials are necessarily used by joining with a steel material (steel member) such as a steel plate and a mold steel which are originally used widely, in a vehicle body of a normal automobile, unless a vehicle body is an all-aluminum automobile vehicle body. Therefore, when an aluminum alloy material is used in a vehicle body of an automobile (member in a combination of a steel material and an aluminum alloy material), it necessarily requires dissimilar joint of Fe—Al (joining between different kinds of metal members of iron-aluminum).

However, as a problem when this Fe—Al dissimilar joint is performed by welding, there is generation of an intermetallic compound layer (hereinafter, also referred to as reaction layer) between Fe and Al, which is high hardness and very brittle, at a mutual joint interface. For this reason, although apparently mutually joined, sufficient joining strength is not obtained in many cases, in a joined body of dissimilar metals, by welding of Fe—Al dissimilar joint, due to a cause of generation of the intermetallic compound layer.

Reflecting such a situation, previously, for joining of these joined bodies of dissimilar metals (joined body of different kinds of metal members), not only welding, but also joining using such as a bolt and a rivet jointly, or an adhesive in combination are performed, but there is a problem such as a troublesome joining operation and an increase in the joining cost.

Then, previously, regarding a method of welding of Fe—Al dissimilar joint, joining by efficient spot welding, which is widely used in joining of a vehicle body of a normal automobile, has been studied. For example, a method of inserting an aluminum-clad steel between an aluminum material and a steel material has been proposed. In addition, a method of plating or inserting a metal having a low melting point on the steel material side has been proposed. Further, a method of holding insulating particles between an aluminum material and a steel material, and a method of making irregularities on a member in advance have also been proposed. Further, a method of forming a uniform oxidized membrane by heating in the atmosphere after removal of an ununiform oxidized membrane of an aluminum material, and performing spot welding using two layers of a multiple-layered steel plate of aluminum-steel, in a state where the contact resistance of an aluminum surface is enhanced, has also been proposed.

Meanwhile, it is known that also on the steel material side, when an element easily forming an oxide such as Si, Mn and Al is added in order to enhance the strength of a steel plate, an oxide containing these Si, Mn and Al is generated on a surface of a base material. It is also known that an oxide containing these Si, Mn and Al inhibits adherability between a surface coating such as zinc plating and a steel plate. Further, on the other hand, it is also known that, when a thickness of an oxide film containing Si, Mn and Al is made to be in a range of 0.05 to 1 μm by subjecting a steel plate to pickle, adherability between a surface coating such as zinc plating and a steel plate, and spot weldability between steel plates are improved (see Patent Document 1).

However, according to these previous techniques, sufficient joining strength is not obtained in a joined body of dissimilar metals of welding-joined Fe—Al, under the joining conditions of efficient spot welding which is widely used in joining a vehicle body of a normal automobile. In other words, the spot welding condition for obtaining joining strength necessarily becomes troublesome, and this is not practical.

To the contrary, particularly, various techniques intending spot welding of a joined body of dissimilar metals, which is produced by joining a 6000 series aluminum alloy material that is widely used for an automobile vehicle body and a high-strength steel plate that has a tensile strength of 450 MPa or more, have been proposed.

For example, in Patent Documents 2 and 3, spot welding of a steel material and an aluminum alloy material having a limited plate thickness of 3 mm or less, in a form of laminating two or more steel materials, or in a form of holding a steel material between aluminum alloy materials has been proposed. In Patent Document 4, improvement in joining strength by defining a nugget area at a spot welding part or a thickness of a boundary reaction layer has been proposed. In addition, in Patent Documents 5 and 6, improvement in joining strength by defining a composition, thickness and area of each generated compound in detail, respectively, on the steel material side and the aluminum alloy material side at a welding interface has been proposed.

Further, in Patent Document 7, obtaining of high joining strength of a joined body of dissimilar metals, under the appropriate spot welding condition, by once removing the existing oxide layer on a steel plate surface, converting a newly generated outer oxide layer into an oxide having a Mn and Si composition at a specific ratio and, further, defining a ratio of occupation of an inner oxide containing Mn and Si at a total amount of 1 at % or more, which is present in a steel region at a depth from a steel body surface of this steel material to 10 μm or less, in a high-strength steel plate having a specific composition has been proposed. In this Patent Document 7, diffusion of Fe and Al at spot welding is suppressed by a newly generated outer oxide layer containing Si and Mn and an inner oxide layer directly beneath the steel body surface, thereby, excess generation of an Al—Fe-base brittle intermetallic compound layer at a joining interface is suppressed. Incidentally, in Patent Document 7, a welding procedure is not limited, joining of dissimilar metals by spot welding in Example 1, laser welding in Example 2, and MIG welding in Example 3 is performed, respectively, and thereby, a joint body of dissimilar metals is manufactured.

Patent Document 1: JP-A No. 2002-294487 gazette
Patent Document 2: JP-A No. 2007-144473 gazette
Patent Document 3: JP-A No. 2007-283313 gazette
Patent Document 4: JP-A No. 2006-167801 gazette
Patent Document 5: JP-A No. 2006-289452 gazette
Patent Document 6: JP-A No. 2007-260777 gazette
Patent Document 7: JP-A No. 2006-336070 gazette

DISCLOSURE OF THE INVENTION

Problems to be Solved by the Invention

These Patent Documents 2 to 7, commonly, intend spot welding of a joined body of dissimilar metals which is produced by joining an aluminum alloy material and a high-strength steel plate, and are for the purpose of being small in restriction such as application condition and being excellent in broad utility, and improving joining strength by suppressing generation of a brittle intermetallic compound at a joining part.

However, even in these Patent Documents 2 to 7, regarding spot welding of a joined body of dissimilar metals which is produced by joining an aluminum alloy material and a high-strength steel metal, there is still a room of improvement in regard to improvement in joining strength. Particularly, Patent Document 7 is advantageous in that diffusion of Fe and Al at spot welding is suppressed by an outer oxide layer containing Si and Mn newly generated on a steel material surface, and an inner oxide layer directly beneath a body surface of a steel material, thereby, excess generation of an Al—Fe-base brittle intermetallic compound layer at a joining interface is suppressed. However, the joined body of dissimilar metals has a peeling strength measured by a cross tensile test piece of less than 2 kN at highest, and there is still a room of improvement in order to obtain a joining strength of 2 kN or more.

The present invention has been made in view of such problems, and an object thereof is to provide a steel material for dissimilar metal joining, a joined body of dissimilar metals and a process for joining dissimilar metal materials, which are small in restriction such as application condition of spot welding, have excellent broad utility and, at the same time, have no inhibition of reliability in joining due to generation of a brittle intermetallic compound at a joining part, and have a joined part having high joining strength.

Solutions to the Problems

First Solving Means (Gist of Steel Material for Dissimilar Metal Joining)

A gist of the steel material for dissimilar metal joining of the present invention for attaining the object is a steel material for dissimilar metal joining with a 6000 series aluminum alloy material, wherein a composition of the steel material contains C: 0.01 to 0.30%, Si: 0.1 to 3.00%, and Mn: 0.1 to 3.00% as expressed by mass %, respectively, and P is regulated at 0.10% or less (including 0%), S is regulated at 0.05% or less (including 0%), and N is regulated at 300 ppm or less (including 0%), respectively, a ratio of an oxide present in a grain boundary and an oxide present in grains containing Mn and Si at a total amount of 1 at % or more, as oxides present in a steel region at a depth from a steel body surface of the steel material to 20 μm, is 5% or more and less than 20% as an average area ratio occupied in the steel region, and a ratio occupied by an outer oxide containing Mn and Si at a total amount of 1 at % or more, which is present on the steel material surface, is 0.1% or more and less than 50% as an average ratio of a total length of the oxide occupied for a length of 1 μm in a substantially horizontal direction of an interface between a steel body and an outer oxide layer.

(Gist of Joined Body of Dissimilar Metals)

A gist of the joined body of dissimilar metals of the present invention for attaining the object is a joined body of dissimilar metals which is produced by joining the steel material and the aluminum alloy material as defined in the above gist, wherein the aluminum alloy material includes a 6000 series aluminum alloy containing Mg: 0.1 to 3.0%, Si: 0.1 to 2.5%, and Cu: 0.001 to 1.0% as expressed by mass %, respectively, a content of Fe at a joint interface on a side of the aluminum alloy material of the joined body of dissimilar metals is 2.0% by mass or less, and a reaction layer of Fe and Al is formed at the joint interface.

(Gist of Process for Joining Dissimilar Metal Materials)

In addition, the gist of the process for joining dissimilar metal materials of the present invention for attaining the object is a process for joining dissimilar metal materials between a steel material and an aluminum alloy material, the process being a process for joining dissimilar metal materials which is produced by joining a steel material and an aluminum alloy material which are mutually welded, the process including spot-welding or friction spot-joining the steel material for dissimilar metal joining of the above gist and an aluminum metal material including a 6000 series aluminum alloy containing Mg: 0.1 to 3.0%, Si: 0.1 to 2.5%, and Cu: 0.001 to 1.0%, respectively, as expressed by % by mass.

(Constitution of Outer Oxide Layer)

Herein, the reminder other than the oxide containing Mn and Si at a total amount of 1 at % or more in the outer oxide layer is an oxide in which a content of Mn and Si is less than 1 at as a total amount and voids, and the outer oxide layer in the present invention is constituted by the oxide containing Mn and Si at a total amount of 1 at % or more, the oxide in which a content of Mn and Si is less than 1 at as a total amount, and the voids.

(Preferable Aspect of the Present Invention)

It is preferable that the joined body of dissimilar metals is spot-welded, and as a condition for every spot welding place, an average thickness in a nugget depth direction of the reaction layer of Fe and Al formed at the joint interface between the steel material and the aluminum alloy material is in a range of 0.1 to 3 μm, and a formation range of the reaction layer of Fe and Al is an area of 70% or more of a spot welding area.

It is preferable that the joined body of dissimilar metals has a peeling strength measured by a cross tensile test piece of 2 kN or more.

It is preferable that the joined body of dissimilar metals is for a vehicle body structure of an automobile.

Further, it is preferable that as a condition for every joining place between the steel material and the aluminum alloy material, an interelectrode current of 10 to 35 kA is applied at an interelectrode pressure of 2.0 to 3.0 kN for a time of 200×tmsec or shorter in a relationship with a thickness t mm of an aluminum alloy material part to be welded, thereby, the steel material and the aluminum alloy material are spot-welded.

Second Solving Means (Gist of Steel Material for Dissimilar Metal Joining)

A gist of the steel material of the present invention for attaining the object is a steel material for dissimilar metal joining with a 5000 series or 7000 series aluminum alloy material, wherein a composition of the steel material contains C: 0.01 to 0.30%, Si: 0.1 to 3.00%, and Mn: 0.1 to 3.00% as expressed by mass %, respectively, and P is regulated at 0.10% or less (including 0%), S is regulated at 0.05% or less (including 0%), and N is regulated at 300 ppm (including 0%), respectively, and a ratio occupied by an outer oxide containing Mn and Si at a total amount of 1 at % or more, which is present on the steel material surface, is 80 to 100% as an average ratio of a total length of the oxide occupied for a length of 1 μm in a substantially horizontal direction of an interface between a steel body and an outer oxide layer.

(Gist of Joined Body of Dissimilar Metals)

A gist of the joined body of dissimilar metals of the present invention for attaining the object is a joined body of dissimilar metals which is produced by joining the steel material and the aluminum alloy material as defined in the above gist, wherein the aluminum alloy material includes a 5000 series or 7000 series aluminum alloy containing Mg: 1.0% or more as expressed by mass %, a content of Fe at a joint interface on a side of the aluminum alloy material of the joined body of dissimilar metals is 2.0% by mass or less, and a reaction layer of Fe and Al is formed at the joint interface.

(Gist of Process for Joining Dissimilar Metal Materials)

A gist of the process for joining dissimilar metal materials of the present invention for attaining the object is a process for joining dissimilar metal materials between a steel material and an aluminum alloy material, comprising spot-welding or friction spot-joining (friction stirring-joining) the steel material as defined in the above gist, and an aluminum alloy material including a 5000 series or 7000 series aluminum alloy containing Mg: 1.0% or more as expressed by mass %.

(Constitution of Outer Oxide Layer)

Herein, the reminder other than the oxide containing Mn and Si at a total amount of 1 at % or more in the outer oxide layer in the present invention is an oxide in which a content of Mn and Si is less than 1 at as a total amount and voids, and the outer oxide layer in the present invention is constituted by the oxide containing Mn and Si at a total amount of 1 at % or more, the oxide in which a content of Mn and Si is less than 1 at % as a total amount, and the voids.

(Preferable Aspect of the Present Invention)

It is preferable that the joined body of dissimilar metals is spot-welded, and as a condition for every spot welding place, an average thickness in a nugget depth direction of the reaction layer of Fe and Al formed at the joint interface between the steel material and the aluminum alloy material is in a range of 0.1 to 3 μm, and a formation range of the reaction layer of Fe and Al is an area of 70% or more of a spot welding area.

In addition, it is preferable that the joined body of dissimilar metals has a peeling strength measured by a cross tensile test piece of 2 kN or more.

In addition, it is preferable that the joined body of dissimilar metals is for a vehicle body structure of an automobile.

In addition, as the condition for every spot welding place, it is preferable that an interelectrode current of 10 to 35 kA is applied at an interelectrode pressure of 2.0 to 3.0 kN for a time of 200×tmsec or shorter in a relationship with a thickness tmm of an aluminum alloy material part to be joined.

In addition, as the condition for every joining place between the steel material and the aluminum alloy material, it is preferable that, the steel material and the aluminum alloy material are spot-welded by applying an interelectrode current of 10 to 35 kA at an interelectrode pressure of 2.0 to 3.0 kN for a time of 200×tmsec or shorter in a relationship with a thickness tmm of an aluminum metal material part to be welded.

Third Solving Means (Gist of Joined Body of Dissimilar Metals)

A gist of the joined body of dissimilar metals of the present invention for attaining the object is a joined body of dissimilar metals which is produced by joining a steel material and an aluminum alloy material, wherein the steel material to be joined is a steel material containing C: 0.01 to 0.30%, Si: 0.1 to 3.00%, and Mn: 0.1 to 3.00% as expressed by mass %, respectively, and having regulation of P: 0.10% or less (including 0%), S: 0.05% or less (including 0%), and N: 300 ppm or less (including 0%), respectively, the aluminum alloy material to be joined is a 6000 series aluminum alloy containing Mg: 0.1 to 3.0%, Si: 0.1 to 2.5%, and Cu: 0.001 to 1.0%, respectively, and further containing one or two kinds of Li: 0.01 to 0.5%, and Mn: 0.1 to 0.5%, a content of Fe at a joint interface on a side of the aluminum alloy material of the joined body of dissimilar metals is 2.0% by mass or less, and a reaction layer of Fe and Al is formed at the joint interface of the joined body of dissimilar metals.

(Gist of Process for Joining Dissimilar Metal Materials)

Further, a gist of the process for joining dissimilar metal materials of the present invention for attaining the object is a process for joining dissimilar metal materials between a steel material and an aluminum alloy material, wherein a thickness of a place where both are mutually welded is 3 mm or less, the steel material to be joined is a steel material containing C: 0.01 to 0.30%, Si: 0.1 to 3.00%, and Mn: 0.1 to 3.00% as expressed by mass %, respectively, and having regulation of P: 0.10% or less (including 0%), S: 0.05% or less (including 0%) and N: 300 ppm or less (including 0%), respectively, an outer oxide layer present on the steel material surface is made to have, in advance, a composition in which a ratio occupied by an oxide containing Mn and Si at a total amount of 1 at % or more is 50 to 80%, as an average ratio of a total length of the oxide occupied for a length of 1 μm in a substantially horizontal direction of an interface between a steel body and an outer oxide layer, the aluminum alloy material to be joined is a 6000 series aluminum alloy containing Mg: 0.1 to 3.0%, Si: 0.1 to 2.5%, and Cu: 0.001 to 1.0% as expressed by mass %, respectively, and further containing one or two kinds of Li: 0.001 to 0.5%, and Mn: 0.1 to 0.5%, the steel material and the aluminum alloy material are spot-welded or spot friction stirring-joined so that a content of Fe at a joint interface on a side of the aluminum alloy material of a joined body of dissimilar metals is 2.0% by mass or less, a reaction layer of Fe and Al is formed at the joint interface of the joined body of dissimilar metals, the steel material and the aluminum alloy material are mutually joined, and the joined body of dissimilar metals has a peeling strength measured by a cross tensile test piece of 2 kN or more.

(Constitution of Outer Oxide Layer)

Since the constitution is the same as that of first embodiment, descriptions are not given.

(Preferable Aspect of the Present Invention)

Herein, the joined body of dissimilar metals of the present invention has been spot-welded and, as the condition of every spot welding place, it is preferable that an average thickness in a nugget depth direction of the reaction layer of Fe and Al formed at a joining interface between the steel material and the aluminum alloy material is in a range of 0.1 to 3 μm and, at the same time, a formation range of the reaction layer of Fe and Al is an area of 70% or more of a spot welding joining area.

In addition, it is preferable that the outer oxide layer present on the steel material surface to be joined is a composition such that a ratio of occupation of the oxide containing Mn and Si at a total amount of 1 at % or more is 50 to 80%, as an average ratio of a total length of the oxide occupied for a length of 1 μm in a substantially horizontal direction of an interface between a steel body and an outer oxide layer, in advance before joining.

In addition, it is preferable that a ratio occupied by an oxide present in a grain boundary and an oxide present in grains containing Mn and Si at a total amount of 1 at % or more, which are present in a steel region at a depth from a steel body surface of the steel material to be joined to 10 μm is 3% or more and less than 10% as an average area ratio occupied in the steel region.

In addition, it is preferable that the joined body of dissimilar metals has a peeling strength measured by a cross tensile test piece of 2 kN or more.

In addition, it is preferable that the joined body of dissimilar metals is for a vehicle body structure of an automobile.

In addition, in the process for joining dissimilar metal materials of the present invention, as the condition of the every spot welding place, it is preferable that an interelectrode current of 10 to 35 kA is applied at an interelectrode pressure of 2.0 to 3.0 kN for a time of 200×tmsec or shorter in a relationship with a thickness tmm of an aluminum alloy material part to be joined.

In addition, as the condition of every spot welding place, it is preferable that an average thickness in a nugget depth direction of the reaction layer of Fe and Al formed at a joining interface between the steel material and the aluminum alloy material is made to be in a range of 0.1 to 3 μm and, at the same time, a formation range of the reaction layer of Fe and Al is an area of 70% or more of a spot welding joining area.

In addition, it is preferable that one kind or two kinds of Li: 0.01 to 0.5% and Mn: 0.1 to 0.5% are contained in the aluminum alloy material in advance. In addition, it is preferable that a ratio occupied by an oxide present in a grain boundary and an oxide present in grains containing Mn and Si at a total amount of 1 at % or more, which are present in a steel region at a depth from a steel body surface of the steel material to be joined to 10 μm is 3% or more and less than 10% as an average area ratio occupied in the steel region.

Advantages of the Invention

Effect of the First Solving Means

The present invention is the same as Patent Document 7 in that diffusion of Fe and Al at spot welding is suppressed by both of an outer oxide layer containing Mn and Si on a body surface of a steel material and an inner oxide layer containing Mn and Si directly beneath the body surface of a steel material, thereby, excess generation of an Al—Fe-base brittle intermetallic compound layer at a joining interface is suppressed. However, a point which is greatly different from Patent Document 7 is that a ratio occupied by the outer oxide (layer) containing Mn and Si in the outer oxide layer is made to be smaller than that of Patent Document 7. At the same time, the inner oxide layer containing Mn and Si is present deeper from the steel body surface with a more amount.

Particularly, in spot welding of a joined body of dissimilar metals which is produced by joining a 6000 series aluminum alloy material and a steel material, welding is performed under the condition such that the steel material side dose not melt and only the aluminum alloy material side melts. In the present invention, it has been found out that, in such a case, diffusion of Fe and Al at spot welding greatly depends on a quantitative compositional balance between the outer oxide layer and the inner oxide layer. That is, the proper compositional balance condition between the outer oxide layer and the inner oxide layer is different depending on an alloy composition (kind) of an aluminum alloy material to be joined, and diffusion of Fe and Al at spot welding can be effectively suppressed for the first time by making the balance between the outer oxide layer and the inner oxide layer proper. The effect of suppressing excessive generation of an Al—Fe-base brittle layer (intermetallic compound layer) at a joining interface becomes higher.

To the contrary, in Patent Document 7, although a 6000 series aluminum alloy material is used as Examples, a welding procedure, and a material combination of an aluminum alloy material to be welded and a steel material are not limited. In other words, Patent Document 7, even though the welding procedure, and the material combination of an aluminum alloy material to be welded and a steel material are different, tries to make joining, under the same condition of an outer oxide layer and an inner oxide layer [condition of FIG. (b) described later]. As a result, under the condition of an outer oxide layer and an inner oxide layer defined in Patent Document 7, particularly, in the joined body of dissimilar metals which is produced by joining a 6000 series aluminum alloy material and a steel material through spot welding, the balance between the outer oxide layer and the inner oxide layer becomes bad, as described later. For this reason, in Patent Document 7, as described in Examples, particularly, the joined body of dissimilar metals which is produced by joining a 6000 series aluminum alloy material and a steel material through spot welding necessarily has a peeling strength measured by a cross tensile test piece of as low as less than 2 kN at highest. To the contrary, when the quantitative compositional balance between the outer oxide layer and the inner oxide layer is properly controlled [under the condition of FIG. 1(c) described later], particularly, regarding spot welding of the joined body of dissimilar metals which is produced by joining a 6000 series aluminum alloy material and a steel material, high joining strength of 2 kN or more is obtained.

In addition, also in the present invention, like Patent Document 7, a subject is an outer oxide layer present on a steel body surface of a steel material, which is newly generated by once removing the existing oxide layer on a steel material surface by pickle and, thereafter, further, performing annealing under an atmosphere in which an oxygen partial pressure is controlled.

This point is common with Patent Document 1 in which an oxide film on a steel material surface is once removed by pickle. However, in Patent Document 1, a ratio of formation of the outer oxide layer, and a depth of the inner oxide layer are not controlled positively by further performing annealing under an atmosphere in which an oxygen partial pressure is controlled, like the present invention. For this reason, in the outer oxide layer of Patent Document 1, a ratio occupied by an oxide containing Mn and Si at a total amount of 1 at % or more, defined in the present invention, easily exceeds 80%, as an average ratio of a total length of this oxide occupied for a length of 1 μm in a substantially horizontal direction of an interface between a steel body and an outer oxide layer. As a result, in Patent Document 1, a reaction layer (intermetallic compound layer of Fe and Al) is not sufficiently formed, particularly, in spot welding of the joined body of dissimilar metals which is produced by joining a 6000 series aluminum alloy material and a steel material and, conversely, metallurgic joining in the joined body of dissimilar metals cannot be performed.

Unlike spot welding between steel materials, particularly, in the case of dissimilar joint in which a 6000 series aluminum alloy material and a steel material are spot-welded, welding is performed under the condition such that the steel material side dose not melt, and only the aluminum alloy material side melts. In welding under such a condition, as described above, an intermetallic compound layer of Fe and Al, which is high hardness and very brittle, is formed at a joint interface. For this reason, the welding mechanism is entirely different from that of spot weldability between steel materials, which is an object of Patent Document 1, and welding joining between different kinds of metals becomes remarkably difficult.

More specifically, when dissimilar metals of a steel material and an aluminum material are joined, since the steel material has a higher melting point and higher electric resistance, and has smaller heat conductivity as compared with those of the aluminum material, heat generation on the steel material side becomes greater, and aluminum having a low melting point is first melted. In welding under the condition such that the steel material side dose not melt, and only the aluminum alloy material side melts, such as spot welding between an aluminum alloy material and a steel material, the steel material side dose not melt, and Fe is diffused from this steel material side to form an Al—Fe-base brittle reaction layer at an interface.

For this reason, in order to obtain high joining strength in welding under the condition such that the steel material side dose not melt, and only the aluminum alloy material side melts, it is necessary to suppress formation of the Al—Fe-base reaction layer requisite minimally. However, when an outer oxide layer on the steel material side is not destructed, diffusion of Fe from the steel material side and generation of an Al—Fe-base reaction layer are suppressed excessively, thereby, a formed area of the reaction layer relative to the total area of a joining part is too small, high joining strength is not obtained because metallurgic joining cannot be performed. Therefore, in order to realize the high joining strength, it is necessary to form the Al—Fe reaction layer having a thickness which is requisite minimal for metallurgic joining at a joining part in a wide range as much as possible.

As described above, particularly, in the case of dissimilar joint in which a 6000 series aluminum alloy material and a steel material are spot-welded, the welding mechanism is entirely different from that of spot welding between steel materials, and it becomes remarkably difficult to realize high joining strength between different kinds of metals.

To the contrary, when the newly generated outer oxide layer and inner oxide layer containing Mn and Si are present mutually at a constant ratio after realization of a mutual compositional balance as the aforementioned gists, like the present invention, particularly, in the case of dissimilar joint in which a 6000 series aluminum alloy material and a steel material are spot-welded, the effect of suppressing excessive generation of the reaction layer, and forming an Al—Fe reaction layer having a thickness which is requisite minimal for metallurgic joining, at a joining part in a wide range is exerted. As a result, in the case of welding dissimilar joining under the condition such that the steel material side dose not melt, and only the aluminum alloy material side melts, such as spot welding between a 6000 series aluminum alloy material and a steel material, a high joining strength of 2 kN or more can be realized.

Effect of the Second Solving Means

The present invention is the same as Patent Document 7 in that diffusion of Fe and Al at spot welding is suppressed by an outer oxide layer containing Mn and Si on a body surface of a steel material, thereby, excessive generation of an Al—Fe-base brittle intermetallic compound layer at a joining interface is suppressed. However, a point which is greatly different from Patent Document 7 is that the outer oxide layer of a steel material is made to have such a composition that the layer is destructed with difficulty and, at the same time, the aluminum alloy material side is a 5000 series or 7000 series aluminum alloy which is an alloy species containing Mg at a large amount, as an element having a function of reducing the outer oxide layer present on a steel material surface.

In spot welding of the joined body of dissimilar metals between an aluminum alloy material and a steel material, welding is performed under the condition such that the steel material side dose not melt, and only the aluminum alloy material side melts. In such a case, diffusion of Fe and Al at spot welding greatly depends on a composition of the outer oxide layer. That is, a proper compositional condition of this outer oxide layer is different depending on an alloy composition (kind) of an aluminum alloy material to be joined, and diffusion of Fe and Al at spot welding can be effectively suppressed for the first time by making a combination (compatibility) of a composition of the outer oxide layer and the alloy composition of an aluminum alloy material to be joined proper. The effect of suppressing excessive generation of an Al—Fe-base brittle reaction layer (intermetallic compound layer) at a joining interface becomes higher.

To the contrary, in Patent Document 7, although a 6000 series aluminum alloy material is used as Examples, a welding procedure, and a material combination of an aluminum alloy material to be welded and a steel material are not limited. In other words, Patent Document 7, even though the welding procedure, and the material combination of an aluminum alloy material to be welded and a steel material are different, tries to perform joining under the same condition of an outer oxide layer [condition of FIG. 1(b) described layer]. As a result, under the condition of an outer oxide layer defined in Patent Document 7, particularly, in the case of a joined body of dissimilar metals which is produced by joining a 5000 series and 7000 series aluminum alloy material and a steel material through spot welding, compatibility (combination) of the composition of this outer oxide layer and the alloy composition of the aluminum alloy material to be joined becomes bad, as described later. For this reason, in Patent Document 7, as described in Examples, the joined body of dissimilar metals which is produced by joining even a 6000 series aluminum alloy material and a steel material through spot welding necessarily has a peeling strength measured by a cross tensile test piece of as low as less than 2 kN at highest. To the contrary, when the alloy composition of an aluminum alloy material to be joined, and the composition of the outer oxide layer are controlled properly [under the condition of FIG. 1(c) as described later], regarding spot welding of the joined body of dissimilar metals which is produced by joining an aluminum alloy material and a steel material, high joining strength of 2 kN or more is obtained.

However, depending on various conditions such as the condition of a joined body of dissimilar metals, the condition of manufacturing a steel material, and restriction of a steel material used, the compositional balance between the outer oxide layer and the inner oxide layer on the steel material side cannot be proper [under the condition of FIG. 1(c) described later] in some cases. In addition, the steel material which could be adapted as described above cannot be used in some cases. In the case of actual dissimilar joint including these cases, necessity of joining the steel material side with a composition that is destructed with more difficulty than the outer oxide layer as in Patent Document 7 [condition of FIG. 1(a) described later] occurs. The present invention has been made by presuming such cases.

As described above, an object of the present invention is to obtain high joining strength, even when joining needs to be performed by selecting a steel material having an outer oxide layer with a composition such that the layer is destructed with further more difficulty than the outer oxide layer as in Patent Document 7 [condition of FIG. 1(a) described later]. For this reason, in the present invention, an alloy composition of an aluminum alloy material to be joined is a 5000 series and 7000 series aluminum alloy material containing Mg at a large amount as the element having a function of reducing an outer oxide layer, for the steel material having an outer oxide layer with a composition such that the layer is destructed with difficulty. Thereby, the outer oxide layer of the steel material, which is destructed with difficulty, is destructed by the reducing action of Mg, and diffusion of Fe and Al at spot welding is effectively controlled as necessary and so as not to excessively suppress. As a result, while excessive generation of the Al—Fe-base brittle intermetallic compound layer at a joint interface is suppressed, a requisite minimal Al—Fe-base reaction layer for obtaining high joining strength is secured, and a high joining strength is obtained.

Herein, when dissimilar metals of a steel material and an aluminum material are joined, since the steel material has a higher melting point and higher electric resistance, and smaller heat conductivity as compared with those of the aluminum material, heat generation on the steel side becomes greater, and aluminum having a low melting point is first melted. In welding under the condition such that the steel material side dose not melt, and an only aluminum alloy material side melts, such as spot welding between an aluminum alloy material and a steel material, the steel material side dose not melt, and Fe is diffused from this steel material side to form an Al—Fe-base brittle intermetallic compound layer (reaction layer) at an interface.

For this reason, in order to obtain high joining strength in welding under the condition such that the steel material side dose not melt, and only the aluminum alloy material side melts, it is necessary to suppress generation of the Al—Fe-base reaction layer requisitely minimally. However, when an outer oxide layer on the steel material side is not destructed, diffusion of Fe from the steel material side and generation of the AL-Fe-base reaction layer are suppressed excessively, thereby, a formation area of the reaction layer relative to the total area of a joining part is too small, high joining strength is not obtained since metallurgic joining cannot be performed. Therefore, in order to realize the high joining strength, it is necessary to form the Al—Fe-base reaction layer having a thickness which is requisite minimal for metallurgic joining at a joining part in a wide range as much as possible. As described above, in the case of dissimilar joint of spot-welding an aluminum alloy material and a steel material, a welding mechanism is entirely different from that of spot welding between steel materials, and it becomes remarkably difficult to realize high joining strength between different kinds of metals.

In this respect, when welding joining is performed under the condition such that the steel material side is an outer oxide layer having a composition such that the layer is destructed with further more difficulty than the outer oxide layer as in Patent Document 7 [condition of FIG. 1) described later], the outer oxide layer present on a steel material surface serves excessively as a barrier which is not easily destructed, and it becomes difficult to promote diffusion of Fe from the steel material side, at welding. That is, in such an outer oxide layer, a ratio occupied by an oxide containing Mn and Si at a total amount of 1 at % or more becomes 80% or more as the average ratio, as described in FIG. (a) later. In such a case, when welding joining is performed under the condition such that the steel material side dose not melt, and only the aluminum alloy material side melts, the outer oxide layer serves as a barrier which is not easily destructed, and suppresses generation of the Al—Fe-base reaction layer excessively, and a formation area of the reaction layer relative to the total area of a joining part becomes too small.

The is one of the great reasons why the joining body of dissimilar metals which is produced by joining a 6000 series aluminum alloy material and a steel material of Patent Document 7 has a joining strength in an example of spot welding of less than 2 kN at highest, and a joining strength of 2 kN or more could not be obtained. The outer oxide layer of Patent Document 7 serves excessively as a barrier which is not easily destructed, for a 6000 series aluminum alloy material not containing an alloy element which is to be a strong reducing agent, and it becomes difficult to promote diffusion of Fe from the steel material side, at welding.

To the contrary, in the present invention, an alloy composition of an aluminum alloy material to be joined is a 5000 series and 7000 series aluminum material containing Mg at a large amount, as an element having a function of reducing the outer oxide layer. By the action of this Mg, the outer oxide layer which is destructed with difficulty is destructed by reduction as described above, and diffusion of Fe and Al at spot welding is effectively controlled as necessary and so as not to excessively suppress. As a result, in the case of welding joining dissimilar metals under the condition such that a steel material size dose not melt, and only the aluminum alloy material side melts, such as spot welding between an aluminum alloy material and a steel material, a high joining strength of 2 kN or more can be realized.

Effect of the Third Solving Means

The present invention is the same as Patent Document 7 in that diffusion of Fe and Al at spot welding is suppressed by both of an outer oxide layer containing Mn and Si on a body surface of a steel material and an inner oxide layer containing Mn and Si directly beneath the body surface of a steel material (hereinafter, an oxide present in a grain boundary and an oxide present in grains are collectively referred to as inner oxide), thereby, excessive generation of an Al—Fe-base brittle reaction layer at a joint interface is suppressed. However, a point which is greatly different from Patent Document 7 is that one kind or two kinds of Li and Mn as an element having a function of reducing the outer oxide layer present on a steel material surface are present on the joining surface side between the steel material and the aluminum alloy material, in advance.

However, depending on various conditions such as the condition of a joined body of dissimilar metals, the condition of production of a steel material, and restriction of a steel material to be used, the compositional balance between the outer oxide layer and the inner oxide layer on the steel material side cannot be proper [under the condition of FIG. 1(c) described later] in some cases. In addition, the steel material which could be made proper as described above cannot be used in some cases. In the case of actual dissimilar joint including these cases, necessity of joining the steel material side under the condition of the outer oxide layer and the inner oxide layer as in Patent Document 7 [condition of FIG. 1(b) described later] occurs. The present invention has been made by presuming such a case.

As described above, a object of the present invention is to obtain high joining strength, even when joining needs to be performed by selecting a 6000 series aluminum alloy material as an aluminum alloy material and a steel material having the condition of the outer oxide layer and the inner oxide layer as in Patent Document 7, respectively. For this reason, in the present invention, one kind or two kinds of Li and Mn as an element having a function of reducing the outer oxide layer present on a steel material surface are present on the joining surface side between the steel material and the 6000 series aluminum alloy material, in advance. Thereby, an outer oxide layer of a steel material, which is destructed with difficulty, is destructed by the reducing action of Li and Mn, and diffusion of Fe and Al at spot welding is effectively controlled as necessary and so as not to excessively suppress. As a result, while excessive generation of the Al—Fe-base brittle reaction layer (intermetallic compound layer) at a joint interface is suppressed, a requisite minimal Al—Fe-base reaction layer (intermetallic compound layer) for obtaining high joining strength is secured to obtain high joining strength. The 6000 series aluminum alloy material which is to be joined does not contain the element having a function of reducing the outer oxide layer which is originally present on a steel material surface, as an alloy element, or does not contain a sufficient amount for reduction even when the material contains the element, in many cases.

Herein, when dissimilar metals of a steel material and an aluminum material are joined, since the steel material has a higher melting point and higher electric resistance, and smaller heat conductivity as compared with those of the aluminum material, heat generation on the steel side becomes greater, and aluminum having a low melting point is first melted. In welding under the condition such that the steel material side dose not melt, and an only aluminum alloy material side melts, such as spot welding between an aluminum alloy material and a steel material, the steel material side dose not melt, and Fe is diffused from this steel material side to form an Al—Fe-base brittle intermetallic compound layer at an interface.

For this reason, in order to obtain high joining strength in welding under the condition such that the steel material side dose not melt, and only the aluminum alloy material side melts, it is necessary to suppress generation of the Al—Fe-base reaction layer requisitely minimally. However, when an outer oxide layer on the steel material side is not destructed, diffusion of Fe from the steel material side and generation of the AL-Fe-base reaction layer are suppressed excessively, thereby, a formation area of the reaction layer relative to the total area of a joining part is too small, high joining strength is not obtained since metallurgic joining cannot be performed. Therefore, in order to realize the high joining strength, it is necessary to form the Al—Fe-base reaction layer having a thickness which is requisite minimal for metallurgic joining at a joining part in a wide range as much as possible. As described above, particularly, in the case of dissimilar joint in which a 6000 series aluminum alloy material and a steel material are spot-welded, a welding mechanism is entirely different from that of spot welding between steel materials, and it becomes remarkably difficult to realize high joining strength between different kinds of metals.

In this respect, when the steel material side is welding-joined under the condition of the outer oxide layer as in Patent Document 7, the outer oxide layer present on a steel material surface serves excessively as a barrier which is not easily destructed, and it becomes difficult to promote diffusion of Fe from the steel material side, at welding. That is, in the outer oxide layer as in Patent Document 7, a ratio occupied by an oxide containing Mn and Si at a total amount of 1 at % or more becomes 50% or more as the average ratio. In such a case, when welding joining is performed under the condition such that the steel material side does not melt, and only the aluminum alloy material side melts, the outer oxide layer serves as a barrier which is not easily destructed, and suppresses generation of an Al—Fe-base reaction layer excessively, and a formation area of the reaction layer relative to the total area of a joining part becomes too small.

The is one of the great reasons why the joining body of dissimilar metals which is produced by joining a 6000 series aluminum alloy material and a steel material of Patent Document 7 has a joining strength in an example of spot welding of less than 2 kN at highest, and a joining strength of 2 kN or more could not be obtained. The outer oxide layer of Patent Document 7 serves excessively as a barrier which is not easily destructed, for a 6000 series aluminum alloy material not containing an alloy element which is to be a strong reducing agent, and it becomes difficult to promote diffusion of Fe from the steel material side, at welding.

To the contrary, in the present invention, one kind or two kinds of Li and Mn as an element having a function of reducing and destructing the outer oxide layer present on a steel material surface are present on the joining surface side between the steel material and the aluminum alloy material, in advance. Thereby, an outer oxide layer which is destructed with difficulty is destructed by reduction, as described above, and diffusion of Fe and Al at spot welding is effectively controlled as necessary and so as not to excessively suppress. As a result, in the case of welding joining dissimilar metals under the condition such that the steel material side does not melt, and only the aluminum alloy material side melts, such as spot welding between a 6000 series aluminum alloy material and a steel material, a high joining strength of 2 kN or more can be realized.

BEST MODE FOR CARRYING OUT THE INVENTION

Figure 1:
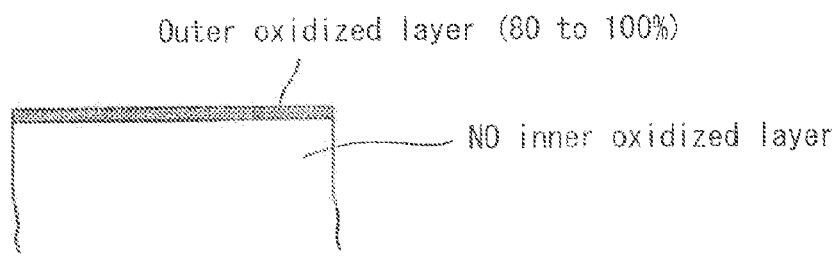
FIG. 1 is a schematic view showing a cross-section of a steel plate for dissimilar metal joining according to the present invention.
Figure 1:
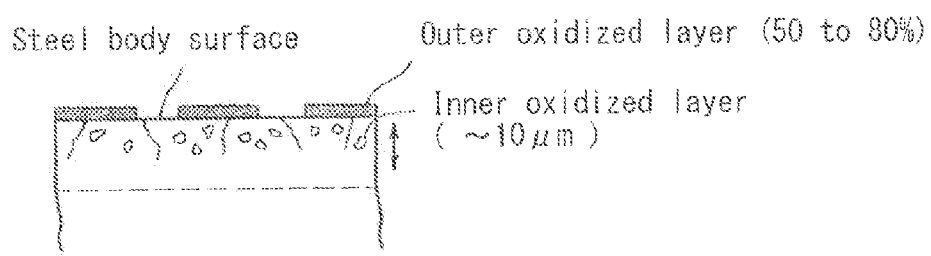
Figure 1:
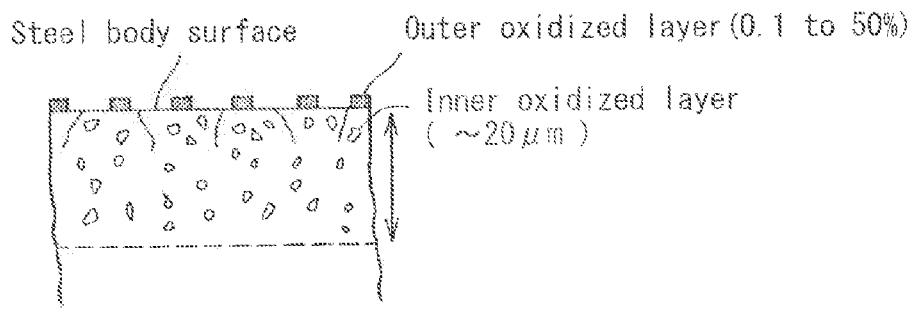

First Embodiment (Constitution of Oxide of Steel Material)

A specific quantitative compositional balance between an outer oxide layer and an inner oxide layer, which is characteristic in the present invention, will be described below.

Oxides on a steel material surface containing Mn and Si, which are annealed under the atmosphere controlled at different oxygen partial pressures after once subjected to pickle (steel material cross-sectional structure), are schematically shown in FIG. 1(a) to FIG. 1(c), respectively. FIG. 1(a) shows the case of annealing under the low oxygen partial pressure (low dew point) atmosphere. FIG. 1(b) shows the case of annealing under the intermediate oxygen partial pressure (relatively high dew point) atmosphere. FIG. 1(c) shows the case of annealing under the high oxygen partial pressure (high dew point) atmosphere. Among them, FIG. 1(c) shows the specific quantitative compositional balance between an outer oxide layer and an inner oxide layer, which is characteristic in the present invention.

FIG. 1(a):

In the case of annealing under the low oxygen partial pressure atmosphere of FIG. 1(a), a steel material containing Mn and Si in which the existing outer oxide layer is removed by once subjected to pickle, is such that a steel body surface of the steel material is covered with a thin outer oxide layer having a thickness of around 50 nm. However, since the oxygen partial pressure is low, oxygen does not enter (diffuse) into the interior of the steel material and an inner oxide containing a grain boundary oxide is not formed in the interior of the steel material under the steel body surface.

This outer oxide layer is an oxide film which is newly generated by annealing, after removal of the existing oxide layer, commonly, including FIG. 1(b) and FIG. 1(c) described later, and is constituted by an oxide containing Mn and Si at a total amount of 1 at % or more in which Mn and Si are concentrated, an oxide including Fe oxide and having a content of Mn and Si, as a total amount, of less than 1 at %, and voids. The oxide containing Mn and Si at a total amount of 1 at % or more is constituted by, for example, representatively, an oxide including $Mn_2SiO_4$, $SiO_2$ etc. In addition, the oxide having a content of Mn and Si, as a total amount, of less than 1 at % is constituted by, for example, representatively, an oxide including $Fe_3O_4$.

In such a case of FIG. 1(a), since the steel body surface of a steel material is totally covered with the outer oxide, a ratio occupied by the oxide containing Mn and Si at a total amount of 1% or more, in the outer oxide layer, is as high as 80 to 100% as an average ratio of a total length of this oxide occupying for a length of 1 μm in a substantially horizontal direction of an interface between the steel body and the outer oxide layer. Therefore, such an outer oxide layer has a greater ratio occupied by the oxide containing Mn and Si at a total amount of 1 at % or more than that of the outer oxide layer in FIG. 1(b) or FIG. 1(c) described later, and is destructed with more difficulty. In addition, in the case of the outer oxide layer of FIG. 1(a), an inner oxide is necessarily decreased. Therefore, for example, an inner oxide present in a steel region at a depth from the steel body surface to 20 μm is 0% as an average area ratio occupied by an oxide present in a crystal grain boundary and an oxide in grains containing Mn and Si at a total amount of 1 at % or more, or is less than 5% even if the inner oxide is present.

FIG. 1(b):

To the contrary, in the case of annealing under the intermediate oxygen partial pressure atmosphere of FIG. 1, in which an oxygen partial atmosphere is relatively higher than that of FIG. 1(a), oxygen enters (diffuses) into the interior of a steel material. For this reason, in the steel material containing Mn and Si, in which the existing outer oxide layer is removed by once subjecting to pickle, together with the outer oxide layer, an inner oxide is formed in a steel region which is relatively shallow in the interior of a steel material under the steel body surface, for example, at a depth from the steel body surface of a steel material to 10 μm or less. In Patent Document 7, the same condition of an outer oxide layer and an inner oxide layer, even when the welding procedure and the material combination of an aluminum alloy material and a steel material to be welded are different, is the condition of this FIG. (b).

Among these inner oxides, oxides generated in grains are the oxide containing Mn and Si at a total amount of 1 at % or more, a spherical to particulate oxide including $SiO_2$ and $Mn_2SiO_4$, and the oxide such as $Fe_3O_4$ containing Mn and Si at a total amount of less than 1 at %, commonly, including FIG. 1(c) described later. In addition, thereupon, grain boundary oxides are also formed on the grain boundary of a steel, commonly, including FIG. 1(c) described later, but these grain boundary oxides are particulate oxides containing Mn and Si at a total amount of approximately 1 at % or more.

As an oxygen partial pressure of atmospheric annealing becomes higher, oxygen begins to enter (diffuse) into a more inner part of a steel material, or more oxygen begins to enter (diffuse), and a region in which these inner oxides are present is extended, or an amount of these inner oxides is increased.

On the other hand, contrary to these inner oxides, as an oxygen partial pressure of atmospheric annealing becomes higher, a ratio occupied by an oxide containing Mn and Si in an outer oxide layer begins to be decreased. That is, in the outer oxide layer in FIG. 1(b), the ratio occupied by the oxide containing Mn and Si at a total amount of 1 at % or more becomes 50 to 80% as an average ratio of a total length of this oxide occupying for a length of 1 μm in a substantially horizontal direction of an interface between the steel body and the outer oxide layer, and becomes lower than the case of FIG. 1(a).

FIG. 1(c):

FIG. 1(c) shows the case of atmospheric annealing under a high oxygen partial pressure, in which an oxygen partial pressure is further higher than that of FIG. 1(b), and shows a specific quantitative compositional balance between an outer oxide layer and an inner oxide layer, which is characteristic in the present invention. In FIG. 1(c), oxygen enters (diffuses) into the further more interior of a steel material than in FIG. 1(b). For this reason, in the steel material containing Mn and Si, in which the existing outer oxide layer is removed by once subjecting to pickle, together with the outer oxide layer, the inner oxide is formed in a region which is relatively deep in the interior of a steel material under the steel body surface, and in the further more interior of a steel material. These inner oxides are mainly formed in a steel region at a depth from the steel body surface of this steel material to 20 μm.

To the contrary, the ratio occupied by the oxide containing Mn and Si in the outer oxide layer is further more decreased in the case of FIG. 1(c) than in the case of FIG. 1(b). That is, in the case of FIG. 1(c), the ratio occupied by the oxide containing Mn and Si at a total amount of 1 at % or more in the outer oxide layer becomes as lowest as 0.1% or more and less than 50%, as an average ratio of a total length of this oxide occupying for a length of 1 μm in a substantially horizontal direction of an interface between the steel body and the outer oxide layer. Such an outer oxide layer has the smallest ratio occupied by the oxide containing Mn and Si at a total amount of 1 at % or more than the outer oxide layer of FIG. 1(a) or FIG. 1(c), and is more easily destructed.

Herein, an outer oxide layer on a surface of a steel material such as a normal soft steel material is usually constituted by oxides such as αFeOOH, γFeOOH, amorphous oxyhydroxide, and Fe3O4. To the contrary, the outer oxide layer on a steel material surface, which is a high-strength steel material containing Mn and Si as in the present invention, and was annealed under the atmosphere having a controlled partial pressure as described above after once subjecting to pickle is constituted by the oxide containing Mn and Si at a total amount of 1 at % or more, and as the reminder, the oxide such as Fe3O4 containing Mn and Si at a total amount of less than 1 at %, and voids.

(Action of Outer Oxide Layer)

At welding joining between the steel material and the aluminum alloy material of FIG. 1, an Al—Fe reaction layer is formed on a joining surface between the steel material and the aluminum alloy material, breaking the outer oxide layer on a steel material surface. In this respect, the outer oxide layer on a steel material surface has the effect of suppressing diffusion of Fe and El at joining to suppress generation of an Al—Fe-base brittle intermetallic compound layer (reaction layer).

However, particularly, in the case of dissimilar joint such that a 6000 series aluminum alloy material and a steel material are spot-welded, such an effect is not exerted if there is an outer oxide layer having the aforementioned composition on a steel material surface, and the effect is limited to a case where an oxide phase containing a constant ratio of Mn and Si is present at a relatively small amount not greater than a constant amount. That is, only when the ratio occupied by the oxide containing Mn and Si at a total amount of 1 at % or more, in the outer oxide layer, is 50% or less as an average ratio of a total length of this oxide occupying for a length of 1 μm in a substantially horizontal direction of an interface between the steel body and the outer oxide layer, as in FIG. 1(c), such an effect is exerted.

A reason for this is that a normal 6000 series aluminum alloy material does not contain alloy elements to be a strong reducing agent which can break the outer oxide layer on a steel material surface by reduction, and these alloy elements cannot be present at an interface of the aluminum alloy material with the steel material. For this reason, in the case of spot welding such that the steel material side does not melt, and only the aluminum alloy material side melts, even if the aluminum alloy side melts, it becomes difficult to break the outer oxide layer on a steel material surface by reduction, and promote diffusion of Fe from the steel material side at the interface of the aluminum alloy material with the steel material. As a result, it becomes difficult to form an Al—Fe reaction layer having a thickness which is requisite minimal for metallurgic joining at a joining part in a wide range as much as possible.

The is one of the great reasons why the joining body of dissimilar metals which is produced by joining a 6000 series aluminum alloy material and a steel material of Patent Document 7 has a joining strength in an example of spot welding of less than 2 kN at highest, and a joining strength of 2 kN or more could not be obtained. In Patent Document 7, the outer oxide layer which is newly generated on a high-strength steel plate surface is an oxide of a Mn and Si composition at a specific ratio, which is the same as that of the present invention. However, the ratio is the same as that of the outer oxide layer in FIG. 1(b), and the average ratio is as excessive as 50% or more (50 to 80%). As a result, the outer oxide layer serves excessively as a barrier which is not easily destructed, for the 6000 series aluminum alloy material not containing an alloy element which is to be a strong reducing agent, and it becomes difficult to promote diffusion of Fe from the steel material side, at welding.

Therefore, in dissimilar joint such that a 6000 series aluminum alloy material and a steel material are spot-welded, spot welding in which the steel material side dose not melt, and only the aluminum alloy material side melts, wherein the ratio occupied by the oxide containing Mn and Si at a total amount of 1 at % or more, in the outer oxide layer, is made to be less than 50% as an average ratio of a total length of this oxide occupying for a length of 1 μm in a substantially horizontal direction of an interface between the steel body and the outer oxide layer.

On the other hand, when the average ratio occupied by the oxide containing Mn and Si at a total amount of 1 at % or more, in the outer oxide layer, is too small, the outer oxide layer does not become to be greatly different from the aforementioned outer oxide layer on a surface of a steel material such as a normal soft steel. For this reason, even in the case of spot welding such that the steel material side dose not melt, and only the aluminum alloy material side melts, and even in the case of the 6000 series aluminum alloy material not containing an alloy element which is to be a strong reducing agent, the outer oxide layer is easily destructed. As a result, diffusion of Fe from the steel material side to the aluminum alloy side melted is excessively promoted, and excessive generation of an Al—Fe-base brittle reaction layer, at a joint interface, cannot be suppressed, and the joining strength of a joined body of dissimilar metals is remarkably reduced.

Therefore, first, in the present invention, in the outer oxide layer present on a steel body surface of a steel material, the ratio occupied by the oxide containing Mn and Si at a total amount of 1 at % or more is 0.1% or more and less than 50%, preferably 0.1% or more and less than 30%, more preferably 0.1% or more and less than 5% as an average ratio of a total length of this oxide occupying for a length of 1 μm in a substantially horizontal direction of an interface between the steel body and the outer oxide layer.

In order to obtain such an outer oxide layer, as shown in FIG. (c), an oxygen partial pressure of atmospheric annealing is made to be higher, thereby, the inner oxide layer is formed deeper to the further more interior of a steel material, while atmospheric annealing of a high oxygen partial pressure is performed, in which a ratio occupied by an oxide containing Mn and Si in an outer oxide layer is greatly decreased.

Thereby, in the case of spot welding in which the steel material side dose not melt, and only the aluminum alloy material side melts, diffusion of Fe and Al at joining is suppressed to increase the effect of suppressing generation of an Al—Fe-base brittle intermetallic compound layer (reaction layer) at joining. Thereby, an average thickness of the reaction layer at a spot welding joining interface is controlled in an optimal range of 0.1 to 10 μm, as described later. As a result, particularly, regarding a joined body of dissimilar metals which is produced by spot-welding a 6000 series aluminum alloy material and a steel material, the high joining strength of 2 kN or more is obtained.

(Action of Inner Oxide)

An inner oxide layer directly beneath a steel body surface, in the case of spot welding such that the steel material side does not melt, and only the aluminum alloy material side melts, like the outer oxide layer on a steel material surface, has the effect of suppressing diffusion of Fe at joining to suppress generation of an Al—Fe-base brittle intermetallic compound layer (reaction layer).

That is, at welding joining between a steel material and an aluminum alloy material, the inner oxide of a steel material is formed into a solid solution in an Al—Fe reaction layer formed by breaking the outer oxide layer on a steel material surface, and suppresses diffusion of Fe and Al to suppress excessive generation of the reaction layer. The inner oxide having these functions includes a spherical oxide such as $SiO_2$ and $Mn_2SiO_4$, and contains Mn and Si at a total amount of 1 at % or more.

However, particularly, in the case of dissimilar joint such that a 6000 series aluminum alloy material and a steel material are spot-welded, such an effect is not exerted if there is an inner oxide layer directly beneath the steel body surface, but is limited to a case where an oxide phase containing Mn and Si at a constant ratio is present at a constant amount or more, and at a constant depth or deeper directly beneath the steel body surface. That is, as in the case of FIG. 1 (1), such an effect is exerted only when an inner oxide layer containing these inner oxides at a prescribed ratio is formed by 20 μm or more in a depth direction from a steel body surface of this steel material.

The reason therefor is that, as described above, a normal 6000 series aluminum alloy material does not contain an alloy element which is to be a strong reducing agent capable of breaking the outer oxide layer on a steel material surface by reduction, and these alloy elements cannot be present at an interface of the aluminum alloy material with the steel material. For this reason, in the present invention, as described above, the outer oxide layer is made to be a barrier which is relatively easily destructed, for the 6000 series aluminum alloy material not containing an alloy element which is to be a strong reducing agent. However, as described above, when the outer oxide layer is made to be relatively easily destructed, since the barrier effect on diffusion of Fe and Al of the outer oxide layer is relatively reduced, the function of the inner oxide becomes more important in order to effectively suppress the diffusion of Fe and Al.

That is, in the case of spot welding such that the steel material side does not melt, and only the aluminum alloy material side melts, it is necessary that the inner oxide is more sustainably formed into a solid solution throughout welding, in an Al—Fe reaction layer which is continuously formed by breaking the outer oxide layer on a steel material surface, and suppresses diffusion of Fe and Al to suppress excessive generation of the reaction layer. For soothe purpose thereof, as in the case of FIG. 1 (1), it is necessary that, in order to secure an amount of this inner oxide amount, a density of the inner oxide is secured and, at the same time, an inner oxide layer containing this inner oxide at a prescribed ratio is formed by at least 20 μm or more from the steel body surface of a steel material.

The is one of the great reasons why the joining body of dissimilar metals which is produced by joining a 6000 series aluminum alloy material and a steel material of Patent Document 7 has a joining strength in an example of spot welding of less than 2 kN at highest, and a joining strength of 2 kN or more could not be obtained. In Patent Document 7, the inner oxide layer is made to be present as an oxide having a composition of a specific ratio of Mn and Si, which is the as in the present invention. However, the presence region of the inner oxide layer is the same as that of the inner oxide layer in FIG. 1(b), and the layer is formed only at a relatively shallow steel region, at 10 μm or less from the steel body surface of a steel material. For this reason, Patent Document 7 is the same in that the inner oxide is formed into a solid solution in an Al—Fe reaction layer which is continuously formed by breaking the outer oxide layer on a steel material surface, but cannot form a solid solution more sustainably throughout welding. In other words, the effect of suppressing diffusion of Fe and Al to suppress excessive generation of a reaction layer becomes small for an Al—Fe reaction layer to be formed. As a result, in the case of spot welding such that the steel material side does not melt, and only the aluminum alloy material side melts, particularly, it becomes difficult to form an Al—Fe reaction layer which is requisite minimal for metallurgic joining at a joining part in a wide range as much as possible.

In this respect, in a steel material having such a surface texture, when the oxide containing Mn and Si at a total amount of 1 at % or more is present at a large quantity deep in the interior of a steel material, there is a possibility that diffusion of Fe and Al at joining is conversely suppressed excessively depending on the welding condition, a thickness of the reaction layer cannot be sufficiently ensured, it becomes difficult to generate the reaction layer uniformly, and high joining strength is not obtained. Therefore, it is not necessary that this inner oxide layer is provided deeper than necessary.

Therefore, in dissimilar joint such that a 6000 series aluminum alloy material and a steel material are spot-welded, spot welding in which the steel material side dose not melt, and only the aluminum alloy material side melts, an inner oxide layer containing the inner oxide containing Mn and Si at a total amount of 1 at % or more, at a prescribed ratio, is made to be present in a steel region at a depth from the steel body surface of this steel material to at least 20 μm. If it is specifically defined, a ratio occupied by a grain boundary oxide which is present in a steel region at a depth from the steel body surface of a steel material to 20 μm, and an oxide in grains containing Mn and Si at a total amount of 1 at % or more is made to be 5% or more and less than 20%, as an average area ratio occupied in a field area of this steel region within 10 μm². In addition, among the inner oxides, as oxides produced in grains, there are the spherical to particulate oxide containing Mn and Si at a total amount of 1 at % or more, and the oxide such as $Fe_3O_4$ containing Mn and Si at a total amount of less than 1 at %, as described above, while an oxide formed on a grain boundary of a steel is a particulate oxide containing Mn and Si at a total amount of 1 at % or more, in most cases. Then, in the present invention, in definition of an inner oxide, a ratio occupied by the oxide present in a grain boundary and the oxide present in crystal grains containing Mn and Si at a total amount of 1 at % or more is 5% or more and less than 20%.

Thereby, in the case of spot welding such that the steel material side does not melt, and only the aluminum alloy material side melts, the effect of suppressing diffusion of Fe and Al at joining to suppress generation of an Al—Fe-base brittle intermetallic compound layer (reaction layer) becomes greater. Thereby, an average thickness of the reaction layer at a spot welding joint interface is controlled in an optimal range of 0.1 to 10 μm, as described later. As a result, particularly, regarding a joined body of dissimilar metals, which is produced by spot-welding a 6000 series aluminum alloy material and a steel material, a high joining strength of 2 kN or more is obtained.

When the density of the inner oxide containing Mn and Si at a total amount of 1 at % or more is less than 5% as the average area ratio, even if a depth region of a steel material where this inner oxide is present is satisfied, the density of the inner oxide is too small, and an amount of the inner oxide for exerting the aforementioned effect is deficient. On the other hand, when the density of the inner oxide containing Mn and Si at a total amount of 1 at % or more is 20% or more as the average area ratio, there is a high possibility that, conversely, a reaction layer at a joint interface between the steel material and the aluminum material is locally grown, the layer is not uniformly grown and, even under the proper welding condition, metallurgic joining becomes impossible.

(Steel Material Inner Texture)

As described above, in the steel material, it is not necessary that this inner oxide layer is provided deep, greatly exceeding 20 μm. Therefore, it is preferable that a ratio occupied by a grain boundary oxide and an oxide in grains containing Mn and Si at a total amount of 1 at % or more, which are present in a steel region in which a depth from the steel body surface of a steel material is more than 20 μm and 30 μm or less is 10% or less, as an average area ratio occupied in a field area of this steel region within 10 μm$^2$.

(Method of Measuring Oxide)

Measurement of an oxide in the present invention is performed with TEM (transmission electron microscope) at a magnification of 10000 to 30000 using EDX (energy dispersive X-ray spectroscopy) jointly. That is, an outer oxide is specified by obtaining a total amount of Mn and Si in an outer oxide layer in the vicinity of an interface by analyzing an interface between a steel body and an outer oxide layer in a substantially horizontal direction, in a cross section in a thickness direction of a steel material, and distinguishing a phase of the oxide in the vicinity of an interface containing Mn and Si at a total amount of 1 at % or more (a plurality of oxides) from other phases. Then, a length in the substantially horizontal direction in the interface, of this oxide phase containing Mn and Si at a total amount of 1 at % or more, in the same interface region as that of this EDX analysis is obtained. A ratio of a total length of this oxide phase, occupying for a length of 1 μm in a substantially horizontal direction of an interface is obtained. This is performed at a plurality of places, and these are averaged.

An inner oxide is specified by distinguishing an oxide containing Mn and Si at a total amount of 1 at % or more, in the aforementioned plurality of places of a prescribed steel region at a depth from a steel body surface of a steel material to 20 μm, from other phases by the EDX. Each area ratio occupied in a field area of 10 μm$^2$ of this oxide phase containing Mn and Si at a total amount of 1 at % or more, in the same surface region as that of this EDX is obtained by TEM.

Herein, an area occupied by a grain boundary oxide in this steel region is added to the area ratio occupied by the inner oxide, as an inner oxide containing Mn and Si at a total amount of 1 at % or more in this steel region, as described above. This is performed at a plurality of places, and these are averaged. In addition, the ratio occupied by a grain boundary oxide and an oxide in grains containing Mn and Si at a total amount of 1 at % or more, which are present in a steel region in which a depth from the steel body surface of a steel material is more than 20 μm and 30 μm or less, is measured by the similar method.

(Oxide Layer Control)

Control of outer oxides and inner oxides of these steel materials can be performed by controlling the annealing conditions of steel materials (oxygen partial pressure), as described above. More specifically, control can be performed by changing an oxygen partial pressure (dew point) in the annealing atmosphere of a steel material. In any steel species, when the oxygen partial pressure (dew point) is high, an amount of an oxide in which Mn and Si in an outer oxide layer on a steel material surface are concentrated becomes small. In addition, the interior of a steel is also oxidized, inner oxidation and grain boundary oxidation proceed, $SiO_2$, $Mn_2SiO_4$ etc. are formed in the steel, and an area ratio of an oxide containing Mn and Si occupied in the steel is increased.

On the other hand, in any steel species of a high-strength steel, when the oxygen partial pressure (dew point) is low, an oxide such as $Mn_2SiO_4$ or $SiO_2$ in which Mn and Si are concentrated in an outer oxide layer on a steel material surface is formed, but an amount thereof and an area ratio thereof are increased. On the other hand, oxidation in the interior of the steel proceeds with difficulty, an amount of $SiO_2$, $Mn_2SiO_4$ or the like to be formed in the steel is reduced, and an area ratio of an oxide containing Mn and Si occupied in the steel is reduced.

(Reaction Layer at Joint Interface of Joined Body of Dissimilar Metals)

In the joined body of dissimilar metals in which a steel material whose oxide layer on a surface is controlled and an aluminum material are joined by welding as described above, high joining strength is obtained by using the proper welding condition. However, even when the condition of the welding material side is adjusted, high joining strength cannot be realized in some cases, depending on the welding application condition (welding condition).

For this reason, it is necessary to define the condition for obtaining high joining strength, seen from the side of the joined body of dissimilar metals, and also to optimize the welding condition by controlling so as to be suitable for this condition of the side of the joined body of dissimilar metals. Therefore, in the present invention, preferably, the spot welding condition for obtaining high joining strength as a joined body of dissimilar metals is defined.

As described above, when seen from the side of the joined body of dissimilar metals, it is necessary to form a reaction layer of Fe and Al having a thickness which is requisite minimal for metallurgic joining at a joining part in a wide range as much as possible. That is, first, it is necessary to control an average thickness in a nugget depth direction of a reaction layer (plate thickness direction of steel material) at a joint interface with an aluminum material, as the thickness which is requisite minimal for metallurgic joining, in a range of 0.1 to 10 μm.

The welding joint interface between a steel material and an aluminum material has a laminated $Al_3Fe_2$-based compound layer on the steel material side, and a layer in which a particulate or needle-like $Al_3Fe$-based compound and an Al19Fe4Si2Mn-based compound are present in admixture on the aluminum material side, respectively, as the reaction layer.

When the thickness in a nugget depth direction of each of these brittle reaction layers is more than 10 μm, the joining strength is remarkably reduced. On the other hand, when the thickness in a nugget depth direction of the reaction layer is less than 0.1 μm, metallurgic joining becomes insufficient, and sufficient joining strength is not obtained. Therefore, the average thickness of the reaction layer at the joint interface between a steel material whose oxide layer on a surface is controlled and an aluminum material is in a range of 0.1 to 10 μm.

(Formulation Range of Reaction Layer)

Then, it is necessary that the reaction layer of Fe and Al in the joined body of dissimilar metals is formed at a joining part in a wide range as much as possible. That is, it is preferable that the formation range of the reaction layer after joining is an area of 70% or more of a joining area (substantially horizontal direction of steel material, direction orthogonal to nugget depth direction), in point welding such as spot welding and FSW (friction stirring joining).

When the reaction layer is not such that it is formed in the proper thickness range and, moreover, this proper thickness range is uniform in a wide range as much as possible, there is a possibility that metallurgic joining cannot be assuredly attained. To the contrary, when the reaction layer in the proper thickness range is formed by the aforementioned 70% or more, sufficient joining strength is assuredly obtained.

(Measurement of Reaction Layer in Joint Interface of Joined Body Of Dissimilar Metals)

In measurement of the reaction layer in the present invention, a joining part between a steel material and an aluminum material is cut, a joint interface is observed from a cross section with SEM (scanning electron microscope), and the measurement of the reaction layer is performed, as in Examples described later.

(Chemical Component Composition of Steel Material)

First, a component composition of a steel material which is a subject of the present invention will be described below. In the present invention, a main subject is a high-strength steel material having a tensile strength of 450 MPa or more and containing Si, Mn etc. Further, a subject is a steel material in which an outer oxide layer containing a prescribed amount of Si, Mn etc. can be newly generated, when the existing oxide layer on a surface is once removed by pickle and, further, annealed in the atmosphere having a controlled oxygen partial pressure.

For this reason, regarding the component composition of a steel material, on the assumption that a prescribed amount of Si, Mn etc. are contained, the composition is such that C: 0.01 to 0.30%, Si: 0.1 to 3.00%, and Mn: 0.1 to 3.00% are contained as expressed by mass %, respectively, and preferably, the reminder includes Fe and unavoidable impurities. In addition, the composition may be such that, in addition to this, Al: 0.002 to 0.1% is further contained, and the reminder includes Fe and unavoidable impurities. In addition, the composition may be such that, further, in addition to this Al, or in place of Al, one kind or two or more kinds of Nb: 0.005 to 0.10%, Ti: 0.005 to 0.10%, Zr: 0.005 to 0.10%, Cr: 0.05 to 3.00%, Mo: 0.01 to 3.00%, Cu: 0.01 to 3.00% and Ni: 0.01 to 3.00% are contained, and the reminder includes Fe and unavoidable impurities.

Herein, since P, S, N etc. as impurities of a steel material reduce various properties such as toughness, ductility or joining strength of a steel material, P is regulated at 0.10% or less (including 0%), S is regulated at 0.05% or less (including 0%), and N is regulated at 300 ppm or less (including 0%), respectively. In addition, a unit of a chemical component (content of each element) in the present invention is mass % in all cases including an aluminum alloy.

The reasons why respective component elements of a steel material are limited, are as follows.

C:

C is an element necessary for increasing strength, but when a content is less than 0.01%, the strength of a steel material cannot be secured and, when a content exceeds 0.30%, cold workability is reduced. Therefore, the content of C is in a range of 0.01 to 0.30%.

Si, Mn:

Si or Mn forms the outer oxide layer containing a prescribed amount of Si or Mn on a surface of a steel material. This outer oxide layer, in the case of dissimilar joint between Fe and Al, interferes with diffusion of Fe and Al from the mutual base material side, and can suppress formation of a brittle intermetallic compound to the minimum. In addition, those elements serve for improving brittleness of an intermetallic compound.

Further, Si or Mn forms the inner oxide layer containing a prescribed amount of Si or Mn in the interior of a steel material. This inner oxide layer forms a solid solution into an Al—Fe reaction layer formed by breaking an outer oxide layer on a steel material surface, and prevents diffusion of Fe and Al from a mutual base material side to suppress excess generation of a reaction layer.

Therefore, when a content of Si or Mn in a steel material is too small, the outer oxide layer or the inner oxide layer is deficient, and the joining strength of a joined body of dissimilar metals cannot be improved, as described later. On the other hand, when a content of Si or Mn in a steel material is too large, joining strength of a joined body of dissimilar metals is conversely reduced, as described later. For this reason, in order to form a proper outer oxide layer or inner oxide layer, it is necessary that Si or Mn in a steel material is in a range of the content defined in the present invention.

Si:

Si is also important as an element which can retain necessary strength without deteriorating ductility of a steel material and, for realizing this, a content of 0.1% or more is necessary. On the other hand, when Si is contained at more than 3.00%, ductility is deteriorated. Therefore, a Si content is in a range of 0.1 to 3.00%, also for this reason.

Mn:

Mn is also indispensable as an element for retaining the strength and toughness of a steel material and, when a content thereof is less than 0.1%, the effect thereof is not obtained. On the other hand, when a content thereof exceeds 3.00%, the strength is remarkably increased, and cold working becomes difficult. Therefore, a Mn content is in a range of 0.1 to 3.00%, also for this reason.

Al:

Al is an element which captures solid-dissolved oxygen as a deoxidizing element of a molten steel and, at the same time, prevents generation of a blowhole to improve toughness of a steel. When an Al content is less than 0.002%, the sufficient these effects cannot be obtained and, on the other hand, when a content thereof is more than 0.1%, this conversely deteriorates weldability, and deteriorates toughness of a steel by increase in an alumina-based inclusion. Therefore, the Al content is in a range of 0.002 to 1.0%.

One or two or more kinds of Nb, Ti, Zr, Cr, Mo, Cu, and Ni:

Inclusion of one or two or more kinds of Nb, Ti, Zr, Cr, Mo, Cu, and Ni, commonly, contribute to high strengthening and high toughening of a steel.

Among them, Ti, Nb and Zr are precipitated as a nitride carbide into a steel to enhance strength, and make a microtexture of a steel into fine to improve strength, toughness etc. However, when they are contained at a large amount, this considerably deteriorates toughness. Therefore, when they are contained, Nb is in a range of 0.005 to 0.10%, Ti is in a range of 0.005 to 0.10%, and Zr is in a range of 0.005 to 0.10%, respectively.

In addition, among them, Cr, Mo, Cu, and Ni improve hardenability of a steel, and improve strength of a steel. However, when they are contained at a large amount, this considerably deteriorates toughness of a steel. Therefore, when they are contained, Cr is in a range of 0.05 to 3.00%, Mo is in a range of 0.01 to 3.00%, Cu is in a range of 0.01 to 3.00%, and Ni is in a range of 0.01 to 3.00%.

(Strength of Steel Material)

In the present invention, a main subject is a high-strength steel material having a tensile strength of 450 MPa, from utility of an automobile part. In the case of a steel having strength lower than this, since there are generally many low-alloy steels, and an oxide film is approximately an iron oxide, diffusion of Fe and Al becomes easy, and a brittle reaction layer is easily formed. In addition, since an amount of Si or Mn is small, the oxide containing Si or Mn necessary for suppressing diffusion of Fe and Al of a base material in the present invention is formed with difficulty on a surface or in the interior of a steel, a composition or a thickness of an outer or inner oxide (layer) containing Si or Mn cannot be controlled, and it becomes difficult to control a reaction layer at welding. Further, since the strength of a steel material is deficient, deformation of a steel material becomes great by pressurization due to an electrode chip at spot welding, and an oxide film is easily destructed and, therefore, a reaction with aluminum is abnormally promoted, and a brittle intermetallic compound is easily formed.

(Aluminum Alloy Material)

An aluminum alloy material used in the present invention is an Al—Mg—Si-base 6000 series aluminum alloy in AA to JIS specification, containing Mg: 0.1 to 3.0%, Si: 0.1 to 2.5%, and Cu: 0.001 to 1.0% as expressed by mass %, respectively. A shape of this alloy material is not particularly limited depending on each part utility of an automobile vehicle body, and the plate material, the formed material, the forged material, and the cast material which are widely used are appropriately selected. In this respect, regarding strength of an aluminum material, the strength is desirably higher for suppressing deformation due to pressurization at spot welding, as in the case of the steel material.

Utility for the automobile vehicle body panel requires various properties such as excellent press moldability and BH property (bake hardening property), strength, weldability, corrosion resistance etc. In order to satisfy such requirements, it is preferable that a composition as a 6000 series aluminum alloy plate is an Al—Mg—Si-base aluminum alloy containing Mg: 0.1 to 1.0%, Si: 0.1 to 1.5%, Mn: 0.01 to 1.0%, and Cu: 0.001 to 1.0% as expressed by mass %, and the reminder including Al and unavoidable impurities. In addition, in order to make the BH property more excellent, an excessive Si-type 6000 series aluminum alloy plate having a mass ratio Si/Mg between Si and Mg of 1 or more is preferable.

In addition, an extruded material as a material for reinforcing the automobile vehicle body is required to have various properties such as excellent bending crushability and corrosion resistance. In order to satisfy such requirements, it is preferable that a composition of a 6000 series aluminum alloy extruded material is an Al—Mg—Si-base aluminum alloy containing Mg: 0.30 to 1.0%, Si: 0.30 to 1.0%, Fe: 0.01 to 0.40%, Mn: 0.001 to 0.30%, and Cu: 0.001 to 0.65% as expressed by mass %, respectively, and the reminder including Al and unavoidable impurities. Further, in addition to the aforementioned each preferable composition, one or two or more kinds of Cr: 0.001 to 0.2%, and Zr: 0.001 to 0.2% at a total amount of 0.30% or less, or one or two more kinds of Zn: 0.001 to 0.25%, and Ti: 0.001 to 0.10% may be selectively contained.

Elements other than these elements are fundamentally impurities, and a content thereof is a content at each impurity level (acceptable amount) in line with AA to JIS specification. However, when not only high purity Al bullion, but also a 6000 series alloy, and other aluminum alloy scrap materials, and low purity Al bullion are used as melt raw materials at a large amount from a view point of recycle, there is a high possibility that impurity elements are mixed therein. Reduction of these impurity elements to below a detection limit itself leads to the cost up, and acceptance of inclusion to some extent becomes necessary. Therefore, other elements are admitted to be contained in a range of an acceptable amount in line with AA to JIS specification, respectively.

Meaningfulness of inclusion of each element in the 6000 series aluminum alloy is as follows:

Si: Si is an essential element for obtaining, for example, necessary strength of 180 MPa or more (proof strength), which strengthens formation of a solid solution, and forms with Mg an ageing precipitate contributing to improvement in strength, at the artificial ageing treatment at a low temperature such as coating-baking treatment to exert the ageing hardening ability. When a content thereof is deficient, such an effect is not obtained and, when a content thereof is too large, moldability such as press moldability or bending moldability is remarkably reduced and, further, weldability is greatly inhibited.

Mg: Mg is also an essential element for obtaining the necessary proof strength, as a panel, which strengthens formation of a solid solution, and forms with Si an ageing precipitate contributing to improvement in strength, at the artificial ageing treatment such as coating-baking treatment to exert the ageing hardening ability. When a content thereof is deficient, such an effect is not obtained and, when a content thereof is too large, moldability such as press moldability or bending moldability is remarkably reduced and, further, weldability is greatly inhibited.

Cu: Cu has an effect of promoting formation of an ageing precipitate contributing to improvement in strength into crystal grains of an aluminum alloy material texture, under the artificial ageing treatment at a relatively low temperature for a short time. In addition, solid-dissolved Cu also has an effect of improving moldability. When a content thereof is deficient, such an effect is not obtained and, when a content thereof is too large, corrosion resistance and weldability are remarkably deteriorated.

Mn: Since Mn generates dispersed particles (dispersion phase) at homogenization heat treatment, and these dispersed particles have an effect of preventing grain boundary movement after recrystallization, Mn has an effect of capable of obtaining fine crystal grains. As a crystal grain of an aluminum alloy texture is finer, press moldability and hem workability are improved. When a content thereof is deficient, such an effect is not obtained and, when a content thereof is too large, the mechanical property is deteriorated, and moldability such as bending workability is deteriorated.

Fe: Fe serves the same function as Mn, Cr, Zn, etc., and generates dispersed particles (dispersion phase), and these dispersed particles have effects of preventing grain boundary movement after recrystallization, crystal grain coarsening, and at the same time, making the crystal grain into finer. When a content thereof is deficient, such effects are not obtained and, when a content thereof is too large, a coarse crystallized substance is easily generated, and breakage toughness and fatigue property are deteriorated.

Zn: Zn has effects of contributing to improvement of enhancement in formation of a solid solution and, additionally, remarkably promoting ageing hardening of a final product upon ageing treatment. When a content thereof is deficient, such effects are not obtained and, when a content thereof is too large, sensitivity to stress corrosion cracking or grain boundary corrosion is remarkably enhanced, and corrosion resistance and durability are reduced.

Ti: Ti has an effect of making a crystal grain of an ingot into fine and making an extruded material texture into a fine crystal grain. When a content thereof is deficient, such an effect is not obtained and, when a content thereof is too large, a coarse crystallized substance is formed, and this becomes a cause for reduction in required properties such as the bending crushability and the corrosion resistance as a reinforcing material, and bending workability of an extruded material.

Cr or Zr: A transition element such as Cr or Zr generates dispersed particles (dispersion phase) including an intermetallic compound such as Al—Cr-base compound or Al—Zr-base compound, and is effective for preventing a crystal grain from becoming coarse. When a content thereof is deficient, such an effect is not obtained and, when a content thereof is too large, a coarse crystallized substance is formed and, when a content is too large, requirement properties such as the bending crushability and the corrosion resistance as a reinforcing material, and a mechanical property are reduced. In addition, moldability such as bending workability is reduced.

(Thicknesses of Steel Material and Aluminum Alloy Material)

In addition, a thickness (plate thickness etc.) of a part to be welded of a steel material or an aluminum alloy material is not particularly limited, but is appropriately selected or determined from the design conditions such as necessary strength and necessary rigidity of an application member including an automobile member.

However, when an automobile member is assumed, practically, a thickness t (of a part to be welded) of a steel material is selected from 0.3 to 3.0 mm. When the thickness of a steel material is too small, strength and rigidity necessary as an automobile member cannot be ensured, being improper. Additionally, for example, in the case of spot welding, since deformation of a steel material is great, and an oxide film is easily destructed by pressurization with its electrode chip, a reaction with aluminum is promoted. As a result, it becomes easy to form an intermetallic compound. On the other hand, when the thickness of a steel material is too great, spot welding joining itself becomes difficult.

In addition, similarly when an automobile member is assumed, a thickness t (of a part to be welded) of an aluminum alloy material, is selected from a range of 0.3 to 5.0 mm. When the thickness of an aluminum alloy material is too small, strength as an automobile member is deficient, and this is improper and, additionally, a nugget diameter is not obtained, and since melting reaches an aluminum material surface, and a dust is easily generated, there is a possibility that high joining strength is not obtained. On the other hand, when the thickness of an aluminum alloy material is too great, welding joining itself becomes difficult, like the case of the thickness of a steel material plate.

(Joining Method)

In addition, in the present invention, as a welding method, welding such that the steel material side does not melt, and only an aluminum material alloy material side melts is selected, as a premise. In this respect, the welding method is limited to spot welding, or friction spot joining (also referred to as friction stirring joining, FSW, or spot FSW). That is, MIG welding and laser welding in which both of the steel material side and the aluminum alloy material side melt are exempt, and welding procedures such as ultrasound joining, diffusion joining, friction pressure joining, and brazing in which both of the sides do not melt are exempt. In addition, due to easy adoption of productivity and suitable condition, joining by spot welding is more preferable than friction spot joining.

In addition, as the preferable conditions for every joining place of spot welding for realizing that the steel material side does not melt, and only the aluminum alloy material side melts, an interelectrode current of 10 to 35 kA is passed for 200×tmsec or shorter, in a relationship with a thickness t mm of an aluminum alloy material part to be joined, at an interelectrode pressure of 2.0 to 3.0 kN. Under the improper spot welding conditions such as a to d shown in Table 4 described later, which are out of the conditions, high joining strength of a joined body of dissimilar metals is not obtained.

Example 1

Dissimilar joint by spot welding was performed below, respectively, as Examples, and joined bodies of dissimilar metals were manufactured. The joining strength of each of these joined bodies of dissimilar metals was measured, and assessed.

Specifically, a steel plate obtained by smelting a steel material at each component composition shown in Table 1 and rolling to a thickness of 1.2 mm was once subjected to pickle to remove the existing surface oxidized layer, thereafter, an oxygen partial pressure (dew point) in the annealing atmosphere was variously changed under each condition of A, B, C, D, E, F and G shown in Table 3, provided that an annealing temperature and an annealing time were commonly fixed such that the annealing temperature was 1000° C., and the annealing time was 2000 sec, thereby, steel plates having different oxidization structures of a surface and a surface layer were manufactured. Herein, steel plates having respective component compositions shown in Table 1 are all high-strength steel plates which are subjects of the present invention, and tensile strengths of respective steel plates are all in a range of 780 to 1280 MPa, which is 450 MPa or more.

Respective oxidation structures such as an outer oxide layer composition and an inner oxide layer composition of respective steel plates after annealing are also shown in Table 3, respectively. Among the annealing conditions shown in Table 3, D, E, F and G, in which an oxygen partial pressure (dew point) is sequentially increased, are those in which an oxygen partial pressure (dew point) is suitable. For this reason, as shown in Table 3, the annealing conditions D, E, F and G are such that an outer oxide layer and an inner oxide layer of a steel plate after annealing satisfy the condition of the present invention. That is, a ratio occupied by an oxide containing Mn and Si at a total amount of 1 at % or more in an outer oxide layer is such that an average ratio of a total length of this oxide occupying for a length of 1 μm in a substantially horizontal direction of an interface between a steel body and the outer oxide layer is in a range of 0.1% or more and less than 50%.

In addition, the annealing conditions D, E, F and G are such that a ratio occupied by inner oxide 1 (grain boundary oxide present in a steel region at a depth from a steel body surface of a steel plate to 20 μm, and oxide in grains containing Mn and Si at a total amount of 1 at % or more) is in a range of 5% or more and less than 20%, as an average area ratio occupied in a field area of this steel region within 10 μm². Further, a ratio occupied by inner oxide 2 (grain boundary oxide present in a steel region at a depth from a steel body surface of a steel plate to more than 20 μm and 30 μm or less, and oxide in grains containing Mn and Si at a total amount of 1 at % or more) is 10% or less as an average area ratio occupied in a field area of this steel region within 10 μm².

In this regard, among these annealing conditions, G is an example in which an oxygen partial pressure (dew point) is high to a limit extent. For this reason, an average ratio of a total length of the oxide in an outer oxide layer of a steel plate is within the range, but is near a lower limit, and becomes remarkably small as around 0.5%. On the other hand, a ratio occupied by inner oxide 1 or 2 is within the range, but is near an upper limit, and becomes remarkably high.

To the contrary, among the annealing conditions shown in Table 3, A, B and C are a Comparative Examples in which an oxygen partial pressure (dew point) is too low, as compared with the annealing conditions D, E, F and G. For this reason, as shown in Table 3, an average ratio of a total length of the oxide in an outer oxide layer of a steel plate after annealing exceeds 50%. Therefore, among the annealing conditions shown in Table 3, in these annealing conditions of A, B and C, it is clear that respective oxidation structures such as an outer oxide layer composition and an inner oxide layer composition of respective steel plates are exempt from the optimal conditions, and joining strength of a joined body of dissimilar metals is reduced. For this reason, regarding each steel plate which was annealed under these annealing conditions of A, B and C, a joined body of dissimilar metals by spot welding is not manufactured.

Each oxidation structure in a joining corresponding part of each steel plate was measured by the following measuring method.

(Outer Oxide Formation Range)

In an outer oxide, a cross section sample was manufactured with a focused ion beam processing apparatus (FIB: Focused Ion Beam Process, FB-2000A manufactured by Hitachi, Ltd.), a total amount of Mn and Si in an outer oxide layer in the vicinity of an interface was obtained by analyzing an interface between a steel body and an outer oxide layer in a substantially horizontal direction, in a cross section in a thickness direction of a steel plate by the EDX (Model: NORAN-VANTAGE), and a phase of oxides (a plurality of oxides) in the vicinity of an interface containing Mn and Si at a total amount of 1 at or more was specified by distinguishing from other phases. Then, a cross section is observed with TEM (field emission type transmission electron microscope manufactured by JEOL Ltd.: JEM-2010F, acceleration voltage 200 kv) at a magnification of 100000, and a length in a substantially horizontal direction at the interface of this oxide phase containing Mn and Si at a total amount of 1 at % or more, in the same interface region as that of the EDX is obtained. A ratio of a total length of this oxide phase, occupying for a length of 1 μm in a substantially horizontal direction of an interface was obtained. This was performed in three fields, respectively, and the average value thereof of them was obtained.

(Inner Oxide Occupation Area Rate)

Regarding an inner oxide, setting an inner oxide in a steel region in which the depth from a steel body surface of a steel plate is a depth from a steel body surface of this steel material to 20 μm as in the case of FIG. 1(c) to be inner oxide 1, and an inner oxide in a steel region at a depth from a steel body surface of a steel plate to more than 20 μm and 30 μm or less to be inner oxide 2, the compositions thereof were analyzed. Composition analysis is performed as an average area ratio of an oxide containing Mn and Si at a total amount of 1 at % or more in these respective steel regions. First, the oxide containing Mn and Si at a total amount of 1 at % or more in these respective steel regions is specified by distinguishing from other phases, with the EDX. A cross section is observed with TEM (field emission type transmission electron microscope manufactured by JEOL Ltd.: JEM-2010F, acceleration voltage 200 kV) at a magnification of 30000, and each area ratio occupied in a field area (body iron area) per 10 μm² of the oxide phase containing Mn and Si at a total amount of 1 at % or more, in the same interface region as that of the EDX was obtained. Herein, an area occupied by a grain boundary oxide is added to the oxide containing Mn and Si at a total amount of 1 at % or more. This is performed in three fields, respectively, and the average thereof was obtained.

Each of the steel plates having different oxidation structures and a 6000 series aluminum alloy plate of a plate thickness of 1 to 1.6 mm, the aluminum alloy plate having commonly a composition shown in Table 2 in each Example, were processed into a shape of a cross tensile test piece described in JIS A 3137, and laminated, and spot welding was performed under each condition of a, b, c, d, e and f shown in Table 4, thereby, dissimilar joint was performed. Herein, as assessed from peeling strengths shown in Table 5 described later, a to d shown in Table 4 are improper spot welding conditions, and e and f are proper spot welding conditions.

In addition, in spot welding shown in Table 4, spot welding per one point was performed, commonly, using a direct current resistance welding testing machine, at a pressurizing force, a welding current and a welding time shown in Table 4. In addition, commonly, a dome-type electrode including a Cu—Cr alloy was used, and a positive electrode was an aluminum material and a negative electrode was a steel material.

(Thickness and Formation Range of Interface Reaction Layer)

A thickness and a formation range of an interface reaction layer of each of the thus manufactured joined bodies of dissimilar metals were measured. The results thereof are shown in Table 5. In measurement of the thickness of an interface reaction layer, each spot welding part was cut at a center, the cut part was embedded in a resin to be polished, and subjected to SEM observation at an interval of 0.5 mm over the entire joining part. When the thickness of a reaction layer is 1 um or more, measurement was performed at the field of a magnification of 2000 and, when the thickness thereof was less than 1 μm, measurement was performed at the field of a magnification of 10000, and an average for every each spot welding part was obtained, and an average of 30 spot welding parts was defined as an average thickness of the interface reaction layer. In addition, regarding the formation range of an interface reaction layer, a ratio of a reaction layer formation area relative to the total spot area was obtained at each spot welding part, and an average of 30 spot welding parts was obtained.

(Element Amount at Joint Interface on Aluminum Alloy Material Side)

Similarly, a content of Fe (mass %: expressed as Fe concentration in Al at interface in Table 5) at a joint interface on the aluminum alloy material side of each of the manufactured joined bodies of dissimilar metals was measured. The results thereof are shown in Table 5.

For analysis, EPMA: X-ray microanalyzer manufactured by JEOL Ltd. (JXA-8800RL) was used, and measurement was performed at a constant acceleration voltage of 15 kV, and a constant irradiation current of 0.3 μA. A subject to be analyzed was a cross section obtained by cutting the each spot welding part at a center, and analysis was performed centering in a joint interface between an aluminum alloy material and a steel material, and up to the interior each 0.5 mm inner of the aluminum alloy material side and the steel material side. A content of Fe originally possessed by the aluminum alloy material on the inner side of the aluminum alloy material was subtracted therefrom, and the content of Fe (mass %: expressed as Fe concentration in Al at interface in Table 5) at joint interface on the aluminum alloy material side was measured.

A cross tensile test of each of these manufactured jointed bodies of dissimilar materials was performed to obtain a peeling strength. These results are also shown in Table 5. The peeling strength was o when the strength is 2.0 kN or more, or x when the strength was less than 2.0 kN, referring to a spot welding joining strength between A6022 aluminum materials=1.0 kN.

As apparent from Table 5, in respective Invention Examples 1 to 23 in which a steel plate and a 6000 series aluminum alloy plate having a proper component composition shown in Tables 1 and 2 were used, and treatment was performed under the annealing condition D, E, F or G having a suitable oxygen partial pressure (dew point) shown in Table 3, an outer oxide layer and an inner oxide of the steel plate after annealing satisfy the condition of the present invention. Particularly, the annealing condition F satisfies 0.1% or more and less than 30% which is a preferable range, and the annealing condition G satisfies 0.1% or more and less than 5% which is a more preferable range, as the ratio occupied by an oxide containing Mn and Si at a total amount of 1 at % or more of an outer oxide layer. In addition, in respective Invention Examples in which the steel plate satisfying these oxide conditions was used, and the welding conditions were the proper spot welding conditions of e and f, a content of Fe in a joint interface on the aluminum alloy material side at a joint interface of a joined body of dissimilar metals is 2.0 mass % or less. Further, a formation area (formation ratio) of the reaction layer of Fe and Al, formed on a joint interface between a steel material and an aluminum alloy material, is 70% or more of a spot welding joining area, and a thickness of this reaction layer is proper. As a result, as apparent from Table 5, it is understood that, in respective Invention Examples, the joined body of dissimilar metals has a joining strength (peeling strength) of 2 kN or higher.

On the other hand, as apparent from Table 5, in respective Comparative Examples 24 to 31 in which a steel plate and a 6000 series aluminum alloy plate having a proper component composition shown in Tables 1 and 2 were used, and treatment was performed under the annealing condition of D, E, F or G having a preferable oxygen partial pressure (dew point) shown in Table 3, naturally, an outer oxide layer and an inner oxide of the steel plate after annealing are within the condition of the present invention. However, in these respective Comparative Examples 24 to 31 using improper spot welding conditions of a to d in Table 4, a content of Fe in a joint interface on the aluminum alloy material side, and a formation area (formation ratio) of the reaction layer of Fe and Al, formed at a joint interface between a steel material and an aluminum alloy material, or a thickness of the reaction layer are improper. As a result, as apparent from Table 5, it is understood that the thickness and formation range of an interface reaction layer of a joined body of dissimilar metals do not satisfy the condition of the present invention, and the joining strength of the joined body of dissimilar metals is remarkably reduced.

In addition, in Comparative Examples 32 to 38, 6000 series aluminum alloy plates having proper component compositions were used, treatment was performed under the annealing condition of E having a suitable oxygen partial pressure (dew point) shown in Table 3, and the welding conditions were the proper spot welding conditions of e and f, thereby, an outer oxide layer and an inner oxide of a steel plate after annealing are approximately within the condition of the present invention. In addition, a content of Fe at a joint interface on the aluminum alloy material side is approximately within the condition of the present invention. However, since steel plate component compositions 19 to 25 shown in Table 1 are improper, being outside a scope of the present invention, the joining strength of a joined body of dissimilar metals is remarkably reduced as apparent from Table 5.

In Comparative Example 32, C was too high, a supercooled texture was generated at a spot welding part, and a crack was generated. In Comparative Example 33, Si was too high, and an optimal reaction layer of Fe and Al could not be formed at a joint interface. In Comparative Example 34, Mn was too high, a supercooled texture was generated at a spot welding part, and a crack was generated. In Comparative Example 35, Al was too high, ductility of a steel material was reduced, the material was brittlely broken in a cross tensile test, and the peeling strength was low. In Comparative Example 36, N was too high, ductility of a steel material was reduced, the material was brittlely broken in a cross tensile test, and the peeling strength was low. In Comparative Example 37, Cr was too high, a supercooled texture was generated at a spot welding part, the material was brittlely broken in a cross tensile test, and the peeling strength was low. In Comparative Example 38, Nb was too high, ductility of a steel material was reduced, the material was brittlely broken in a cross tensile test, and the peeling strength was low.

Therefore, form these facts, critical meaningfulness of a component composition and oxide condition on the steel material side of the present invention is supported. In addition, meaningfulness of the conditions of the present invention in a thickness and a formation range in an interface reaction layer of a joined body of dissimilar metals is seen. In addition, it is understood that, in order that a thickness and a formation range of an interface reaction layer of a joined body of dissimilar metals satisfy the conditions of the present invention, and the joining strength of a joined body of dissimilar metals is enhanced, it is necessary not only to use a steel plate satisfying the oxide conditions, but also to make the welding conditions suitable.

TABLE 1

| | | Chemical component composition of steel material (mass %, wherein N is ppm, reminder is Fe and unavoidable impurities) | | | | | | | | | | | | | |
|---|---|---|---|---|---|---|---|---|---|---|---|---|---|---|---|
| Section | No. | C | Si | Mn | P | S | Al | N | Cr | Mo | Cu | Ni | Nb | Ti | V | Zr |
| Invention | 1 | 0.06 | 0.23 | 0.55 | 0.01 | 0.01 | 0.04 | 21 | 0.06 | 0.02 | 0.00 | 0.00 | 0.05 | 0.07 | 0.00 | 0.00 |
| Examples | 2 | 0.13 | 1.00 | 1.45 | 0.00 | 0.00 | 0.03 | 31 | 0.07 | 0.02 | 0.00 | 0.00 | 0.09 | 0.10 | 0.00 | 0.00 |
| | 3 | 0.08 | 1.69 | 1.23 | 0.00 | 0.00 | 0.03 | 35 | 0.20 | 0.10 | 0.00 | 0.00 | 0.00 | 0.00 | 0.00 | 0.00 |

TABLE 1-continued

| | | Chemical component composition of steel material (mass %, wherein N is ppm, reminder is Fe and unavoidable impurities) | | | | | | | | | | | | | | |
|---|---|---|---|---|---|---|---|---|---|---|---|---|---|---|---|---|
| Section | No. | C | Si | Mn | P | S | Al | N | Cr | Mo | Cu | Ni | Nb | Ti | V | Zr |
| | 4 | 0.28 | 1.45 | 1.60 | 0.02 | 0.01 | 0.02 | 95 | 0.00 | 0.00 | 0.00 | 0.00 | 0.00 | 0.00 | 0.00 | 0.00 |
| | 5 | 0.10 | 1.30 | 2.01 | 0.03 | 0.01 | 1.88 | 77 | 0.80 | 0.00 | 0.00 | 0.00 | 0.00 | 0.00 | 0.00 | 0.00 |
| | 6 | 0.14 | 1.50 | 1.38 | 0.02 | 0.01 | 0.01 | 91 | 0.40 | 0.50 | 0.00 | 0.00 | 0.00 | 0.00 | 0.00 | 0.00 |
| | 7 | 0.10 | 2.66 | 2.05 | 0.03 | 0.01 | 0.01 | 119 | 0.00 | 0.80 | 0.02 | 0.10 | 0.00 | 0.00 | 0.00 | 0.00 |
| | 8 | 0.08 | 2.62 | 1.81 | 0.04 | 0.01 | 0.00 | 184 | 2.20 | 0.00 | 0.00 | 0.00 | 0.00 | 0.00 | 0.00 | 0.00 |
| | 9 | 0.14 | 2.63 | 1.30 | 0.07 | 0.01 | 0.00 | 92 | 0.00 | 2.40 | 0.00 | 0.00 | 0.00 | 0.00 | 0.00 | 0.00 |
| | 10 | 0.17 | 2.71 | 1.26 | 0.05 | 0.01 | 0.01 | 197 | 0.00 | 0.00 | 0.00 | 2.80 | 0.00 | 0.00 | 0.00 | 0.00 |
| | 11 | 0.17 | 1.65 | 1.25 | 0.08 | 0.01 | 0.00 | 71 | 0.20 | 0.00 | 0.00 | 0.11 | 0.05 | 0.00 | 0.00 | 0.00 |
| | 12 | 0.24 | 1.57 | 2.00 | 0.08 | 0.01 | 0.01 | 165 | 0.00 | 0.12 | 0.03 | 0.00 | 0.00 | 0.04 | 0.00 | 0.00 |
| | 13 | 0.21 | 1.96 | 1.68 | 0.08 | 0.01 | 0.00 | 138 | 1.25 | 0.05 | 0.00 | 0.00 | 0.00 | 0.00 | 0.07 | 0.00 |
| | 14 | 0.11 | 1.43 | 1.60 | 0.05 | 0.01 | 0.01 | 126 | 0.00 | 0.00 | 0.04 | 0.22 | 0.00 | 0.00 | 0.00 | 0.01 |
| | 15 | 0.22 | 1.96 | 1.67 | 0.08 | 0.01 | 0.01 | 136 | 0.00 | 0.00 | 0.00 | 0.00 | 0.42 | 0.00 | 0.00 | 0.00 |
| | 16 | 0.26 | 2.66 | 1.92 | 0.07 | 0.01 | 0.00 | 118 | 0.00 | 0.00 | 0.00 | 0.00 | 0.00 | 0.45 | 0.00 | 0.00 |
| | 17 | 0.11 | 2.35 | 2.06 | 0.03 | 0.01 | 0.00 | 84 | 0.00 | 0.00 | 0.00 | 0.00 | 0.00 | 0.00 | 0.80 | 0.00 |
| | 18 | 0.16 | 2.46 | 1.37 | 0.02 | 0.01 | 0.00 | 110 | 0.00 | 0.00 | 0.00 | 0.00 | 0.00 | 0.00 | 0.00 | 0.47 |
| Comparative | 19 | 0.32 | 2.27 | 1.41 | 0.09 | 0.01 | 0.00 | 145 | 0.00 | 0.00 | 0.00 | 0.00 | 0.00 | 0.00 | 0.00 | 0.00 |
| Examples | 20 | 0.20 | 4.80 | 1.90 | 0.01 | 0.00 | 0.03 | 21 | 0.00 | 0.02 | 0.00 | 0.00 | 0.00 | 0.07 | 0.00 | 0.00 |
| | 21 | 0.13 | 0.30 | 3.05 | 0.04 | 0.01 | 0.01 | 206 | 0.00 | 0.00 | 0.00 | 0.00 | 0.00 | 0.00 | 0.00 | 0.00 |
| | 22 | 0.03 | 1.60 | 2.14 | 0.02 | 0.01 | 2.10 | 112 | 0.00 | 0.00 | 0.00 | 0.00 | 0.00 | 0.00 | 0.00 | 0.00 |
| | 23 | 0.16 | 0.23 | 1.94 | 0.06 | 0.01 | 0.01 | 320 | 0.00 | 0.00 | 0.00 | 0.00 | 0.00 | 0.00 | 0.00 | 0.00 |
| | 24 | 0.23 | 0.91 | 2.92 | 0.09 | 0.01 | 0.00 | 137 | 3.20 | 0.00 | 0.00 | 0.00 | 0.00 | 0.00 | 0.00 | 0.00 |
| | 25 | 0.13 | 2.04 | 0.38 | 0.08 | 0.01 | 0.01 | 157 | 0.00 | 0.00 | 0.00 | 0.00 | 0.58 | 0.00 | 0.00 | 0.00 |

TABLE 2

Aluminum alloy material chemical component composition
(mass %, reminder is Al and unavoidable impurities)

| Mg | Si | Cu | Fe | Ti | Mn |
|---|---|---|---|---|---|
| 0.77 | 0.92 | 0.1 | 0.1 | 0.01 | 0.2 |

TABLE 3

| | Annealing condition | | | | Steel plate after annealing | | | |
|---|---|---|---|---|---|---|---|---|
| | | | | | Outer oxide layer | Inner oxide 1 | Inner oxide 2 | |
| Symbol | Atmospheric composition | Temperature (° C.) | Time (sec) | Dew point (° C.) | Length ratio (%) of oxide containing Mn and Si | Area ratio (%) of oxide containing Mn and Si | Area ratio (%) of oxide containing Mn and Si | Section |
| A | $N_2$: 97% $H_2$: 3% | 1000 | 2000 | −80 | 100 | Less than 1% | 0% | Comparative Example |
| B | | | | −60 | 88 | 1% or more and less than 3% | 0.03% | Comparative Example |
| C | | | | −40 | 69 | 3% or more and less than 5.0% | 0.05% | Comparative Example |
| D | | | | −20 | 46 | 5% or more and less than 10% | 0.08% | Invention Example |
| E | | | | 0 | 33 | 5% or more and less than 10% | 1.30% | Invention Example |
| F | | | | 10 | 27 | 5% or more and less than 10% | 1.80% | Invention Example |
| G | | | | 20 | 0.5 | 10% and more and less than 20% | 6.60% | Invention Example |

* Inner oxide 1: oxide present in steel region at depth from body surface of steel plate to 20 μm

* Inner oxide 2: oxide present in steel region at depth from body surface of steel plate to more than 20 μm and 30 μm or less

TABLE 4

| Spot welding condition | Plate thickness (mm) of aluminum alloy plate | | | | | |
|---|---|---|---|---|---|---|
| | 1 | 1 | 1 | 1.6 | 1 | 1.6 |
| Pressurizing force (kN) | 1.5 | 1.5 | 3.5 | 3.5 | 3.0 | 3 |
| Current (kA) | 16 | 16 | 30 | 30 | 16 | 33 |
| Welding time (msec) | 40 | 400 | 40 | 400 | 40 | 60 |
| Electrode | Cu—Cr alloy/dome type | | | | | |
| Positive electrode | Aluminum | | | | | |
| Negative electrode | Steel | | | | | |
| Welding condition pattern | a | b | c | d | e | f |
| Properness of welding condition | x | x | x | x | ○ | ○ |

TABLE 5

| Section | No. | Dissimilar joint condition | | | Joined body of dissimilar metals | | | | |
|---|---|---|---|---|---|---|---|---|---|
| | | Steel species | Annealing condition | Welding condition | Reaction layer average thickness (μm) | Reaction layer formation ratio (%) | Fe concentration in Al at interface (wt %) | Peeling strength (kN) | Assessment |
| Invention Examples | 1 | 1 | D | e | 2.3 | 83 | 1.1 | 2.2 | ○ |
| | 2 | 1 | D | f | 1.6 | 71 | 1.2 | 2.5 | ○ |
| | 3 | 1 | E | e | 1.3 | 75 | 1.1 | 2.3 | ○ |
| | 4 | 1 | E | f | 1 | 90 | 1.9 | 2.1 | ○ |
| | 5 | 1 | F | e | 0.8 | 77 | 1.6 | 2.6 | ○ |
| | 6 | 1 | F | f | 1.5 | 87 | 1.1 | 2.3 | ○ |
| | 7 | 1 | G | e | 1.7 | 78 | 1.2 | 2.9 | ○ |
| | 8 | 1 | G | f | 1.1 | 81 | 1.9 | 2.4 | ○ |
| | 5 | 2 | D | f | 2.2 | 75 | 1.3 | 2.8 | ○ |
| | 6 | 3 | E | e | 1 | 84 | 1.8 | 2.7 | ○ |
| | 7 | 2 | F | e | 0.8 | 89 | 1.2 | 2.5 | ○ |
| | 8 | 3 | G | f | 2.4 | 76 | 1.8 | 2.1 | ○ |
| | 9 | 4 | F | e | 2.6 | 71 | 1.5 | 2.4 | ○ |
| | 10 | 5 | F | f | 1.3 | 84 | 1.1 | 2.9 | ○ |
| | 11 | 6 | F | e | 1.9 | 86 | 1.9 | 2.1 | ○ |
| | 12 | 7 | F | f | 2.7 | 72 | 2.0 | 2.3 | ○ |
| | 13 | 8 | F | e | 0.7 | 79 | 1.7 | 2.5 | ○ |
| | 14 | 9 | F | f | 0.8 | 81 | 1.6 | 2.1 | ○ |
| | 15 | 10 | F | e | 1.0 | 93 | 1.0 | 2.8 | ○ |
| | 16 | 11 | G | f | 1.7 | 78 | 1.5 | 2.1 | ○ |
| | 17 | 12 | G | e | 2.7 | 88 | 1.8 | 2.6 | ○ |
| | 18 | 13 | G | f | 1.6 | 78 | 1.1 | 2.2 | ○ |
| | 19 | 14 | G | e | 0.8 | 71 | 1.9 | 2.3 | ○ |
| | 20 | 15 | G | f | 1.8 | 84 | 2.0 | 2.9 | ○ |
| | 21 | 16 | G | e | 2.5 | 73 | 1.1 | 3.0 | ○ |
| | 22 | 17 | G | f | 0.8 | 85 | 1.0 | 2.5 | ○ |
| | 23 | 18 | G | e | 1.1 | 70 | 1.1 | 2.2 | ○ |
| Comparative Example | 24 | 1 | D | a | 3.9 | 54 | 1.1 | 0.9 | x |
| | 25 | 1 | E | b | 20.3 | 43 | 5.6 | 0.1 | x |
| | 26 | 1 | F | a | 1.5 | 67 | 1.6 | 1.1 | x |
| | 27 | 1 | G | b | 16.3 | 51 | 4.9 | 0.2 | x |
| | 28 | 1 | D | c | 0.6 | 64 | 1.1 | 0.9 | x |
| | 29 | 1 | E | d | 13.7 | 44 | 3.8 | 0.5 | x |
| | 30 | 1 | F | c | 0.9 | 76 | 2.6 | 1.1 | x |
| | 31 | 1 | G | d | 5.2 | 55 | 1.3 | 1.2 | x |
| | 32 | 19 | E | e | 1.1 | 75 | 1.4 | 0.2 | x |
| | 33 | 20 | E | e | 1.3 | 21 | 0.1 | 0.1 | x |
| | 34 | 21 | E | e | 2.1 | 75 | 1.6 | 0.4 | x |
| | 35 | 22 | E | f | 2.3 | 72 | 1.2 | 0.8 | x |
| | 36 | 23 | E | f | 1.9 | 76 | 1.9 | 0.2 | x |
| | 37 | 24 | E | f | 2.7 | 82 | 1.7 | 0.6 | x |
| | 38 | 25 | E | f | 2.9 | 72 | 1.2 | 0.3 | x |

Second Embodiment (Constitution of Oxide of Steel Material)

First, a specific quantitative compositional balance between an outer oxide layer and an inner oxide layer, which is characteristic in the present invention, will be described below.

Oxides on a steel material surface containing Mn and Si, which are annealed under the atmosphere controlled at different oxygen partial pressures after once subjected to pickle (steel material cross-sectional structure), are schematically shown in FIG. 1(a) to FIG. 1(c), respectively. FIG. 1(a) shows the case of annealing under the low oxygen partial pressure (low dew point) atmosphere. FIG. 1(b) shows the case of annealing under the intermediate oxygen partial pressure (relatively high dew point) atmosphere. FIG. 1(c) shows the case of annealing under the high oxygen partial pressure (high dew point) atmosphere. Among them, FIG. 1(a) shows a specific quantitative compositional balance between an outer oxide layer and an inner oxide layer, which is a subject of the present invention.

FIG. 1(a):

In the case of annealing under the low oxygen partial pressure atmosphere of FIG. 1(a), a steel material containing Mn and Si in which the existing outer oxide layer is removed by once subjected to pickle, is such that a steel body surface of the steel material is covered with a thin outer oxide layer having a thickness of around 50 nm. However, since the oxygen partial pressure is low, oxygen does not enter (diffuse) into the interior of the steel material and an inner oxide containing a grain boundary oxide is not formed in the interior of the steel material under the steel body surface. A steel material having a surface texture as shown in FIG. 1(a), that is, a steel material having an outer oxide layer which is destructed more difficult than the outer oxide layer of FIG. 1(b) and FIG. 1(c) described later, and a steel material interior texture having no inner oxide is the steel material which is a subject of the present invention.

This outer oxide layer is an oxide film which is newly generated by annealing, after removal of the existing oxide layer, commonly, including FIG. 1(b) and FIG. 1(c) described later, and is constituted by an oxide containing Mn and Si at a total amount of 1 at % or more in which Mn and Si are concentrated, an oxide including Fe oxide (Fe3O4) and having a content of Mn and Si, as a total amount, of less than 1 at %, and voids. The oxide containing Mn and Si at a total amount of 1 at % or more is constituted by, for example, representatively, an oxide including Mn2SiO4, SiO2 etc. In addition, the oxide having a content of Mn and Si, as a total amount, of less than 1 at is constituted by, for example, representatively, an oxide including Fe3O4.

In such a case of FIG. 1(a), since the steel body surface of a steel material is totally covered with the outer oxide, a ratio occupied by the oxide containing Mn and Si at a total amount of 1% or more, in the outer oxide layer, is as high as 80 to 100% as an average ratio of a total length of this oxide occupying for a length of 1 μm in a substantially horizontal direction of an interface between the steel body and the outer oxide layer. Therefore, such an outer oxide layer has a greater ratio occupied by the oxide containing Mn and Si at a total amount of 1 at or more than that of the outer oxide layer in FIG. 1 (b) or FIG. 1(c) described later, and is destructed with more difficulty. In addition, in the case of the outer oxide layer of FIG. 1(a), an inner oxide is necessarily decreased. Therefore, for example, an inner oxide present in a steel region at a depth from the steel body surface to 20 μm is 0% as an average area ratio occupied by an oxide present in a crystal grain boundary and an oxide ingrains containing Mn and Si at a total amount of 1 at % or more, or is less than 5% even if the inner oxide is present, as shown in Table 8 described later.

Therefore, in a steel material having an outer oxide layer of FIG. 1(a), in the case of spot welding in which this steel material side does not melt, and only the aluminum alloy material side melts, it is necessary that an element having a function of reducing this outer oxide layer is present as a means for forcibly reducing and destructing the outer oxide layer, on a side of a joining surface with an aluminum alloy material. For this reason, in the present invention, an aluminum alloy material to be welded is a 5000 series or 7000 series aluminum alloy material containing Mn at a large amount, for the steel material having an outer oxide layer having a composition such that the layer is destructed with difficulty as described above. Since this Mg has a function of reducing an oxide, even the outer oxide layer which is destructed with difficulty, as in FIG. 1(a) of a steel material, can be destructed by its reducing action, and diffusion of Fe and Al at spot welding can be effectively controlled as necessary and so as not to excessively suppress. As a result, while excessive generation of an Al—Fe-base brittle intermetallic compound layer at a joint interface is suppressed, an Al—Fe-base reaction layer which is requisite minimal for obtaining high joining strength is retained, and the high joining strength is obtained.

FIG. 1(b):

To the contrary, in the case of annealing under the intermediate oxygen partial pressure atmosphere of FIG. 1, in which an oxygen partial atmosphere is relatively higher than that of FIG. 1(a), oxygen enters (diffuses) into the interior of a steel material. For this reason, in the steel material containing Mn and Si, in which the existing outer oxide layer is removed by once subjecting to pickle, together with the outer oxide layer, an inner oxide is formed in a steel region which is relatively shallow in the interior of a steel material under the steel body surface, for example, at a depth from the steel body surface of a steel material to 10 μm or less. In Patent Document 7, the same condition of an outer oxide layer and an inner oxide layer, even when the welding procedure and the material combination of an aluminum alloy material and a steel material to be welded are different, is the condition of this FIG. (b).

Among these inner oxides, oxides generated in grains are the oxide containing Mn and Si at a total amount of 1 at % or more, a spherical to particulate oxide including SiO2 and Mn2SiO4, and the oxide such as Fe3O4 containing Mn and Si at a total amount of less than 1 at %, commonly, including FIG. 1(c) described later. In addition, thereupon, grain boundary oxides are also formed on the grain boundary of a steel, commonly, including FIG. 1(c) described later, but these grain boundary oxides are particulate oxides containing Mn and Si at a total amount of approximately 1 at % or more. As an oxygen partial pressure of atmospheric annealing becomes higher, oxygen enters (diffuses) into the further more interior of a steel material, or more oxygen becomes to enter (diffuse), and a region where these inner oxides is present is extended, or an amount of these inner oxides is increased.

On the other hand, contrary to these inner oxides, as an oxygen partial pressure of atmospheric annealing becomes higher, a ratio occupied by an oxide containing Mn and Si in an outer oxide layer begins to be decreased. That is, in the outer oxide layer in FIG. 1(b), the ratio occupied by the oxide containing Mn and Si at a total amount of 1 at % or more becomes 50 to 80% as an average ratio of a total length of this oxide occupying for a length of 1 μm in a substantially horizontal direction of an interface between the steel body and the outer oxide layer, and becomes lower than the case of FIG. 1(a).

FIG. 1(c):

FIG. 1(c) shows the case of atmospheric annealing under a high oxygen partial pressure, in which an oxygen partial pressure is further higher than that of FIG. 1(b), and shows a specific quantitative compositional balance between an outer oxide layer and an inner oxide layer, which is characteristic in the present invention. In FIG. 1(c), oxygen enters (diffuses) into the further more interior of a steel material than in FIG. 1(b). For this reason, in the steel material containing Mn and Si, in which the existing outer oxide layer is removed by once subjecting to pickle, together with the outer oxide layer, the inner oxide is formed in a region which is relatively deep in the interior of a steel material under the steel body surface, and in the further more interior of a steel material. These inner oxides are mainly formed in a steel region at a depth from the steel body surface of this steel material to 20 μm.

To the contrary, the ratio occupied by the oxide containing Mn and Si in the outer oxide layer is further more decreased in the case of FIG. 1(c) than in the case of FIG. 1(b). That is, in the case of FIG. 1(c), the ratio occupied by the oxide containing Mn and Si at a total amount of 1 at % or more in the outer oxide layer becomes as lowest as 0.1% or more and less than 50%, as an average ratio of a total length of this oxide occupying for a length of 1 μm in a substantially horizontal direction of an interface between the steel body and the outer oxide layer. Such an outer oxide layer has the smallest ratio occupied by the oxide containing Mn and Si at a total amount of 1 at % or more than the outer oxide layer of FIG. 1(a) or FIG. 1(c), and is more easily destructed.

Herein, an outer oxide layer on a surface of a steel material such as a normal soft steel material is usually constituted by oxides such as αFeOOH, γFeOOH, amorphous oxyhydroxide, and Fe3O4. To the contrary, the outer oxide layer on a steel material surface, which is a high-strength steel material containing Mn and Si as in the present invention, and was annealed under the atmosphere having a controlled partial pressure as described above after once subjecting to pickle is constituted by the oxide containing Mn and Si at a total amount of 1 at % or more, and as the reminder, the oxide such as Fe3O4 containing Mn and Si at a total amount of less than 1 at %, and voids.

(Action of Outer Oxide Layer)

At welding joining between the steel material and the aluminum alloy material of FIG. 1, an Al—Fe reaction layer is formed on a joining surface between the steel material and the aluminum alloy material, breaking the outer oxide layer on a steel material surface. In this respect, the outer oxide layer on a steel material surface has the effect of suppressing diffusion of Fe and El at joining to suppress generation of an Al—Fe-base brittle intermetallic compound layer (reaction layer).

However, in the case of dissimilar joint such as spot welding between an aluminum alloy material and a steel material, such an effect is not uniformly exerted if there is an outer oxide layer of the aforementioned composition on a steel material surface, but it greatly depends on a ratio of the oxide phase containing Mn and Si at a constant ratio. That is, in the case of FIG. 1(a), a ratio occupied by an oxide containing Me and Si at a total amount of 1 at % or more in an outer oxide layer is greatest, and a barrier effect of suppressing diffusion of Fe and Al at joining, and an effect of suppressing generation of an Al—Fe-base brittle intermetallic compound layer (reaction layer) become greatest among three outer oxide layer types of FIG. 1. To the contrary, in the case of the FIG. 1(c), the ratio occupied by an oxide containing Mn and Si at a total amount of 1 at % or more in an outer oxide layer is smallest, and the barrier effect of suppressing diffusion of Fe and Al at joining, and the effect of suppressing generation of an Al—Fe-base brittle intermetallic compound layer (reaction layer) become smallest among three outer oxide layer types of FIG. 1. In the case of FIG. 1(b), the ratio occupied by an oxide containing Mn and Si at a total amount of 1 at % or more in an outer oxide layer, as well as the barrier effect of suppressing diffusion of Fe and Al at joining, and the effect of suppressing generation of an Al—Fe-base brittle intermetallic compound layer (reaction layer) become intermediate among three outer oxide layer types of FIG. 1.

Herein, in the case of spot welding in which the steel material side does not melt, and only the aluminum alloy material side melts, with the outer oxide layer which is destructed with relative difficulty of FIG. 1(a) or FIG. 1(b), even if the aluminum alloy side melts, it becomes difficult to break an outer oxide layer on a steel material surface by reduction to promote diffusion of Fe from the steel material side, at an interface with a steel material. As a result, it becomes difficult to form an Al—Fe reaction layer having a thickness which is requisite minimal for metallurgic joining at a joining part in a wide range as much as possible.

Therefore, in a steel material having the outer oxide layer of FIG. 1(a) or FIG. 1(b), in the case of spot welding in which this steel material side does not melt, and only the aluminum alloy material side melts, as described above, it is necessary that, as a means for forcibly reducing and destructing an outer oxide layer, an element having a function of reducing this outer oxide layer is present on the joining surface side with an aluminum alloy material. In the present invention, such an aluminum alloy material is a 5000 series or 7000 series aluminum alloy material containing much Mg, which is the element having a function of reducing and destructing the outer oxide layer.

One of the great reasons why the joining body of dissimilar metals which is produced by joining a 6000 series aluminum alloy material and a steel material of Patent Document 7 has a joining strength in an example of spot welding of less than 2 kN at highest, and a joining strength of 2 kN or more was not obtained is that there is no means for forcibly reducing and destructing an outer oxide layer. In Patent Document 7, an outer oxide layer newly generated on a high-strength steel plate surface is the same as the outer oxide layer in FIG. 1(b), and the average ratio is too great as 50% or more (50 to 80%). As a result, the outer oxide layer serves excessively as a barrier which is not easily destructed for a 6000 series aluminum alloy material containing no alloy element which is to be a strong reducing agent, and it becomes difficult to promote diffusion of Fe from the steel material side, at welding.

Therefore, in dissimilar joint such that a 6000 series aluminum alloy material and a steel material are spot-welded, spot welding in which the steel material side dose not melt, and only the aluminum alloy material side melts, wherein it is advantageous that the ratio occupied by the oxide containing Mn and Si at a total amount of 1 at % or more, in the outer oxide layer, is made to be less than 50% as an average ratio of a total length of this oxide occupying for a length of 1 μm in a substantially horizontal direction of an interface between the steel body and the outer oxide layer, as in the case of FIG. 1(c).

However, in the present invention, the subject steel material is daringly a steel material having an outer oxide layer in which the ratio occupied by an oxide containing Mn and Si at a total amount of 1 at % or more is 80 to 100%, preferably 90 to 100%, of the FIG. 1(a). This is because there is a case where a composition of an outer oxide layer of the steel material side cannot be made proper to the condition of FIG. 1(c), or a case where the steel material which is made proper cannot be used, depending on the condition for producing a steel material, and restriction of a steel material used, as described above. According to the above description, in the outer oxide layer in FIG. 1(a), if there is no alloy element to be a strong reducing agent on a joining surface, the outer oxide layer serves excessively as a barrier which is not easily destructed for an aluminum alloy material, and it becomes difficult to promote diffusion of Fe from the steel material side, at welding.

(Presence of Mg at Joining Surface)

For this reason, in the present invention, an alloy composition of an aluminum alloy material to be welded is a 5000 series or 7000 series aluminum alloy material containing much Mg as an element having a function of reducing the outer oxide layer, for a steel material having an outer oxide layer of the composition such that the layer is destructed with difficulty. Thereby, Mg is made to be present on a joining surface by a melted aluminum alloy material, an outer oxide layer, which is destructed with difficulty, of a steel material is destructed by the reducing action of this Mg, and diffusion of Fe and Al at spot welding is effectively controlled as necessary and so as not to excessively suppress.

Thereby, in the case of spot welding such that the steel material side does not melt, and only the aluminum alloy material side melts, an average thickness of a reaction layer at spot welding joint interface is controlled in an optimal range of 0.1 to 10 μm, as described later. As a result, particularly, regarding a joined body of dissimilar metals in which a 6000 series aluminum alloy material and a steel material are spot-welded, a high joining strength of 2 kN or more is obtained.

In order to make Mg present on the joining surface, and to obtain the reducing and destructing action of these outer oxide layers, a content of Mg in a 5000 series or 7000 series aluminum alloy material is 1.0% or more. When the Mg content is less than 1.0%, a presence amount of Mg on the joining surface is deficient, and this effect of Mg is deficient.

(Steel Material Inner Texture)

As described above, in a steel material which is a subject of the present invention, this inner oxide becomes small in an amount, and is not positively present. In this respect, absence of this inner oxide includes not only the state where there is no inner oxide, but also the case where a minor amount of an inner oxide is present, as in Table 8 described later, from a range (variation) of a steel material composition and annealing condition. When this state is quantitatively expressed, it is preferable that a ratio (density) occupied by an inner oxide 1 (a grain boundary oxide present in a steel region at a depth from a steel body surface of a steel plate of up to 10 μm, and oxide in grains containing Mn and Si at a total amount of 1 at % or more) is less than 5% (including 0%) as an average area ratio occupied in a field area of this steel region within 10 μm². In addition, further, it is preferable that a ratio occupied by an inner oxide 2 (a grain boundary oxide present in a steel region at a depth from a steel body surface of steel plate of more than 10 μm and 20 μm or less, and an oxide in grains containing Mn and Si at a total amount of 1 at % or more) is 0.1% or less (including 0%) as an average area ratio occupied in a field area of this steel region within 10 μm².

In addition, among the inner oxide, as an oxide generated in grains, there are a spherical to particulate oxide containing Mn and Si at a total amount of 1 at % or more, and an oxide such as Fe3O4 containing Mn and Si at a total amount of less than 1 at %, as described above and, on the other hand, an oxide formed on a grain boundary of a steel is a particulate oxide containing Mn and Si at a total amount of approximately 1 at % or more. Then, in the present invention, in definition of an inner oxide, a ratio occupied by an oxide present in a grain boundary, and an oxide present in a crystal grain, containing Mn and Si at a total amount of 1 at % or more, was defined.

(Method of Measuring Oxide)

Measurement of an oxide in the present invention is performed with TEM (transmission electron microscope) at a magnification of 10000 to 30000 using EDX (energy dispersive X-ray spectroscopy) jointly. That is, an outer oxide is specified by obtaining a total amount of Mn and Si in an outer oxide layer in the vicinity of an interface by analyzing an interface between a steel body and an outer oxide layer in a substantially horizontal direction, in a cross section in a thickness direction of a steel material, and distinguishing a phase of the oxide in the vicinity of an interface containing Mn and Si at a total amount of 1 at % or more (a plurality of oxides) from other phases. Then, a length in the substantially horizontal direction in the interface, of this oxide phase containing Mn and Si at a total amount of 1 at % or more, in the same interface region as that of this EDX analysis is obtained. A ratio of a total length of this oxide phase, occupying for a length of 1 μm in a substantially horizontal direction of an interface is obtained. This is performed at a plurality of places, and these are averaged.

An inner oxide which is unnecessary in the present invention is specified by distinguishing an oxide containing Mn and Si at a total amount of 1 at % or more, in the aforementioned plurality of places of a prescribed steel region at a depth from a steel body surface of a steel material to 10 μm or less, or more than 10 μm and 20 μm or less by the EDX. Each area ratio occupied in a field area of 10 μm² of this oxide phase containing Mn and Si at a total amount of 1 at % or more, in the same surface region as that of this EDX is obtained by TEM. Herein, an area occupied by a grain boundary oxide in this steel region is added to the area ratio occupied by the inner oxide, as an inner oxide containing Mn and Si at a total amount of 1 at % or more in this steel region, as described above. This is performed at a plurality of places, and these are averaged.

(Oxide Layer Control)

Control of outer oxides and inner oxides of these steel materials can be performed by controlling the annealing conditions of steel materials (oxygen partial pressure), as described above. More specifically, control can be performed by changing an oxygen partial pressure (dew point) in the annealing atmosphere of a steel material. In any steel species, when the oxygen partial pressure (dew point) is high, an amount of an oxide in which Mn and Si in an outer oxide layer on a steel material surface are concentrated becomes small. In addition, the interior of a steel is also oxidized, inner oxidation and grain boundary oxidation proceed, SiO2, Mn2SiO4 etc. are formed in the steel, and an area ratio of an oxide containing Mn and Si occupied in the steel is increased.

On the other hand, in any steel species of a high-strength steel, when the oxygen partial pressure (dew point) is low, an oxide such as Mn2SiO4 or SiO2 in which Mn and Si are concentrated in an outer oxide layer on a steel material surface is formed, but an amount thereof and an area ratio thereof are increased. On the other hand, oxidation in the interior of the steel proceeds with difficulty, an amount of SiO2, Mn2SiO4 or the like to be formed in the steel is reduced, and an area ratio of an oxide containing Mn and Si occupied in the steel is reduced.

(Reaction Layer at Joint Interface of Joined Body of Dissimilar Metals)

In the joined body of dissimilar metals in which a steel material whose oxide layer on a surface is controlled and an aluminum material are joined by welding as described above, high joining strength is obtained by using the proper welding condition. However, even when the condition of the welding material side is adjusted, high joining strength cannot be realized in some cases, depending on the welding application condition (welding condition).

For this reason, it is necessary to define the condition for obtaining high joining strength, seen from the side of the joined body of dissimilar metals, and also to optimize the welding condition by controlling so as to be suitable for this condition of the side of the joined body of dissimilar metals. Therefore, in the present invention, preferably, the spot welding condition for obtaining high joining strength as a joined body of dissimilar metals is defined.

As described above, when seen from the side of the joined body of dissimilar metals, it is necessary to form a reaction layer of Fe and Al having a thickness which is requisite minimal for metallurgic joining at a joining part in a wide range as much as possible. That is, first, it is necessary to control an average thickness in a nugget depth direction of a reaction layer (plate thickness direction of steel material) at a joint interface with an aluminum material, as the thickness which is requisite minimal for metallurgic joining, in a range of 0.1 to 10 µm.

The welding joint interface between a steel material and an aluminum material has a laminated Al5Fe2-based compound layer on the steel material side, and a layer in which a particulate or needle-like Al3Fe-based compound and an Al19Fe4Si2Mn-based compound are present in admixture on the aluminum material side, respectively, as the reaction layer.

When the thickness in a nugget depth direction of each of these brittle reaction layers is more than 10 µm, the joining strength is remarkably reduced. On the other hand, when the thickness in a nugget depth direction of the reaction layer is less than 0.1 µm, metallurgic joining becomes insufficient, and sufficient joining strength is not obtained. Therefore, the average thickness of the reaction layer at the joint interface between a steel material whose oxide layer on a surface is controlled and an aluminum material is in a range of 0.1 to 10 µm.

(Formation Range of Reaction Layer)

Then, it is necessary that the reaction layer of Fe and Al in the joined body of dissimilar metals is formed at a joining part in a wide range as much as possible. That is, it is preferable that the formation range of the reaction layer after joining is an area of 70% or more of a joining area (substantially horizontal direction of steel material, direction orthogonal to nugget depth direction), in point welding such as spot welding and FSW (friction stirring joining).

When the reaction layer is not such that it is formed in the proper thickness range and, moreover, this proper thickness range is uniform in a wide range as much as possible, there is a possibility that metallurgic joining cannot be assuredly attained. To the contrary, when the reaction layer in the proper thickness range is formed by the aforementioned 70% or more, sufficient joining strength is assuredly obtained.

(Measurement of Reaction Layer at Joint Interface of Joined Body of Dissimilar Metals)

In measurement of the reaction layer in the present invention, a joining part between a steel material and an aluminum material is cut, a joint interface is observed from a cross section with SEM (scanning electron microscope), and the measurement of the reaction layer is performed, as in Examples described later.

(Chemical Component Composition of Steel Material)

First, a component composition of a steel material which is a subject of the present invention will be described below. In the present invention, a main subject is a high-strength steel material having a tensile strength of 450 MPa or more and containing Si, Mn etc. Further, a subject is a steel material in which an outer oxide layer containing a prescribed amount of Si, Mn etc. can be newly generated, when the existing oxide layer on a surface is once removed by pickle and, further, annealed in the atmosphere having a controlled oxygen partial pressure.

For this reason, regarding the component composition of a steel material, on the assumption that a prescribed amount of Si, Mn etc. are contained, the composition is such that C: 0.01 to 0.30%, Si: 0.1 to 3.00% and Mn: 0.1 to 3.00% are contained as expressed by mass %, respectively, and preferably, the reminder includes Fe and unavoidable impurities. In addition, the composition may be such that, in addition to this, Al: 0.002 to 0.1% is further contained, and the reminder includes Fe and unavoidable impurities. In addition, the composition may be such that, further, in addition to this Al, or in place of Al, one kind or two or more kinds of Nb: 0.005 to 0.10%, Ti: 0.005 to 0.10%, Zr: 0.005 to 0.10%, Cr: 0.05 to 3.00%, Mo: 0.01 to 3.00%, Cu: 0.01 to 3.00% and Ni: 0.01 to 3.00% are contained, and the reminder includes Fe and unavoidable impurities.

Herein, since P, S, N etc. as impurities of a steel material reduce various properties such as toughness, ductility or joining strength of a steel material, P is regulated at 0.10% or less (including 0%), S is regulated at 0.05% or less (including 0%), and N is regulated at 300 ppm or less (including 0%), respectively. In addition, a unit of a chemical component (content of each element) in the present invention is mass % in all cases including an aluminum alloy.

The reasons why respective component elements of a steel material are limited, are as follows.

C:

C is an element necessary for increasing strength, but when a content is less than 0.02%, the strength of a steel material cannot be secured and, when a content exceeds 0.3%, cold workability is reduced. Therefore, the content of C is in a range of 0.02 to 0.3%.

Si or Mn:

Si or Mn forms the outer oxide layer containing a prescribed amount of Si or Mn on a surface of a steel material. This outer oxide layer, in the case of dissimilar joint between Fe and Al, interferes with diffusion of Fe and Al from the mutual base material side, and can suppress formation of a brittle intermetallic compound to the minimum. In addition, those elements serve for improving brittleness of an intermetallic compound.

Further, Si or Mn forms the inner oxide layer containing a prescribed amount of Si or Mn in the interior of a steel material. This inner oxide layer forms a solid solution into an Al—Fe reaction layer formed by breaking an outer oxide layer on a steel material surface, and prevents diffusion of Fe and Al from a mutual base material side to suppress excess generation of a reaction layer.

Therefore, when a content of Si or Mn in a steel material is too small, the outer oxide layer or the inner oxide layer is deficient, and the joining strength of a joined body of dissimilar metals cannot be improved, as described later. On the other hand, when a content of Si or Mn in a steel material is too large, joining strength of a joined body of dissimilar metals is conversely reduced, as described later. For this reason, in order to form a proper outer oxide layer or inner oxide layer, it is necessary that Si or Mn in a steel material is in a range of the content defined in the present invention.

Si:

Si is also important as an element which can retain necessary strength without deteriorating ductility of a steel material and, for realizing this, a content of 0.1% or more is necessary. On the other hand, when Si is contained at more than 3.00%, ductility is deteriorated. Therefore, a Si content is in a range of 0.1 to 3.00%, also for this reason.

Mn:

Mn is also indispensable as an element for retaining the strength and toughness of a steel material and, when a content thereof is less than 0.1%, the effect thereof is not obtained. On the other hand, when a content thereof exceeds 3.00%, the strength is remarkably increased, and cold working becomes difficult. Therefore, a Mn content is in a range of 0.1 to 3.00%, also for this reason.

Al:

Al is an element which captures solid-dissolved oxygen as a deoxidizing element of a molten steel and, at the same time, prevents generation of a blowhole to improve toughness of a steel. When an Al content is less than 0.002%, the sufficient these effects cannot be obtained and, on the other hand, when a content thereof is more than 0.1%, this conversely deteriorates weldability, and deteriorates toughness of a steel by increase in an alumina-based inclusion. Therefore, the Al content is in a range of 0.002 to 1.0%.

One or two or more kinds of Nb, Ti, Zr, Cr, Mo, Cu, and Ni:

Inclusion of one or two or more kinds of Nb, Ti, Zr, Cr, Mo, Cu, and Ni, commonly, contribute to high strengthening and high toughening of a steel.

Among them, Ti, Nb and Zr are precipitated as a nitride carbide into a steel to enhance strength, and make a microtexture of a steel into fine to improve strength, toughness etc. However, when they are contained at a large amount, this considerably deteriorates toughness. Therefore, when they are contained, Nb is in a range of 0.005 to 0.10%, Ti is in a range of 0.005 to 0.10%, and Zr is in a range of 0.005 to 0.10%, respectively.

In addition, among them, Cr, Mo, Cu, and Ni improve hardenability of a steel, and improve strength of a steel. However, when they are contained at a large amount, this considerably deteriorates toughness of a steel. Therefore, when they are contained, Cr is in a range of 0.05 to 3.00%, Mo is in a range of 0.01 to 3.00%, Cu is in a range of 0.01 to 3.00%, and Ni is in a range of 0.01 to 3.00%.

(Strength of Steel Material)

In the present invention, strength of a steel material used is not particularly limited, but when utility of an automobile member is assumed, it is preferable that a tensile strength of a steel material is 400 MPa or more. In the case of a steel having strength lower than this, since there are generally many low-alloy steels, and an oxide film is approximately an iron oxide, diffusion of Fe and Al becomes easy, and a brittle reaction layer is easily formed. In addition, since an amount of Si or Mn is small, the oxide containing Si or Mn necessary for suppressing diffusion of Fe and Al of a base material in the present invention is formed with difficulty on a surface or in the interior of a steel, a composition or a thickness of an outer or inner oxide (layer) containing Si or Mn cannot be controlled, and it becomes difficult to control a reaction layer at welding. Further, since the strength of a steel material is deficient, deformation of a steel material becomes great by pressurization due to an electrode chip at spot welding, and an oxide film is easily destructed and, therefore, a reaction with aluminum is abnormally promoted, and a brittle intermetallic compound is easily formed.

(Aluminum Alloy Material)

An aluminum alloy material used in the present invention is a 5000 series aluminum alloy material in AA to JIS specification which is Al—Mg-base, or a 7000 series aluminum alloy material in AA to JIS specification, which is Al—Zn—Mg-base or Al—Zn—Mg—Cu-base, having a Mg content of 1.0% by mass or more, in order to make Mg present on the joining surface, and obtain the action of reducing and destructing these outer oxide layers. A shape of this alloy material is not particularly limited depending on each part utility of an automobile vehicle body, and the plate material, the formed material, the forged material, and the cast material which are widely used are appropriately selected. In this respect, regarding strength of an aluminum material, the strength is desirably higher for suppressing deformation due to pressurization at spot welding, as in the case of the steel material.

5000 Series Aluminum Alloy Material:

It is preferable that the 5000 series aluminum alloy material contains Mg: 2.0 to 6.0% by mass and, further, contains one or two or more kinds selected from Fe, Mn, Cr, Zr and Cu at a total of 0.03 to 2.5% by mass, and the reminder including Al and unavoidable impurities, in order to satisfy various properties such as moldability, a strength, weldability, corrosion resistance etc. in utility of the automobile vehicle body, in addition to the action of reducing and destructing an outer oxide layer of a steel material due to the inclusion of Mg.

(Impurities)

Elements other than these described elements are fundamentally impurities. In this respect, when not only a high purity Al bare metal as a fusing material, but also an Al alloy scrap material, and a low purity Al bare metal as a fusing raw material are used from a view point of recycle of an Al alloy, impurity elements are mixed therein. Reduction of these impurities elements to, for example, a detection limit or lower, itself, becomes the cost up, and acceptance of inclusion to some extent becomes necessary. Therefore, inclusion of elements other than the described elements in such a range that the object and the effect of the invention are not inhibited is acceptable. For example, inclusion of Si: 0.5% or less, V: 0.3% or less, Ti: 0.5% or less, B: 0.05% or less, and Zn: 0.5% or less is acceptable, respectively. In addition, inclusion of other elements as the unavoidable impurities in such a range that the necessary properties of the present invention are not inhibited, is acceptable.

Mg:

Mg enhances the processing hardening ability, and retains a strength and durability necessary in utility of an automobile vehicle body. In addition, Mg uniformly plastically deforms a material to improve a limit of breakage cracking, and improves moldability. When a content of Mg is less than 2.0%, exertion of these effects of inclusion of Mg becomes insufficient. On the other hand, a content of Mg exceeds 6.0%, production of a rolled plate or an extruded material becomes difficult and, moreover, grain boundary breakage conversely becomes to occur easily at molding, and moldability is remarkably reduced. Therefore, a content of Mg is in a range of 2.0 to 6.0% by mass.

Fe, Mn, Cr, Zr and Cu:

Fe, Mn, Cr, Zr and Cu are effective in miniaturizing crystal grains by inclusion at a small amount, and improve moldability by inclusion of a small amount. When a total of each content is less than 0.03%, there is no effect of inclusion and, on the other hand, when a total of each content of these respective elements exceed 2.5%, coarse crystallized substances and precipitates due to these elements are increased, and these easily become an origin of brakeage, and conversely reduce moldability etc. Therefore, a content of one or two or more kinds selected from Fe, Mn, Cr, Zr and Cu is in a range of 0.03 to 2.5% by mass, at a total.

7000 Series Aluminum Alloy Material:

It is preferable that the 7000 series aluminum alloy material also contains Zn: 4.5 to 6.5%, Mg: 1.0 to 2.0%, and Fe: 0.01 to 0.40%, by % by mass, respectively, and the reminder including aluminum and unavoidable purities, in order to satisfy the aforementioned various properties such as a strength, bending crushability and corrosion resistance as a reinforcing material of an automobile vehicle body, in addition to the action of reducing and destructing an outer oxide layer of a steel material due to the inclusion of Mg. Further in addition to this composition, one or two or more kinds of Mn: 0.01 to 0.6%, Cr: 0.01 to 0.2%, Zr: 0.01 to 0.25%, and Ti: 0.001 to 0.10% may be further selectively contained at a total amount of 0.30% or less. Further, Cu: 0.01 to 0.2% may be further selectively contained.

Elements other than them are fundamentally impurities, and a content at each impurities level (acceptable amounts) in line with AA to JIS specification is used. However, when not only a high purity Al bare metal as a fusing material, but also a 7000 series alloy and other aluminum alloy scrap material, and a low purity Al bare metal as a fusing raw material are used at a large amount from a view point of recycle, there is a high possibility that impurity elements are mixed therein. Reduction of these impurity elements to, for example, a detection limit or lower, itself, becomes the cost up, and acceptance of inclusion to some extent becomes necessary. Therefore, inclusion of other elements in each range of an acceptable amount in line with AA to JIS specification is acceptable.

(Zn, Mg)

Zn or Mg which is an essential alloy element forms a fine dispersion phase such as MgZn2 and Mg32AlZn49 called a GP zone or an intermediate precipitation phase to improve a strength, by artificial ageing treatment of an alloy material. Particularly, Zn has the effect of improving a balance between a strength and ductility. When a content of Zn or Mg is too small, such as less than 0.5% of Zn and less than 1.0% of Mg, these fine dispersion phases are deficient, and a strength is reduced. In addition, when a Mg content is less than 1.0% by mass, an existence amount of Mg on the joining surface is deficient, and the action of reducing and destructing an outer oxide layer of a steel material by the inclusion of Mg is deficient.

On the other hand, when a content of Zn or Mg is too large, such as more than 6.5% of Zn and more than 2.0% of Mg, the number or the number density of grain boundary precipitates which become an origin of breakage are increased and, particularly, in an extruded material, bending crushability and corrosion resistance are remarkably reduced. When a content of Zn or Mg is too large, since Zn or Mg cannot form a solid solution into Al, a coarse crystallized substance is formed, this becomes a cause for reduction in a strength and elongation of an aluminum alloy material, and cold workability is also remarkably reduced. Therefore, each content is in a range of Zn: 4.5 to 6.5%, and Mg: 0.5 to 2.0, respectively.

(Fe)

Fe is easily mixed in at a large amount from a fusing raw material such as a scrap, but can improve a strength of an aluminum alloy material due to the precipitation effect. When a content of Fe is two small, such the effect cannot be expected and, when a content of Fe is too large, the number or the number density of the grain boundary precipitates or crystallized substances is increased and, in particular, in an extruded material, crushability and corrosion resistance are remarkably reduced. In addition, when Fe is excessive, coarse crystallized substances or precipitates are formed, and this conversely becomes a cause for reduction in a strength and elongation (ductility). Therefore, Fe is in a range of 0.01 to 0.40%.

(Mn, Cr, Zr and Ti)

Mn, Cr, Zr and Ti are also easily mixed in at a large amount from a fusing raw material such as a scrap, but can improve a strength of an aluminum alloy material due to the precipitation effect. Ti also has the effect of miniaturizing crystal grains of an ingot, and making an extruded material texture into fine crystal grains. When a content of these elements is too small, such the effect cannot be expected and, when the content of them is too large, the number or the number density of grain boundary precipitates is increased, and bending crushability and corrosion resistance are remarkably reduced. When a content of them is too large, a coarse precipitate is formed, and this conversely becomes a cause for reduction in a strength and elongation (ductility). Therefore, when one wants to obtain such the effect, one or two or more kinds of Mn, Cr, Zr and Ti, and one or two or more kinds of Mn: 0.01 to 0.6%, Cr: 0.01 to 0.2%, Zr: 0.01 to 0.25%, and Ti: 0.001 to 0.10% are selectively contained in a range of 0.30% or less at a total amount of them.

(Cu)

Cu improves a strength and elongation by enhancement of formation of a solid solution. When Cu is too small in an amount, such the effect cannot be expected and, when a content of Cu is too large, the number or the number density of grain boundary precipitates is increased, and bending crushability and corrosion resistance are remarkably reduced. When a content of Cu is too large, a precipitate becomes coarse, and a strength and elongation are conversely reduced. Therefore, in the case of selective inclusion, a content of Cu is in a range of 0.01 to 0.2%.

(Thicknesses of Steel Material and Aluminum Alloy Material)

In addition, a thickness (plate thickness etc.) of apart to be welded of a steel material or an aluminum alloy material is not particularly limited, but is appropriately selected or determined from the design conditions such as necessary strength and necessary rigidity of an application member including an automobile member.

However, when an automobile member is assumed, practically, a thickness t (of a part to be welded) of a steel material is selected from 0.3 to 3.0 mm. When the thickness of a steel material is too small, strength and rigidity necessary as an automobile member cannot be ensured, being improper. Additionally, for example, in the case of spot welding, since deformation of a steel material is great, and an oxide film is easily destructed by pressurization with its electrode chip, a reaction with aluminum is promoted. As a result, it becomes easy to form an intermetallic compound. On the other hand, when the thickness of a steel material is too great, spot welding joining itself becomes difficult.

In addition, similarly when an automobile member is assumed, a thickness t (of a part to be welded) of an aluminum alloy material, is selected from a range of 0.3 to 5.0 mm. When the thickness of an aluminum alloy material is too small, strength as an automobile member is deficient, and this is improper and, additionally, a nugget diameter is not obtained, and since melting reaches an aluminum material surface, and a dust is easily generated, there is a possibility that: high joining strength is not obtained. On the other hand, when the thickness of an aluminum alloy material is too great, welding joining itself becomes difficult, like the case of the thickness of a steel material plate.

(Joining Method)

In addition, in the present invention, as a welding method, welding such that the steel material side does not melt, and only an aluminum material alloy material side melts is selected, as a premise. In this respect, the welding method is limited to spot welding, or friction spot joining (also referred to as friction stirring joining, FSW, or spot FSW). That is, MIG welding and laser welding in which both of the steel material side and the aluminum alloy material side melt are exempt, and welding procedures such as ultrasound joining, diffusion joining, friction pressure joining, and brazing in which both of the sides do not melt are exempt. In addition, due to easy adoption of productivity and suitable condition, joining by spot welding is more preferable than friction spot joining.

In addition, as the preferable conditions for every joining place of spot welding for realizing that the steel material side does not melt, and only the aluminum alloy material side melts, an interelectrode current of 10 to 35 kA is passed for 200×tmsec or shorter, in a relationship with a thickness t mm of an aluminum alloy material part to be joined, at an interelectrode pressure of 2.0 to 3.0 kN. Under the improper spot welding conditions such as a to d shown in Table 9 described later, which are out of the conditions, high joining strength of a joined body of dissimilar metals is not obtained.

Example 2

Dissimilar joint by spot welding was performed below, respectively, as Examples, and joined bodies of dissimilar metals were manufactured. The joining strength of each of these joined bodies of dissimilar metals was measured, and assessed.

Specifically, a steel plate obtained by smelting a steel material at each component composition shown in Table 6 and rolling to a thickness of 1.2 mm was once subjected to pickle to remove the existing surface oxidized layer, thereafter, an oxygen partial pressure (dew point) in the annealing atmosphere was variously changed under each condition of A, B, C, D and E shown in Table 8, provided that an annealing temperature and an annealing time were commonly fixed such that the annealing temperature was 700° C., and the annealing time was 200 sec, thereby, steel plates having different oxidization structures of a surface and a surface layer were manufactured. Herein, steel plates having respective component compositions shown in Table 6 are all high-strength steel plates which are subjects of the present invention, and tensile strengths of respective steel plates are all in a range of 780 to 1280 MPa, which is 450 MPa or more.

Respective oxidation structures such as an outer oxide layer composition and an inner oxide layer composition of respective steel materials after annealing are shown in Table 8, respectively. Among the annealing conditions shown in Table 8, A, B and C in which an oxygen partial pressure (dew point) is low are preferable annealing condition under which steel materials having respective oxidation structures which are a joining subject of the present invention are obtained. As shown in Table 8, the annealing conditions A, B and C are such that an outer oxide layer and an inner oxide of a steel plate after annealing satisfy the condition of the present invention. That is, a ratio occupied by an oxide containing Mn and Si at a total amount of 1 at % or more in an outer oxide layer is such that an average ratio of a total length of this oxide occupying for a length of 1 μm in a substantially horizontal direction of an interface between a steel body and an outer oxide layer is in a range of 80 to 100%, preferably 90 to 100% (annealing condition A, B).

In addition, in the annealing conditions A, B and C, as an inner oxide 1 (present in a steel region at a depth from a steel body surface of a steel plate of 10 μm or less), a ratio (density) occupied by an inner oxide containing Mn and Si at a total amount of 1 at % or more is less than 5% (including 0%), as an average area ratio occupied in a field area of this steel region within 10 μm². Further, as an inner oxide 2 (present in a steel region at a depth from a steel body surface of a steel plate of more than 10 μm and 20 μm or less), a ratio occupied by an inner oxide containing Mn and Si at a total amount of 1 at % or more is 0.1% or less (including 0%), as an average area ratio occupied in a field area of this steel region within 10 μm².

To the contrary, among the annealing conditions shown in Table 8, D and E are Comparative Examples in which an oxygen partial pressure (dew point) is too high, as compared with the annealing conditions A, B and C. For this reason, as shown in Table 8, an average ratio of a total length of the oxide in an outer oxide layer of a steel plate after annealing is too small as less than 80%. In addition, the average area ratio of an inner oxide 1 is too large as 5% or more and, further, in the annealing condition E, the average area ratio of an inner oxide 2 is also excessive as 0.1% or more. Therefore, since it is clear that, under the annealing condition of these D and E, a steel material having each oxidation structure which is a joining subject of the present invention is not obtained, regarding respective steel plates annealed under the annealing condition of these D and E, a joined body of dissimilar metals by spot welding was not manufactured.

Each oxidation structure in a joining corresponding part of each steel plate was measured by the following measuring method.

(Outer Oxide Formation Range)

In an outer oxide, a cross section sample was manufactured with a focused ion beam processing apparatus (FIB: Focused Ion Beam Process, FB-2000A manufactured by Hitachi, Ltd.), a total amount of Mn and Si in an outer oxide layer in the vicinity of an interface was obtained by analyzing an interface between a steel body and an outer oxide layer in a substantially horizontal direction, in a cross section in a thickness direction of a steel plate by the EDX (Model: NORAN-VANTAGE), and a phase of oxides (a plurality of oxides) in the vicinity of an interface containing Mn and Si at a total amount of 1 at % or more was specified by distinguishing from other phases. Then, a cross section is observed with TEM (field emission type transmission electron microscope manufactured by JEOL Ltd.: JEM-2010F, acceleration voltage 200 kv) at a magnification of 100000, and a length in a substantially horizontal direction at the interface of this oxide phase containing Mn and Si at a total amount of 1 at % or more, in the same interface region as that of the EDX is obtained. A ratio of a total length of this oxide phase, occupying for a length of 1 μm in a substantially horizontal direction of an interface was obtained. This was performed in three fields, respectively, and the average value thereof of them was obtained.

(Inner Oxide Occupation Area Rate)

Regarding an inner oxide, setting an inner oxide in a steel region in which the depth from a steel body surface of a steel plate is a depth from a steel body surface of this steel material to 10 μm or less to be inner oxide 1, and an inner oxide in a steel region at a depth from a steel body surface of a steel plate to more than 10 μm and 20 μm or less to be inner oxide 2, the compositions thereof were analyzed. Composition analysis is performed as an average area ratio of an oxide containing Mn and Si at a total amount of 1 at % or more in these respective steel regions. First, the oxide containing Mn and Si at a total amount of 1 at % or more in these respective steel regions is specified by distinguishing from other phases, with the EDX. A cross section is observed with TEM (field emission type transmission electron microscope manufactured by JEOL Ltd.: JEM-2010F, acceleration voltage 200 kV) at a magnification of 30000, and each area ratio occupied in a field area (body iron area) per 10 pre of the oxide phase containing Mn and Si at a total amount of 1 at % or more, in the same interface region as that of the EDX was obtained. Herein, an area occupied by a grain boundary oxide is added to the oxide containing Mn and Si at a total amount of 1 at % or more. This is performed in three fields, respectively, and the average thereof was obtained.

Each of these steel plates having different oxidation structures, and a 5000 series or 7000 series aluminum alloy plate of a plate thickness of 1 to 1.6 mm, at each composition shown in Table 7, were processed into a shape of a cross tensile test piece described in JIS A 3137, and laminated, and spot welding was performed under each condition of a, b, c, d, e and f shown in Table 9, thereby, dissimilar joint was performed. Herein, as assessed from peeling strengths shown in Table 10 described later, a to d shown in Table 9 are improper spot welding conditions, and e and f are proper spot welding conditions.

In addition, in spot welding shown in Table 9, spot welding per one point was performed, commonly, using a direct current resistance welding testing machine, at a pressurizing force, a welding current and a welding time shown in Table 4. In addition, commonly, a dome-type electrode including a Cu—Cr alloy was used, and a positive electrode was an aluminum material and a negative electrode was a steel material.

(Thickness and Formation Range of Interface Reaction Layer)

A thickness and a formation range of an interface reaction layer of each of the thus manufactured joined bodies of dissimilar metals were measured. The results thereof are shown in Table 10. In measurement of the thickness of an interface reaction layer, each spot welding part was cut at a center, the cut part was embedded in a resin to be polished, and subjected to SEM observation at an interval of 0.5 mm over the entire joining part. When the thickness of a reaction layer is 1 um or more, measurement was performed at the field of a magnification of 2000 and, when the thickness thereof was less than 1 μm, measurement was performed at the field of a magnification of 10000, and an average for every each spot welding part was obtained, and an average of 30 spot welding parts was defined as an average thickness of the interface reaction layer. In addition, regarding the formation range of an interface reaction layer, a ratio of a reaction layer formation area relative to the total spot area was obtained at each spot welding part, and an average of 30 spot welding parts was obtained.

(Amount of Elements at Joint Interface on Aluminum Alloy Material Side)

Similarly, a content of Fe (mass: expressed as Fe concentration in Al at interface in Tables 10 and 11) at a joint interface on the aluminum alloy material side of each of the manufactured joined bodies of dissimilar metals was measured. The results thereof are shown in Tables 10 and 11.

For analysis, EPMA: X-ray microanalyzer manufactured by JEOL Ltd. (JXA-8800RL) was used, and measurement was performed at a constant acceleration voltage of 15 kV, and a constant irradiation current of 0.3 μA. A subject to be analyzed was a cross section obtained by cutting the each spot welding part at a center, and analysis was performed centering in a joint interface between an aluminum alloy material and a steel material, and up to the interior each 0.5 mm inner of the aluminum alloy material side and the steel material side. A content of Fe originally possessed by the aluminum alloy material on the inner side of the aluminum alloy material was subtracted therefrom, and the content of Fe (mass: expressed as Fe concentration in Al at interface in Tables 10 and 11) at joint interface on the aluminum alloy material side was measured.

A cross tensile test of each of these manufactured jointed bodies of dissimilar materials was performed to obtain a peeling strength. These results are also shown in Table 5. The peeling strength was o when the strength is 2.0 kN or more, or x when the strength was less than 2.0 kN, referring to a spot welding joining strength between A6022 aluminum materials=1.0 kN.

As apparent from Table 10, in respective Invention Examples 1 to 28 in which a steel plate and an aluminum alloy plate having a proper component composition shown in Tables 6 and 7 were used, and treatment was performed under the annealing condition D, E, F or G having a suitable oxygen partial pressure (dew point) shown in Table 8, an outer oxide layer and an inner oxide of a steel plate after annealing satisfy the condition of the present invention. In addition, in respective Invention Examples 1 to 28 in which these steel plates satisfying the oxide condition were used, and the welding condition was the proper spot welding condition of e and f, a content of Fe at a joint interface on the aluminum alloy material side at a joint interface of a joined body of dissimilar metals is 2.0% by mass or less. Further, a formation area (formation ratio) of the reaction layer of Fe and Al formed at a joint interface between a steel material and an aluminum alloy material is 70% or more of a spot welding joining area, and a thickness of this reaction layer is also proper. As a result, as apparent from Table 10, it is seen that, in respective Invention Examples 1 to 28, a joining strength (peeling strength) of joined bodies of dissimilar metals became high, being 2 kN or more.

On the other hand, as apparent from Table 11, in respective Comparative Examples 29 to 43 in which a steel plate and an aluminum alloy plate having a proper component composition shown in Tables 6 and 7 were used, and treatment was performed under the annealing condition of D, E, F or G having a suitable oxygen partial pressure (dew point) shown in Table 8, naturally, an outer oxide layer and an inner oxide of a steel plate after annealing are within the condition of the present invention. However, in respective Comparative Examples 29 to 36 in which improper spot welding condition of a to d in Table 9 was used, a content of Fe at a joint interface on the aluminum alloy material side, a formation area (formation ratio) of the reaction layer of Fe and Al formed at a joint interface between a steel material and an aluminum alloy material, or a thickness of this reaction layer is improper. As a result, as apparent from Table 11, it is seen that a thickness and a formation range of an interface reaction layer of joined bodies of dissimilar metals do not satisfy the condition of the present invention, and a joining strength of joined bodies of dissimilar metals is remarkably reduced.

In addition, in Comparative Examples 37 to 43, the welding condition is the proper spot welding condition of e and f, a content of Fe at a joint interface on the aluminum alloy material side, a formation area (formation ratio) of the reaction layer of Fe and Al, or a thickness of this reaction layer is approximately within the condition of the present invention. However, since steel plate component compositions 19 to 25 shown in Table 6 are outside the range of the present invention, and improper, a joining strength of joined bodies of dissimilar metals is remarkably reduced, as apparent from Table 10.

In Comparative Example 37, C was too high, a supercooled texture was generated at a spot welding part, and a crack was generated. In Comparative Example 38, Si was too high, and an optimal reaction layer of Fe and Al could not be formed at a joint interface. In Comparative Example 39, Mn was too high, a supercooled texture was generated at a spot welding part, and a crack was generated. In Comparative Example 40, Al was too high, ductility of a steel material was reduced, the material was brittlely broken in a cross tensile test, and a peeling strength was low. In Comparative Example 41, N was too high, ductility of a steel material was reduced, the material was brittlely broken in a cross tensile test, and a peeling strength was low. In Comparative Example 42, Cr was too high, a supercooled texture was generated at a spot welding part, the material was brittlely broken in a cross tensile test, and a peeling strength was low. In Comparative Example 43, Nb was too high, ductility of a steel material was reduced, the material was brittlely broken in a cross tensile test, and a peeling strength was low.

Therefore, from these facts, critical meaningfulness of a component composition and oxide condition on the steel material side of the present invention is supported. In addition, meaningfulness of the condition of the present invention in a thickness and a formation range of an interface reaction layer of joined bodies of dissimilar metals is seen. In addition, it is seen that, in order that a thickness and a formation range in the interface reaction layer of joined bodies of dissimilar metals satisfy the condition of the present invention, and a joining strength of joined bodies of dissimilar metals is enhanced, it is necessary to not only use a steel plate satisfying the oxide condition, but also make the welding condition proper.

TABLE 6

Chemical component composition of steel material
(mass %, wherein N is ppm, reminder is Fe and unavoidable impurities)

| Section | No. | C | Si | Mn | P | S | Al | N | Cr | Cu | Ni | Nb | Ti | V | Zr |
|---|---|---|---|---|---|---|---|---|---|---|---|---|---|---|---|
| Invention Examples | 1 | 0.06 | 0.23 | 0.55 | 0.01 | 0.01 | 0.04 | 21 | 0.06 | 0.00 | 0.00 | 0.05 | 0.07 | 0.00 | 0.00 |
| | 2 | 0.13 | 1.00 | 1.45 | 0.00 | 0.00 | 0.03 | 31 | 0.07 | 0.00 | 0.00 | 0.09 | 0.10 | 0.00 | 0.00 |
| | 3 | 0.08 | 1.69 | 1.23 | 0.00 | 0.00 | 0.03 | 35 | 0.20 | 0.00 | 0.00 | 0.00 | 0.00 | 0.00 | 0.00 |
| | 4 | 0.28 | 1.45 | 1.60 | 0.02 | 0.01 | 0.02 | 95 | 0.00 | 0.00 | 0.00 | 0.00 | 0.00 | 0.00 | 0.00 |
| | 5 | 0.10 | 1.30 | 2.01 | 0.03 | 0.01 | 1.88 | 77 | 0.80 | 0.00 | 0.00 | 0.00 | 0.00 | 0.00 | 0.00 |
| | 6 | 0.14 | 1.50 | 1.38 | 0.02 | 0.01 | 0.01 | 91 | 0.40 | 0.00 | 0.00 | 0.00 | 0.00 | 0.00 | 0.00 |
| | 7 | 0.10 | 2.66 | 2.05 | 0.03 | 0.01 | 0.01 | 119 | 0.00 | 0.02 | 0.10 | 0.00 | 0.00 | 0.00 | 0.00 |
| | 8 | 0.08 | 2.62 | 1.81 | 0.04 | 0.01 | 0.00 | 184 | 2.20 | 0.00 | 0.00 | 0.00 | 0.00 | 0.00 | 0.00 |
| | 9 | 0.14 | 2.63 | 1.30 | 0.07 | 0.01 | 0.00 | 92 | 2.00 | 0.00 | 0.00 | 0.00 | 0.00 | 0.00 | 0.00 |
| | 10 | 0.17 | 2.71 | 1.26 | 0.05 | 0.01 | 0.01 | 197 | 0.00 | 0.00 | 2.80 | 0.00 | 0.00 | 0.00 | 0.00 |
| | 11 | 0.17 | 1.65 | 1.25 | 0.08 | 0.01 | 0.00 | 71 | 0.20 | 0.00 | 0.11 | 0.05 | 0.00 | 0.00 | 0.00 |
| | 12 | 0.24 | 1.57 | 2.00 | 0.08 | 0.01 | 0.01 | 165 | 0.00 | 0.03 | 0.00 | 0.00 | 0.04 | 0.00 | 0.00 |
| | 13 | 0.21 | 1.96 | 1.68 | 0.08 | 0.01 | 0.00 | 138 | 1.25 | 0.00 | 0.00 | 0.00 | 0.00 | 0.07 | 0.00 |
| | 14 | 0.11 | 1.43 | 1.60 | 0.05 | 0.01 | 0.01 | 126 | 0.00 | 0.04 | 0.22 | 0.00 | 0.00 | 0.00 | 0.01 |
| | 15 | 0.22 | 1.96 | 1.67 | 0.08 | 0.01 | 0.01 | 136 | 0.00 | 0.00 | 0.00 | 0.42 | 0.00 | 0.00 | 0.00 |
| | 16 | 0.26 | 2.66 | 1.92 | 0.07 | 0.01 | 0.00 | 118 | 0.00 | 0.00 | 0.00 | 0.00 | 0.45 | 0.00 | 0.00 |
| | 17 | 0.11 | 2.35 | 2.06 | 0.03 | 0.01 | 0.00 | 84 | 0.00 | 0.00 | 0.00 | 0.00 | 0.00 | 0.80 | 0.00 |
| | 18 | 0.16 | 2.46 | 1.37 | 0.02 | 0.01 | 0.00 | 110 | 0.00 | 0.00 | 0.00 | 0.00 | 0.00 | 0.00 | 0.47 |
| Comparative Example | 19 | 0.32 | 2.27 | 1.41 | 0.09 | 0.01 | 0.00 | 145 | 0.00 | 0.00 | 0.00 | 0.00 | 0.00 | 0.00 | 0.00 |
| | 20 | 0.20 | 4.80 | 1.90 | 0.01 | 0.00 | 0.03 | 21 | 0.00 | 0.00 | 0.00 | 0.00 | 0.07 | 0.00 | 0.00 |
| | 21 | 0.13 | 0.30 | 3.05 | 0.04 | 0.01 | 0.01 | 206 | 0.00 | 0.00 | 0.00 | 0.00 | 0.00 | 0.00 | 0.00 |
| | 22 | 0.03 | 1.60 | 2.14 | 0.02 | 0.01 | 2.10 | 112 | 0.00 | 0.00 | 0.00 | 0.00 | 0.00 | 0.00 | 0.00 |
| | 23 | 0.16 | 0.23 | 1.94 | 0.06 | 0.01 | 0.01 | 320 | 0.00 | 0.00 | 0.00 | 0.00 | 0.00 | 0.00 | 0.00 |
| | 24 | 0.23 | 0.91 | 2.92 | 0.09 | 0.01 | 0.00 | 137 | 3.20 | 0.00 | 0.00 | 0.00 | 0.00 | 0.00 | 0.00 |
| | 25 | 0.13 | 2.04 | 0.38 | 0.08 | 0.01 | 0.01 | 157 | 0.00 | 0.00 | 0.00 | 0.58 | 0.00 | 0.00 | 0.00 |

TABLE 7

| | Aluminum alloy material chemical component composition (mass %, remainders are Al and unavoidable impurities) | | | | | | | | Remark (Alloy |
|---|---|---|---|---|---|---|---|---|---|
| No. | Mg | Si | Cu | Zn | Mn | Cr | Fe | Ti | series) |
| a | 1.02 | 0.03 | 0.38 | 0.03 | 0.05 | 0.23 | 0.24 | 0.02 | 5000 series |
| b | 2.55 | 0.11 | 0.15 | 0 | 0.1 | 0.15 | 0.05 | 0.03 | 5000 series |
| c | 1.5 | 0.3 | 0.05 | 4.55 | 0.3 | 0.11 | 0.16 | 0.02 | 7000 series |

TABLE 8

| | Annealing condition | | | | Steel plate after annealing | | | |
|---|---|---|---|---|---|---|---|---|
| | | | | | Outer oxide layer | Inner oxide 1 | Inner oxide 2 | |
| Symbol | Atmospheric composition | Temperature (°C.) | Time (sec) | Dew point (°C.) | Length ratio (%) of oxide containing Mn and Si | Area ratio (%) of oxide containing Mn and Si | Area ratio (%) of oxide containing Mn and Si | Section |
| A | N$_2$: 97% H$_2$: 3% | 700 | 200 | −80 | 100 | Less than 1% | 0% | Invention Examples |
| B | | | | −60 | 95 | 1% or more and less than 3% | 0.01% | Invention Examples |
| C | | | | −40 | 82 | 3% or more and less than 5.0% | 0.05% | Invention Examples |
| D | | | | −20 | 63 | 5% or more and less than 10% | 0.08% | Comparative Example |
| E | | | | 0 | 47 | 10% and more | 5.30% | Comparative Example |

* Inner oxide 1: oxide present in steel region at depth from body surface of steel plate to 10 μm

* Inner oxide 2: oxide present in steel region at depth from body surface of steel plate to more than 10 μm and 20 μm or less

TABLE 9

| Spot welding condition | Plate thickness (mm) of aluminum alloy plate | | | | | |
|---|---|---|---|---|---|---|
| | 1 | 1 | 1 | 1.6 | 1 | 1.6 |
| Pressurizing force (kN) | 1.5 | 1.5 | 3.5 | 3.5 | 3.0 | 3 |
| Current (kA) | 16 | 16 | 30 | 30 | 16 | 33 |
| Welding time (msec) | 40 | 400 | 40 | 400 | 40 | 60 |
| Electrode Positive electrode | Cu—Cr alloy/dome type Aluminum | | | | | |

TABLE 9-continued

| Spot welding condition | Plate thickness (mm) of aluminum alloy plate | | | | | |
|---|---|---|---|---|---|---|
| | 1 | 1 | 1 | 1.6 | 1 | 1.6 |
| Negative electrode | Steel | | | | | |
| Welding condition pattern | a | b | c | d | e | f |
| Properness of welding condition | x | x | x | x | ○ | ○ |

TABLE 10

| Section | No. | Dissimilar joint condition | | | | Joined body of dissimilar metals | | | | |
|---|---|---|---|---|---|---|---|---|---|---|
| | | Steel species | Aluminum species | Annealing condition | Welding condition | Reaction layer average thickness (μm) | Reaction layer formation ratio (%) | Fe concentration in Al at interface (wt %) | Peeling strength (kN) | Assessment |
| Invention Examples | 1 | 1 | a | A | e | 1.6 | 73 | 1.5 | 2.3 | ○ |
| | 2 | 1 | b | A | f | 2.5 | 75 | 1.9 | 2.1 | ○ |
| | 3 | 1 | c | A | e | 2.1 | 86 | 1.1 | 2.9 | ○ |
| | 4 | 1 | a | B | f | 1.8 | 81 | 1 | 2.7 | ○ |
| | 5 | 1 | b | B | e | 1.4 | 78 | 1.8 | 2.5 | ○ |
| | 6 | 1 | c | B | f | 0.7 | 91 | 1.4 | 2.3 | ○ |
| | 7 | 1 | a | C | e | 1.5 | 88 | 1.7 | 2.4 | ○ |
| | 8 | 1 | b | C | f | 2.6 | 81 | 1.2 | 2.8 | ○ |
| | 9 | 1 | c | C | e | 2.3 | 72 | 1.8 | 2.0 | ○ |
| | 10 | 2 | b | A | f | 1.7 | 79 | 1.6 | 2.7 | ○ |
| | 11 | 3 | a | B | e | 1.2 | 96 | 1.2 | 2.2 | ○ |
| | 12 | 4 | c | C | e | 0.6 | 81 | 1.6 | 2.1 | ○ |
| | 13 | 2 | c | A | f | 2.1 | 77 | 1.9 | 2.0 | ○ |
| | 14 | 3 | b | B | e | 1.4 | 70 | 1.1 | 2.8 | ○ |
| | 15 | 4 | a | C | f | 1.7 | 89 | 1.8 | 2.4 | ○ |
| | 16 | 5 | a | A | e | 2.2 | 92 | 1.5 | 2.3 | ○ |
| | 17 | 6 | b | A | f | 2.9 | 73 | 1.6 | 2.5 | ○ |
| | 18 | 7 | c | A | e | 1.4 | 86 | 1.0 | 2.2 | ○ |
| | 19 | 8 | b | A | f | 0.4 | 78 | 2.0 | 2.7 | ○ |
| | 20 | 9 | a | A | e | 1.5 | 88 | 1.8 | 2.1 | ○ |
| | 21 | 11 | c | A | f | 1.9 | 74 | 1.6 | 2.2 | ○ |
| | 22 | 12 | c | A | e | 2.1 | 76 | 1.3 | 2.3 | ○ |
| | 23 | 13 | a | B | f | 1.8 | 89 | 1.6 | 2.7 | ○ |
| | 24 | 14 | b | B | e | 1.4 | 82 | 1.1 | 2.5 | ○ |
| | 25 | 15 | a | B | f | 1.9 | 86 | 1.8 | 2.3 | ○ |
| | 26 | 16 | b | B | e | 2.8 | 83 | 2.0 | 2.6 | ○ |
| | 27 | 17 | c | B | f | 2.4 | 85 | 1.7 | 2.5 | ○ |
| | 28 | 18 | b | B | e | 1.1 | 75 | 1.5 | 2.8 | ○ |

TABLE 11

| Section | No. | Dissimilar jont condition | | | | Joined body of dissimilar metals | | | | |
|---|---|---|---|---|---|---|---|---|---|---|
| | | Steel species | Aluminum species | Annealing condition | Welding condition | Reaction layer average thickness (μm) | Reaction layer formation ratio (%) | Fe concentration in Al at interface (wt %) | Peeling strength (kN) | Assessment |
| Comparative Examples | 29 | 1 | a | A | a | 4.5 | 44 | 1.4 | 0.5 | x |
| | 30 | 1 | b | B | b | 18.5 | 53 | 4.8 | 0.2 | x |
| | 31 | 1 | c | C | a | 1.1 | 54 | 1.2 | 0.9 | x |
| | 32 | 1 | c | B | b | 17.6 | 61 | 5.6 | 1.1 | x |
| | 33 | 1 | b | A | c | 1.1 | 58 | 1.5 | 0.6 | x |
| | 34 | 1 | a | B | d | 19.8 | 43 | 4.6 | 1.2 | x |
| | 35 | 1 | b | C | c | 1.3 | 73 | 3.8 | 0.8 | x |
| | 36 | 1 | c | A | d | 6.4 | 59 | 1.6 | 0.2 | x |
| | 37 | 19 | c | C | e | 1.6 | 73 | 1.3 | 0.1 | x |
| | 38 | 20 | a | C | e | 1.9 | 0.1 | 0.1 | 0.4 | x |
| | 39 | 21 | b | C | e | 1.1 | 84 | 1.9 | 0.2 | x |
| | 40 | 22 | b | C | f | 2.8 | 77 | 1.5 | 0.3 | x |
| | 41 | 23 | a | C | f | 1.7 | 86 | 2.0 | 0.7 | x |
| | 42 | 24 | c | C | f | 2.1 | 71 | 1.1 | 0.4 | x |
| | 43 | 25 | c | C | f | 2.6 | 79 | 1.7 | 0.8 | x |

Third Embodiment

Constitution of Oxide of Steel Material

First, a specific quantitative compositional balance between an outer oxide layer and an inner oxide layer, which is characteristic in the present invention, will be described below.

Oxides on a steel material surface containing Mn and Si, which are annealed under the atmosphere controlled at different oxygen partial pressures after once subjected to pickle (steel material cross-sectional structure), are schematically shown in FIG. 1(a) to FIG. 1(c), respectively. FIG. 1(a) shows the case of annealing under the low oxygen partial pressure (low dew point) atmosphere. FIG. 1(b) shows the case of annealing under the intermediate oxygen partial pressure (relatively high dew point) atmosphere. FIG. 1(c) shows the case of annealing under the high oxygen partial pressure (high dew point) atmosphere. Among them, FIG. 1(c) shows a specific quantitative compositional balance between an outer oxide layer and an inner oxide layer, which is a subject of the present invention.

FIG. 1(a):

In the case of annealing under the low oxygen partial pressure atmosphere of FIG. 1(a), a steel material containing Mn and Si in which the existing outer oxide layer is removed by once subjected to pickle, is such that a steel body surface of the steel material is covered with a thin outer oxide layer having a thickness of around 50 nm. However, since the oxygen partial pressure is low, oxygen does not enter (diffuse) into the interior of the steel material and an inner oxide containing a grain boundary oxide is not formed in the interior of the steel material under the steel body surface.

This outer oxide layer is an oxide film which is newly generated by annealing, after removal of the existing oxide layer, commonly, including FIG. 1(b) and FIG. 1(c) described later, and is constituted by an oxide containing Mn and Si at a total amount of 1 at % or more in which Mn and Si are concentrated, an oxide including Fe oxide (Fe3O4) and having a content of Mn and Si, as a total amount, of less than 1 at %, and voids. The oxide containing Mn and Si at a total amount of 1 at % or more is constituted by, for example, representatively, an oxide including Mn2SiO4, SiO2 etc. In addition, the oxide having a content of Mn and Si, as a total amount, of less than 1 at is constituted by, for example, representatively, an oxide including Fe3O4.

In such a case of FIG. 1(a), since the steel body surface of a steel material is totally covered with the outer oxide, a ratio occupied by the oxide containing Mn and Si at a total amount of 1% or more, in the outer oxide layer, is as high as 80 to 100% as an average ratio of a total length of this oxide occupying for a length of 1 μm in a substantially horizontal direction of an interface between the steel body and the outer oxide layer. Therefore, such an outer oxide layer has a greater ratio occupied by the oxide containing Mn and Si at a total amount of 1 at % or more than that of the outer oxide layer in FIG. 1 (b) or FIG. 1(c) described later, and is destructed with more difficulty. In addition, in the case of the outer oxide layer of FIG. 1(a), an inner oxide is necessarily decreased. Therefore, for example, an inner oxide present in a steel region at a depth from the steel body surface to 10 μm is 0% as an average area ratio occupied by an oxide present in a crystal grain boundary and an oxide in grains containing Mn and Si at a total amount of 1 at % or more, or is less than 5% even if the inner oxide is present.

FIG. 1(b):

To the contrary, in a characteristic quantitative compositional balance between an outer oxide layer and an inner oxide layer, which is a subject of the present invention, as in FIG. 1(b), an oxygen partial pressure is relatively higher than that of FIG. 1(a), annealing is the atmospheric annealing at an intermediate oxygen partial pressure, and oxygen enters (diffuses) into the interior of a steel material. For this reason, in the steel material containing Mn and Si, in which the existing outer oxide layer is removed by once subjecting to pickle, together with the outer oxide layer, an inner oxide is formed in a steel region which is relatively shallow in the interior of a steel material under the steel body surface, for example, at a depth from the steel body surface of a steel material to 10 μm or less (depth up to 10 μm directly beneath steel body surface). The same condition of an outer oxide layer and an inner oxide layer adopted in Patent Document 7 regardless of a different welding procedure, or a different material combination of an aluminum alloy material and a steel material to be welded, is the condition of this FIG. 1(b).

Among these inner oxides, oxides generated in grains are the oxide containing Mn and Si at a total amount of 1 at % or more, a spherical to particulate oxide including SiO2 and Mn2SiO4, and the oxide such as Fe3O4 containing Mn and Si at a total amount of less than 1 at %, commonly, including FIG. 1(c) described later. In addition, thereupon, grain boundary oxides are also formed on the grain boundary of a steel, commonly, including FIG. 1(c) described later, but these grain boundary oxides are particulate oxides containing Mn and Si at a total amount of approximately 1 at % or more.

As an oxygen partial pressure of atmospheric annealing becomes higher, oxygen begins to enter (diffuse) into a more inner part of a steel material, or more oxygen begins to enter (diffuse), and a region in which these inner oxides are present is extended, or an amount of these inner oxides is increased.

On the other hand, contrary to these inner oxides, as an oxygen partial pressure of atmospheric annealing becomes higher, a ratio occupied by an oxide containing Mn and Si in an outer oxide layer begins to be decreased. That is, in the outer oxide layer in FIG. 1(b), the ratio occupied by the oxide containing Mn and Si at a total amount of 1 at % or more becomes 50 to 80% as an average ratio of a total length of this oxide occupying for a length of 1 μm in a substantially horizontal direction of an interface between the steel body and the outer oxide layer, and becomes lower than the case of FIG. 1(a).

FIG. 1(c):

FIG. 1(c) shows the case of atmospheric annealing under a high oxygen partial pressure, in which an oxygen partial pressure is further higher than that of FIG. 1(b), and shows a specific quantitative compositional balance between an outer oxide layer and an inner oxide layer, which is characteristic in the present invention. In FIG. 1(c), oxygen enters (diffuses) into the further more interior of a steel material than in FIG. 1(b). For this reason, in the steel material containing Mn and Si, in which the existing outer oxide layer is removed by once subjecting to pickle, together with the outer oxide layer, the inner oxide is formed in a region which is relatively deep in the interior of a steel material under the steel body surface, and in the further more interior of a steel material. These inner oxides are mainly formed in a steel region at a depth from the steel body surface of this steel material to more than 10 μm.

To the contrary, the ratio occupied by the oxide containing Mn and Si in the outer oxide layer is further more decreased in the case of FIG. 1(c) than in the case of FIG. 1(b). That is, in the case of FIG. 1(c), the ratio occupied by the oxide containing Mn and Si at a total amount of 1 at % or more in the outer oxide layer becomes as lowest as 0.1% or more and less than 50%, as an average ratio of a total length of this oxide occupying for a length of 1 μm in a substantially horizontal direction of an interface between the steel body and the outer oxide layer. Such an outer oxide layer has the smallest ratio occupied by the oxide containing Mn and Si at a total amount of 1 at % or more than the outer oxide layer of FIG. 1(a) or FIG. 1(c), and is more easily destructed.

Herein, an outer oxide layer on a surface of a steel material such as a normal soft steel material is usually constituted by an oxide such as αFeOOH, γFeOOH, amorphous oxyhydroxide, and Fe3O4. To the contrary, an outer oxide layer on a surface of a steel material, which is a high-strength steel material containing Mn and Si (also referred to as high-tensile steel material) as in the present invention, and was annealed under the atmosphere having a controlled partial pressure as described above after once subjecting to pickle is constituted by the oxide containing Mn and Si at a total amount of 1 at or more, and as the reminder, the oxide such as Fe3O4 containing Mn and Si at a total amount of less than 1 at %, and voids.

(Action of Outer Oxide Layer)

At welding joining between the steel material and the aluminum alloy material of FIG. 1, an Al—Fe reaction layer is formed on a joining surface between the steel material and the aluminum alloy material, breaking the outer oxide layer on a steel material surface. In this respect, the outer oxide layer on a steel material surface has the effect of suppressing diffusion of Fe and El at joining to suppress generation of an Al—Fe-base brittle intermetallic compound layer (intermetallic compound layer).

However, in the case of dissimilar joint such as spot welding between an aluminum alloy material and a steel material, such an effect is not uniformly exerted if there is an outer oxide layer of the aforementioned composition on a steel material surface, but it greatly depends on a ratio of the oxide phase containing Mn and Si at a constant ratio. That is, in the case of FIG. 1(a), a ratio occupied by an oxide containing Me and Si at a total amount of 1 at % or more in an outer oxide layer is greatest, and a barrier effect of suppressing diffusion of Fe and Al at joining, and an effect of suppressing generation of an Al—Fe-base brittle intermetallic compound layer (reaction layer) become greatest among three outer oxide layer types of FIG. 1. To the contrary, in the case of the FIG. 1(c), the ratio occupied by an oxide containing Mn and Si at a total amount of 1 at % or more in an outer oxide layer is smallest, and the barrier effect of suppressing diffusion of Fe and Al at joining, and the effect of suppressing generation of an Al—Fe-base brittle intermetallic compound layer (reaction layer) become smallest among three outer oxide layer types of FIG. 1. In the case of FIG. 1(b), the ratio occupied by an oxide containing Mn and Si at a total amount of 1 at % or more in an outer oxide layer, as well as the barrier effect of suppressing diffusion of Fe and Al at joining, and the effect of suppressing generation of an Al—Fe-base brittle intermetallic compound layer (reaction layer) become intermediate among three outer oxide layer types of FIG. 1.

Herein, in the case of spot welding in which the steel material side does not melt, and only the aluminum alloy material side melts, with the outer oxide layer which is destructed with relative difficulty of FIG. 1(a) or FIG. 1(b), even if the aluminum alloy side melts, it becomes difficult to break an outer oxide layer on a steel material surface by reduction to promote diffusion of Fe from the steel material side, at an interface with a steel material. As a result, it becomes difficult to form an Al—Fe reaction layer having a thickness which is requisite minimal for metallurgic joining at a joining part in a wide range as much as possible. Therefore, in a steel material having the outer oxide layer of the FIG. 1(b), or the FIG. 1(a), which is a subject of the present invention, in the case of spot welding in which this steel material side does not melt, and only the aluminum alloy material side melts, it is necessary that an element (Li, Mn) having the function of reducing this outer oxide layer is present on a side of a joining surface between an aluminum alloy material as a means for forcibly reducing and destructing an outer oxide layer.

The is one of the great reasons why the joining body of dissimilar metals which is produced by joining a 6000 series aluminum alloy material and a steel material of Patent Document 7 has a joining strength in an example of spot welding of less than 2 kN at highest, and a joining strength of 2 kN or more could not be obtained. In Patent Document 7, the outer oxide layer which is newly generated on a high-strength steel plate surface is an oxide of a Mn and Si composition at a specific ratio, which is the same as that of the present invention. However, the ratio is the same as that of the outer oxide layer in FIG. 1(b), and the average ratio is as excessive as 50% or more (50 to 80%). As a result, the outer oxide layer serves excessively as a barrier which is not easily destructed, for the 6000 series aluminum alloy material not containing an alloy element which is to be a strong reducing agent, and it becomes difficult to promote diffusion of Fe from the steel material side, at welding. For this reason, it becomes difficult to form an Al—Fe reaction layer having a thickness which is requisite and minimal for metallurgic joining, at a joining part in a wide range as much as possible.

Therefore, in dissimilar joint such that a 6000 series aluminum alloy material and a steel material are spot-welded, spot welding in which the steel material side dose not melt, and only the aluminum alloy material side melts, wherein it is advantageous that the ratio occupied by the oxide containing Mn and Si at a total amount of 1 at % or more, in the outer oxide layer, is made to be less than 50% as an average ratio of a total length of this oxide occupying for a length of 1 μm in a substantially horizontal direction of an interface between the steel body and the outer oxide layer, as in the case of FIG. 1(c).

However, in the present invention, an outer oxide layer on the steel material side to be welded is daringly the outer oxide layer in the FIG. 1(b), which is the same as that of Patent Document 7, and a ratio occupied by an oxide containing Mn and Si at a total amount of 1 at % or more is 50% or more, and in a range of 50 to 80%, as an average ratio of a total length of this oxide occupied for a length of 1 μm in a substantially horizontal direction of an interface between a steel body and an outer oxide layer. This is because there is a case where a composition of an outer oxide layer of the steel material side cannot be made proper to the condition of FIG. 1(c), or a case where the steel material which is made proper cannot be used, depending on the condition for producing a steel material, and restriction of a steel material used, as described above.

In such the outer oxide layer in FIG. 1(b), the outer oxide layer works excessively as a barrier which is not easily destructed, on a 6000 series aluminum alloy material not containing an alloy element which becomes a strong reducing agent, and it becomes difficult to promote diffusion of Fe from the steel material side. Further, in the case of the outer oxide layer of FIG. 1(a), such as in which a ratio occupied by an oxide containing Mn and Si at a total amount of 1 at % or more exceeds 8% as the average ratio, even when one or two kinds of Li and Mn are present in advance, on a side of a joining surface with the steel material, of an aluminum alloy material, it becomes difficult to reduce and destruct the outer oxide layer regardless of the welding condition. Therefore, also from this point, even in the outer oxide layer in FIG. 1(b), a ratio occupied by an oxide containing Mn and Si at a total amount of 1 at % or more is 80% or less as the average ratio.
(Presence of Li or Mn on Joining Surface)

To the contrary, in the present invention, one or two or more kinds of Li and Mn as an element having the function of reducing and destructing the outer oxide layer present on a steel material surface are present in advance, on a side of a joining surface with the steel material of an aluminum ally material. An outer oxide layer which is destructed with difficulty is destructed by reduction, at welding, by these Li and Mn, diffusion of Fe and Al at spot welding is controlled, only an amount necessary for formation of a reaction layer at a welding joint interface is retained, and the diffusion is effectively controlled so as not to excessively diffuse.

A measure of optimal control of diffusion of Fe from the steel material side like this is that a content of Fe is (regulated at) 2.0% by mass or less, at a joint interface on the aluminum alloy material side in a joint interface of a joined body of dissimilar metals, as a consequence. When a content of Fe in a joint interface on this aluminum alloy material side exceeds 2.0% by mass, a joining strength is remarkably reduced.

That is, for example, depending on the spot welding condition such as prolongation of a current passing time, a large amount of a Fe element dissolves out (dissolves out excessively) into the aluminum alloy material side (in an aluminum alloy), whether a high-strength steel material side melts, or does not melt. In such the spot welding, an amount of diffusion of Fe from a steel material to the aluminum alloy material side is excessive, a content of Fe at a joint interface on the aluminum alloy material side exceeds 2.0% by mass, and a brittle reaction layer of Fe and Al is generated. In addition, the content of Fe in a joint interface on this aluminum alloy material side is naturally an amount obtained by subtracting a content of Fe originally contained in an aluminum alloy material on an aluminum alloy material inner side.

A necessary amount of Li or Mn on a side of a joining surface of an aluminum alloy material for exerting the effect of reducing and destructing an outer oxide layer is different depending on the material condition and the welding condition, and is the interface situation during welding (interface reaction) determined by these conditions and, therefore, it is specified with difficulty. In addition, quantitative measurement of Li or Mn at a joint interface of an aluminum alloy material is also difficult.

However, a content of Li or Mn of a 6000 series aluminum alloy material to be welded can be the as a measure of a necessary amount of Li or Mn at this joint interface. This measure of a necessary amount of Li or Mn is such that a content of Li or Mn in a 6000 series aluminum alloy material is made to be in a range of Li: 0.01 to 0.5%, and Mn: 0.1 to 0.5%, in advance.

In the case of spot welding, such as in which only the aluminum alloy material side melts by the function of Li or Mn on such the aluminum alloy material side, excessive generation of an Al—Fe-base brittle reaction layer at a joint interface is suppressed, while an Al—Fe-base reaction layer which is requisite and minimal for obtaining a high joining strength is retained, and a high joining strength is obtained. That is, an average thickness of a reaction layer at a spot welding joint interface is controlled in an optimal range of 0.1 to 10 µm as described later and, as a result, particularly, regarding a joined body of dissimilar metals, obtained by spot welding between a 6000 series aluminum alloy material and a steel material, the high joining strength of 2 kN or more is obtained.

In order that Li and Mn are present on the joining surface, it is effective that these Li and Mn are contained at: the aforementioned content, in a 6000 series aluminum alloy material to be welded. When one or two kinds of these Li and Mn as an element having the function of reducing and destructing the outer oxide layer present on a steel material surface are contained in advance in a 6000 series aluminum alloy material, the content is in a range of Li: 0.01 to 0.5%, and Mn: 0.1 to 0.5%, as described above.

When a content of these Li and Mn is too small, the effect of reducing and destructing the outer oxide layer present on a steel material surface is weakened. That is, when a content of Li and Mn is too small, since an amount of Li and Mn present on a joining surface is too small, the function of reducing and destructing an outer oxide layer in which a ratio occupied by an oxide containing Mn and Si at a total amount of 1 at % or more, is 50 to 80% as an average ratio of a total length of this oxide occupied for a length of 1 µm in a substantially horizontal direction of an interface between a steel body and an outer oxide layer is deficient. As a result, the outer oxide layer works excessively as a barrier which is not easily destructed, and it becomes difficult to promote diffusion of a suitable amount of Fe from the steel material side, at welding. On the other hand, when a content of these Li and Mn is excessive, conversely, a joining strength, and a mechanical nature on the aluminum alloy material side are inhibited.

In addition, it is also possible that a thin plate or a thin piece of an aluminum alloy material containing Li and Mn intervenes separately, on a spot welding joining surface between a 6000 series aluminum alloy material and a steel material. However, when a thin plate or a thin piece of an aluminum alloy containing Li and Mn intervenes on a joining surface separately from a 6000 series aluminum alloy material, a labor and the cost for separate intervention of the thin plate or the thin piece on a joining surface becomes necessary as compared with the case where one kind or two kinds of these Li and Mn are contained in advance in a 6000 series aluminum alloy material, being troublesome. Therefore, there is a possibility that the efficiency of spot welding which is originally required to have a high efficiency is greatly reduced.
(Action of Inner Oxide)

An inner oxide layer directly beneath a steel body surface, in the case of spot welding such that the steel material side does not melt, and only the aluminum alloy material side melts, like the outer oxide layer on a steel material surface, has the effect of suppressing diffusion of Fe at joining to suppress generation of an Al—Fe-base brittle reaction layer. That is, at welding joining between a steel material and an aluminum alloy material, an inner oxide containing Mn and Si at a total amount of 1 at % or more, consisting of a spherical oxide such as SiO2, forms a solid solution into an Al—Fe reaction layer formed by breaking the outer oxide layer on a steel surface, and suppresses diffusion of Fe and Al to suppress excessive generation of a reaction layer.

However, particularly, in the case of dissimilar joint such that a 6000 series aluminum alloy material and a steel material are spot-welded, such an effect is not exerted if there is an inner oxide layer directly beneath the steel body surface, but is limited to a case where an oxide phase containing Mn and Si at a constant ratio is present at a constant amount or more, and at a constant depth or deeper directly beneath the steel body surface. That is, in the present invention, these inner oxides are formed in a steel material at a depth from a steel body surface of this steel material of 10 µm or less (provided that, the case of a depth of 0 µm is not included).

When the outer oxide layer is made to be relatively easily destructed as in the case of the FIG. 1(c), in order to effectively suppress diffusion of Fe and Al to relatively reduce the barrier effect on diffusion of Fe and Al of the outer oxide layer, the function of the inner oxide becomes more important. To the contrary, in the case of the present invention, the outer oxide layer which is not easily destructed as in the case of the FIG. 1(b) is adopted, and the action of suppressing diffusion of Fe and Al due to the inner oxide is sufficiently slighter than the case of the FIG. 1(c).

Therefore, a depth at which the inner oxide is present at a prescribed amount may be more shallow than the case of the FIG. 1(c), and the oxide is present in a steel region at a depth from a steel body surface of a steel material of 10 μm or less (depth from directly beneath a steel body surface of up to 10 μm). Thereby, in the case of spot welding such as in which the steel material side does not melt, and only the aluminum alloy material side melts, an inner oxide forms a solid solution more throughout welding and continuously, in an Al—Fe reaction layer which is sequentially formed by breaking the outer oxide layer on a steel material surface, and this suppresses diffusion of Fe and Al to suppress excessive generation of a reaction layer.

In a steel material having such the surface texture, when an oxide containing Mn and Si at a total amount of 1 at % or more is present at an excessive amount up to a deeper inner side of the steel material, depending on the welding condition, conversely, diffusion of Fe and Al at joining is suppressed excessively, a thickness of a reaction layer cannot be sufficiently retained, it becomes difficult to uniformly generate a reaction layer, and there is a possibility that a high joining strength is not obtained. Therefore, it is not necessary that a depth steel region at which this inner oxide is present is provided deep exceeding 10 μm. A ratio (density) occupied by an inner oxide containing Mn and Si at a total amount of 1 at % or more in this steel region is 3% or more and less than 10%, as an average area ratio occupied in a field area of this steel region within 10 μm$^2$.

In addition, among the inner oxide, as an oxide generated in grains, there are a spherical to particulate oxide containing Mn and Si at a total amount of 1 at % or more, and an oxide such as Fe3O4 having a total amount of content of Mn and Si of less than 1 at %, as described above, while an oxide formed on a grain boundary of a steel is a particulate oxide containing Mn and Si at a total amount of approximately 1 at % or more. Then, in the present invention, in definition of the inner oxide, a ratio occupied by an oxide present at a grain boundary and an oxide present in crystal grains containing Mn and Si at a total amount of 1 at % or more is 3% or more and less than 10%.

Thereby, in the case of spot welding such as in which only the aluminum alloy material side melts, the effect of suppressing diffusion of Fe and Al at joining to suppress generation of an Al—Fe-base brittle reaction layer becomes greater. Thereby, an average thickness of the reaction layer at a spot welding joint interface is controlled in an optimal range of 0.1 to 10 μm, as described later. As a result, particularly, regarding a joined body of dissimilar metals, which is produced by spot-welding a 6000 series aluminum alloy material and a steel material, a high joining strength of 2 kN or more is obtained.

When the density of the inner oxide containing Mn and Si at a total amount of 1 at % or more is less than 5% as the average area ratio, even if a depth region of a steel material where this inner oxide is present is satisfied, the density of the inner oxide is too small, and an amount of the inner oxide for exerting the aforementioned effect is deficient. On the other hand, when the density of the inner oxide containing Mn and Si at a total amount of 1 at % or more is 20% or more as the average area ratio, there is a high possibility that, conversely, a reaction layer at a joint interface between the steel material and the aluminum material is locally grown, the layer is not uniformly grown and, even under the proper welding condition, metallurgic joining becomes impossible.

(Steel Material Inner Texture)

Since it is not necessary that a depth steel region where this inner oxide is present is provided deeper exceeding 10 μm, in a steel material, as described above, it is preferable that, in a deeper interior of a steel material (region exceeding 10 μm, and 20 μm or less), a ratio (density) occupied by an inner oxide containing Mn and Si at a total amount of 1 at % or more is 0.1% or less, as an average area ratio occupied in a field area of this steel region within 10 μm$^2$, provide that a grain boundary oxide is contained.

(Method of Measuring Oxide)

Measurement of an oxide in the present invention is performed with TEM (transmission electron microscope) at a magnification of 10000 to 30000 using EDX (energy dispersive X-ray spectroscopy) jointly. That is, an outer oxide is specified by obtaining a total amount of Mn and Si in an outer oxide layer in the vicinity of an interface by analyzing an interface between a steel body and an outer oxide layer in a substantially horizontal direction, in a cross section in a thickness direction of a steel material, and distinguishing a phase of the oxide in the vicinity of an interface containing Mn and Si at a total amount of 1 at % or more (a plurality of oxides) from other phases. Then, a length in the substantially horizontal direction in the interface, of this oxide phase containing Mn and Si at a total amount of 1 at % or more, in the same interface region as that of this EDX analysis is obtained. A ratio of a total length of this oxide phase, occupying for a length of 1 μm in a substantially horizontal direction of an interface is obtained. This is performed at a plurality of places, and these are averaged.

Regarding an inner oxide, the oxide containing Mn and Si at a total amount of 1 at % or more in a steel region at a depth from a steel body surface of a steel material of 10 μm or less, or at a plurality of places at a (predetermined) steel region of further more than 10 μm and up to 20 μm (exceeding 10 μm) is specified by distinguishing from other phases, by the EDX. Each area ratio occupied in a field area of 10 μm$^2$ of this oxide phase containing Mn and Si at a total amount of 1 at % or more, in the same surface region as that of this EDX is obtained by TEM. Herein, an area occupied by a grain boundary oxide in this steel region is added to the area ratio occupied by the inner oxide, as an inner oxide containing Mn and Si at a total amount of 1 at % or more in this steel region, as described above.

(Oxide Layer Control)

Control of outer oxides and inner oxides of these steel materials can be performed by controlling the annealing conditions of steel materials (oxygen partial pressure), as described above. More specifically, control can be performed by changing an oxygen partial pressure (dew point) in the annealing atmosphere of a steel material. In any steel species, when the oxygen partial pressure (dew point) is high, an amount of an oxide in which Mn and Si in an outer oxide layer on a steel material surface are concentrated becomes small. In addition, the interior of a steel is also oxidized, inner oxidation and grain boundary oxidation proceed, SiO2, Mn2SiO4 etc. are formed in the steel, and an area ratio of an oxide containing Mn and Si occupied in the steel is increased.

On the other hand, in any steel species of a high-strength steel, when the oxygen partial pressure (dew point) is low, an oxide such as Mn2SiO4 or SiO2 in which Mn and Si are concentrated in an outer oxide layer on a steel material surface is formed, but an amount thereof and an area ratio thereof are increased. On the other hand, oxidation in the interior of the steel proceeds with difficulty, an amount of $SiO_2$, $Mn_2SiO_4$ or the like to be formed in the steel is reduced, and an area ratio of an oxide containing Mn and Si occupied in the steel is reduced.

(Reaction Layer at Joint Interface of Joined Body of Dissimilar Metals)

In the joined body of dissimilar metals in which a steel material whose oxide layer on a surface is controlled and an aluminum material are joined by welding as described above, high joining strength is obtained by using the proper welding condition. However, even when the condition of the welding material side is adjusted, high joining strength cannot be realized in some cases, depending on the welding application condition (welding condition).

For this reason, it is necessary to define the condition for obtaining high joining strength, seen from the side of the joined body of dissimilar metals, and also to optimize the welding condition by controlling so as to be suitable for this condition of the side of the joined body of dissimilar metals. Therefore, in the present invention, preferably, the spot welding condition for obtaining high joining strength as a joined body of dissimilar metals is defined.

As described above, when seen from the side of the joined body of dissimilar metals, it is necessary to form a reaction layer of Fe and Al having a thickness which is requisite minimal for metallurgic joining at a joining part in a wide range as much as possible. That is, first, it is necessary to control an average thickness in a nugget depth direction of a reaction layer (plate thickness direction of steel material) at a joint interface with an aluminum material, as the thickness which is requisite minimal for metallurgic joining, in a range of 0.1 to 10 μm.

The welding joint interface between a steel material and an aluminum material has a laminated Al5Fe2-based compound layer on the steel material side, and a layer in which a particulate or needle-like Al3Fe-based compound and an Al19Fe4Si2Mn-based compound are present in admixture on the aluminum material side, respectively, as the reaction layer.

When the thickness in a nugget depth direction of each of these brittle reaction layers is more than 10 μm, the joining strength is remarkably reduced. On the other hand, when the thickness in a nugget depth direction of the reaction layer is less than 0.1 μm, metallurgic joining becomes insufficient, and sufficient joining strength is not obtained. Therefore, the average thickness of the reaction layer at the joint interface between a steel material whose oxide layer on a surface is controlled and an aluminum material is in a range of 0.1 to 10 μm.

(Formation Range of Reaction Layer)

Then, it is necessary that the reaction layer of Fe and Al in the joined body of dissimilar metals is formed at a joining part in a wide range as much as possible. That is, it is preferable that the formation range of the reaction layer after joining is an area of 70% or more of a joining area (substantially horizontal direction of steel material, direction orthogonal to nugget depth direction), in point welding such as spot welding and FSW (friction stirring joining).

When the reaction layer is not such that it is formed in the proper thickness range and, moreover, this proper thickness range is uniform in a wide range as much as possible, there is a possibility that metallurgic joining cannot be assuredly attained. To the contrary, when the reaction layer in the proper thickness range is formed by the aforementioned 70% or more, sufficient joining strength is assuredly obtained.

(Measurement of Reaction Layer at Joint Interface of Joined Body of Dissimilar Metals)

In measurement of the reaction layer in the present invention, a joining part between a steel material and an aluminum material is cut, a joint interface is observed from a cross section with SEM (scanning electron microscope), and the measurement of the reaction layer is performed, as in Examples described later.

(Chemical Component Composition of Steel Material)

First, a component composition of a steel material which is a subject of the present invention will be described below. In the present invention, a main subject is a high-strength steel material having a tensile strength of 450 MPa or more and containing Si, Mn etc. Further, a subject is a steel material in which an outer oxide layer containing a prescribed amount of Si, Mn etc. can be newly generated, when the existing oxide layer on a surface is once removed by pickle and, further, annealed in the atmosphere having a controlled oxygen partial pressure.

For this reason, regarding the component composition of a steel material, on the assumption that a prescribed amount of Si, Mn etc. are contained, the composition is such that C: 0.01 to 0.30%, Si: 0.1 to 3.00% and Mn: 0.1 to 3.00% are contained as expressed by mass %, respectively, and preferably, the reminder includes Fe and unavoidable impurities. In addition, the composition may be such that, in addition to this, Al: 0.002 to 0.1% is further contained, and the reminder includes Fe and unavoidable impurities. In addition, the composition may be such that, further, in addition to this Al, or in place of Al, one kind or two or more kinds of Nb: 0.005 to 0.10%, Ti: 0.005 to 0.10%, Zr: 0.005 to 0.10%, Cr: 0.05 to 3.00%, Mo: 0.01 to 3.00%, Cu: 0.01 to 3.00% and Ni: 0.01 to 3.00% are contained, and the reminder includes Fe and unavoidable impurities.

Herein, since P, S, N etc. as impurities of a steel material reduce various properties such as toughness, ductility or joining strength of a steel material, P is regulated at 0.10% or less (including 0%), S is regulated at 0.05% or less (including 0%), and N is regulated at 300 ppm or less (including 0%), respectively. In addition, a unit of a chemical component (content of each element) in the present invention is mass % in all cases including an aluminum alloy.

The reasons why respective component elements of a steel material are limited, are as follows.

C:

C is an element necessary for increasing strength, but when a content is less than 0.01%, the strength of a steel material cannot be secured and, when a content exceeds 0.30%, cold workability is reduced. Therefore, the content of C is in a range of 0.01 to 0.30%.

Si or Mn:

Si or Mn forms the outer oxide layer containing a prescribed amount of Si or Mn on a surface of a steel material. This outer oxide layer, in the case of dissimilar joint between Fe and Al, interferes with diffusion of Fe and Al from the mutual base material side, and can suppress formation of a brittle intermetallic compound to the minimum. In addition, those elements serve for improving brittleness of a reaction layer.

Further, Si or Mn forms the inner oxide layer containing a prescribed amount of Si or Mn in the interior of a steel material. This inner oxide layer forms a solid solution into an Al—Fe reaction layer formed by breaking an outer oxide layer on a steel material surface, and prevents diffusion of Fe and Al from a mutual base material side to suppress excess generation of a reaction layer.

Therefore, when a content of Si or Mn in a steel material is too small, the outer oxide layer or the inner oxide layer is deficient, and the joining strength of a joined body of dissimilar metals cannot be improved, as described later. On the other hand, when a content of Si or Mn in a steel material is too large, joining strength of a joined body of dissimilar metals is conversely reduced, as described later. For this reason, in order to form a proper outer oxide layer or inner oxide layer, it is necessary that Si or Mn in a steel material is in a range of the content defined in the present invention.

Si:

Si is also important as an element which can retain necessary strength without deteriorating ductility of a steel material and, for realizing this, a content of 0.1% or more is necessary. On the other hand, when Si is contained at more than 3.00%, ductility is deteriorated. Therefore, a Si content is in a range of 0.1 to 3.00%, also for this reason.

Mn:

Mn is also indispensable as an element for retaining the strength and toughness of a steel material and, when a content thereof is less than 0.1%, the effect thereof is not obtained. On the other hand, when a content thereof exceeds 3.00%, the strength is remarkably increased, and cold working becomes difficult. Therefore, a Mn content is in a range of 0.1 to 3.00%, also for this reason.

Al:

Al is an element which captures solid-dissolved oxygen as a deoxidizing element of a molten steel and, at the same time, prevents generation of a blowhole to improve toughness of a steel. When an Al content is less than 0.002%, the sufficient these effects cannot be obtained and, on the other hand, when a content thereof is more than 0.1%, this conversely deteriorates weldability, and deteriorates toughness of a steel by increase in an alumina-based inclusion. Therefore, the Al content is in a range of 0.002 to 1.0%.

One or two or more kinds of Nb, Ti, Zr, Cr, Mo, Cu, and Ni:

Inclusion of one or two or more kinds of Nb, Ti, Zr, Cr, Mo, Cu, and Ni, commonly, contribute to high strengthening and high toughening of a steel.

Among them, Ti, Nb and Zr are precipitated as a nitride carbide into a steel to enhance strength, and make a microtexture of a steel into fine to improve strength, toughness etc. However, when they are contained at a large amount, this considerably deteriorates toughness. Therefore, when they are contained, Nb is in a range of 0.005 to 0.10%, Ti is in a range of 0.005 to 0.10%, and Zr is in a range of 0.005 to 0.10%, respectively In addition, among them, Cr, Mo, Cu, and Ni improve hardenability of a steel, and improve strength of a steel. However, when they are contained at a large amount, this considerably deteriorates toughness of a steel. Therefore, when they are contained, Cr is in a range of 0.05 to 3.00%, Mo is in a range of 0.01 to 3.00%, Cu is in a range of 0.01 to 3.00%, and Ni is in a range of 0.01 to 3.00%.

(Strength of Steel Material)

In the present invention, a main subject is a high-strength steel material having a tensile strength of 450 MPa, from utility of an automobile part. In the case of a steel having strength lower than this, since there are generally many low-alloy steels, and an oxide film is approximately an iron oxide, diffusion of Fe and Al becomes easy, and a brittle reaction layer is easily formed. In addition, since an amount of Si or Mn is small, the oxide containing Si or Mn necessary for suppressing diffusion of Fe and Al of a base material in the present invention is formed with difficulty on a surface or in the interior of a steel, a composition or a thickness of an outer or inner oxide (layer) containing Si or Mn cannot be controlled, and it becomes difficult to control a reaction layer at welding. Further, since the strength of a steel material is deficient, deformation of a steel material becomes great by pressurization due to an electrode chip at spot welding, and an oxide film is easily destructed and, therefore, a reaction with aluminum is abnormally promoted, and a brittle intermetallic compound is easily formed.

(Aluminum Alloy Material)

An aluminum alloy material used in the present invention is an Al—Mg—Si-base 6000 series aluminum alloy in AA to JIS specification, containing Mg: 0.1 to 3.0%, Si: 0.1 to 2.5%, and Cu: 0.001 to 1.0% as expressed by mass %, respectively. A shape of this alloy material is not particularly limited depending on each part utility of an automobile vehicle body, and the plate material, the formed material, the forged material, and the cast material which are widely used are appropriately selected. In this respect, regarding strength of an aluminum material, the strength is desirably higher for suppressing deformation due to pressurization at spot welding, as in the case of the steel material.

Utility for the automobile vehicle body panel requires various properties such as excellent press moldability and BH property (bake hardening property), strength, weldability, corrosion resistance etc. In order to satisfy such requirements, it is preferable that a composition as a 6000 series aluminum alloy plate is an Al—Mg—Si-base aluminum alloy containing Mg: 0.1 to 1.0%, Si: 0.1 to 1.5%, and Cu: 0.001 to 1.0% as expressed by mass %, and the reminder including Al and unavoidable impurities. In addition, in order to make the BH property more excellent, an excessive Si-type 6000 series aluminum alloy plate having a mass ratio Si/Mg between Si and Mg of 1 or more is preferable.

In addition, an extruded material as a material for reinforcing the automobile vehicle body is required to have various properties such as excellent bending crushability and corrosion resistance. In order to satisfy such requirements, it is preferable that a composition of a 6000 series aluminum alloy extruded material is an Al—Mg—Si-base aluminum alloy containing Mg: 0.30 to 1.0%, Si: 0.30 to 0.95%, Fe: 0.01 to 0.40%, and Cu: 0.001 to 0.65% as expressed by mass %, respectively, and the reminder including Al and unavoidable impurities. Further, in addition to the aforementioned each preferable composition, one or two or more kinds of Cr: 0.001 to 0.2%, and Zr: 0.001 to 0.2% at a total amount of 0.30% or less, or one or two more kinds of Zn: 0.001 to 0.25%, and Ti: 0.001 to 0.10% may be selectively contained Herein, as an element having the function of reducing and destructing the outer oxide layer present on a steel material surface, one or two kinds of Li and Mn are contained in a range of Li: 0.01 to 0.5%, and Mn: 0.1 to 0.5% in a 6000 series aluminum alloy material, in advance, in addition to the aforementioned component composition, as described above.

Elements other than these elements are fundamentally impurities, and a content thereof is a content at each impurity level (acceptable amount) in line with AA to JIS specification. However, when not only high purity Al bullion, but also a 6000 series alloy, and other aluminum alloy scrap materials, and low purity Al bullion are used as melt raw materials at a large amount from a view point of recycle, there is a high possibility that impurity elements are mixed therein. Reduction of these impurity elements to below a detection limit itself leads to the cost up, and acceptance of inclusion to some extent becomes necessary. Therefore, other elements are admitted to be contained in a range of an acceptable amount in line with AA to JIS specification, respectively.

Meaningfulness of inclusion of each element in the 6000 series aluminum alloy is as follows:

Si: Si is an essential element for obtaining, for example, necessary strength of 180 MPa or more (proof strength), which strengthens formation of a solid solution, and forms with Mg an ageing precipitate contributing to improvement in strength, at the artificial ageing treatment at a low temperature such as coating-baking treatment to exert the ageing hardening ability. When a content thereof is deficient, such an effect is not obtained and, when a content thereof is too large, moldability such as press moldability or bending moldability is remarkably reduced and, further, weldability is greatly inhibited.

Mg: Mg is also an essential element for obtaining the necessary proof strength, as a panel, which strengthens formation of a solid solution, and forms with Si an ageing precipitate contributing to improvement in strength, at the artificial ageing treatment such as coating-baking treatment to exert the ageing hardening ability. When a content thereof is deficient, such an effect is not obtained and, when a content thereof is too large, moldability such as press moldability or bending moldability is remarkably reduced and, further, weldability is greatly inhibited.

Cu: Cu has an effect of promoting formation of an ageing precipitate contributing to improvement in strength into crystal grains of an aluminum alloy material texture, under the artificial ageing treatment at a relatively low temperature for a short time. In addition, solid-dissolved Cu also has an effect of improving moldability. When a content thereof is deficient, such an effect is not obtained and, when a content thereof is too large, corrosion resistance and weldability are remarkably deteriorated.

Fe: Fe serves the same function as Mn, Cr, Zn, etc., and generates dispersed particles (dispersion phase), and these dispersed particles have effects of preventing grain boundary movement after recrystallization, crystal grain coarsening, and at the same time, making the crystal grain into finer. When a content thereof is deficient, such effects are not obtained and, when a content thereof is too large, a coarse crystallized substance is easily generated, and breakage toughness and fatigue property are deteriorated.

Zn: Zn has effects of contributing to improvement of enhancement in formation of a solid solution and, additionally, remarkably promoting ageing hardening of a final product upon ageing treatment. When a content thereof is deficient, such effects are not obtained and, when a content thereof is too large, sensitivity to stress corrosion cracking or grain boundary corrosion is remarkably enhanced, and corrosion resistance and durability are reduced.

Ti: Ti has an effect of making a crystal grain of an ingot into fine and making an extruded material texture into a fine crystal grain. When a content thereof is deficient, such an effect is not obtained and, when a content thereof is too large, a coarse crystallized substance is formed, and this becomes a cause for reduction in required properties such as the bending crushability and the corrosion resistance as a reinforcing material, and bending workability of an extruded material.

Cr or Zr: A transition element such as Cr or Zr generates dispersed particles (dispersion phase) including an intermetallic compound such as Al—Cr-base compound or Al—Zr-base compound, and is effective for preventing a crystal grain from becoming coarse. When a content thereof is deficient, such an effect is not obtained and, when a content thereof is too large, a coarse crystallized substance is formed and, when a content is too large, requirement properties such as the bending crushability and the corrosion resistance as a reinforcing material, and a mechanical property are reduced. In addition, moldability such as bending workability is reduced.

(Thicknesses of Steel Material and Aluminum Alloy Material)

In addition, a thickness (plate thickness etc.) of a part to be welded of a steel material or an aluminum alloy material is not particularly limited, but is appropriately selected or determined from the design conditions such as necessary strength and necessary rigidity of an application member including an automobile member.

However, when an automobile member is assumed, practically, a thickness t (of a part to be welded) of a steel material is selected from 0.3 to 3.0 mm. When the thickness of a steel material is too small, strength and rigidity necessary as an automobile member cannot be ensured, being improper. Additionally, for example, in the case of spot welding, since deformation of a steel material is great, and an oxide film is easily destructed by pressurization with its electrode chip, a reaction with aluminum is promoted. As a result, it becomes easy to form a brittle intermetallic compound. On the other hand, when the thickness of a steel material is too great, spot welding joining itself becomes difficult.

In addition, similarly when an automobile member is assumed, a thickness t (of a part to be welded) of an aluminum alloy material, is selected from a range of 0.3 to 5.0 mm. When the thickness of an aluminum alloy material is too small, strength as an automobile member is deficient, and this is improper and, additionally, a nugget diameter is not obtained, and since melting reaches an aluminum material surface, and a dust is easily generated, there is a possibility that high joining strength is not obtained. On the other hand, when the thickness of an aluminum alloy material is too great, welding joining itself becomes difficult, like the case of the thickness of a steel material plate (Joining Method)

In addition, in the present invention, as a welding method, welding such that the steel material side does not melt, and only an aluminum material alloy material side melts is selected, as a premise. In this respect, the welding method is limited to spot welding, or friction spot joining (also referred to as friction stirring joining, FSW, or spot FSW). That is, MIG welding and laser welding in which both of the steel material side and the aluminum alloy material side melt are exempt, and welding procedures such as ultrasound joining, diffusion joining, friction pressure joining, and brazing in which both of the sides do not melt are exempt. In addition, due to easy adoption of productivity and suitable condition, joining by spot welding is more preferable than friction spot joining.

In addition, as the preferable conditions for every joining place of spot welding for realizing that the steel material side does not melt, and only the aluminum alloy material side melts, an interelectrode current of 10 to 35 kA is passed for 200×tmsec or shorter, in a relationship with a thickness t mm of an aluminum alloy material part to be joined, at an interelectrode pressure of 2.0 to 3.0 kN. Under the improper spot welding conditions such as a to d shown in Table 15 described later, which are out of the conditions, high joining strength of a joined body of dissimilar metals is not obtained.

Example 3

Dissimilar joint by spot welding was performed below, respectively, as Examples, and joined bodies of dissimilar metals were manufactured. The joining strength of each of these joined bodies of dissimilar metals was measured, and assessed.

Specifically, a steel plate obtained by smelting a steel material at each component composition shown in Table 12 and rolling to a thickness of 1.2 mm was once subjected to pickle to remove the existing surface oxidized layer, thereafter, an oxygen partial pressure (dew point) in the annealing atmosphere was variously changed under each condition of A, B, C, D and E shown in Table 14, provided that an annealing temperature and an annealing time were commonly fixed such that the annealing temperature was 880° C., and the annealing time was 200 sec, thereby, steel plates having different oxidization structures of a surface and a surface layer were manufactured. Herein, steel plates having respective component compositions shown in Table 12 are all high-strength steel plates which are subjects of the present invention, and tensile strengths of respective steel plates are all in a range of 780 to 1280 MPa, which is 450 MPa or more.

Respective oxidation structures such as an outer oxide layer composition and an inner oxide layer composition of these respective steel plates after annealing are also shown in Table 14, respectively. Among annealing condition shown in Table 14, C and D are preferable annealing condition under which respective oxidation structures such as an outer oxide layer composition and an inner oxide layer composition of a steel material, which are a joining subject of the present invention, are obtained. As shown in Table 14, under annealing condition of C and D, a ratio occupied by an oxide containing Mn and Si at a total amount of 1 at % or more in an outer oxide layer of a steel plate is such that an average ratio of a total length of this oxide, occupied in a length of 1 μm in a substantially horizontal direction of an interface between a steel body and an outer oxide layer is in a range of 50 to 80%.

In addition, annealing conditions C and D are such that, as an inner oxide 1 (present in a steel region at a depth from a steel body surface of a steel plate of 10 μm or less), a ratio occupied by an inner oxide containing Mn and Si at a total amount of 1 at % or more, including a grain boundary oxide, is in a range of 3% or more and less than 10%, as an average area ratio occupied in a field area of this steel region within 10 μm². Further, as an inner oxide 2 (present in a steel region at a depth from a steel body surface of a steel plate of more than 10 μm and 20 μm or less), a ratio occupied by an inner oxide containing Mn and Si at a total amount of 1 at % or more, including a grain boundary oxide, is 0.1% or less, as an average area ratio occupied in a field area of this steel region within 10 μm².

To the contrary, among the annealing conditions shown in Table 14, A and B are Comparative Example in which an oxygen partial pressure (dew point) is too low, for obtaining steel materials having respective oxidation structures which are a joining subject of the present invention. For this reason, as shown in Table 14, an average ratio of a total length of the oxide in an outer oxide layer of a steel plate after annealing exceeds 80%. On the other hand, the annealing condition E is Comparative Example in which an oxygen partial pressure (dew point) is too high, for obtaining steel materials having respective oxidation structures which are a joining subject of the present invention. For this reason, an average ratio of a total length of the oxide in an outer oxide layer of a steel plate after annealing becomes small, below 50%. On the other hand, inner oxidation, and a ratio occupied by a grain boundary oxide become too high, a reaction layer is locally grown, but a reaction layer is not uniformly grown, and a formation range becomes narrow.

Therefore, since it is clear that among the annealing conditions shown in Table 14, under annealing conditions of these A, B and E, steel materials having respective oxidation structures which are a joining subject of the present invention are not obtained, joined bodies of dissimilar metals by spot welding were not manufactured, regarding respective steel plates annealed under the annealing conditions of these A, B and E Each oxidation structure in a joining corresponding part of each steel plate was measured by the following measuring method.

(Outer Oxide Formation Range)

In an outer oxide, a cross section sample was manufactured with a focused ion beam processing apparatus (FIB: Focused Ion Beam Process, FB-2000A manufactured by Hitachi, Ltd.), a total amount of Mn and Si in an outer oxide layer in the vicinity of an interface was obtained by analyzing an interface between a steel body and an outer oxide layer in a substantially horizontal direction, in a cross section in a thickness direction of a steel plate by the EDX (Model: NORAN-VANTAGE), and a phase of oxides (a plurality of oxides) in the vicinity of an interface containing Mn and Si at a total amount of 1 at % or more was specified by distinguishing from other phases. Then, a cross section is observed with TEM (field emission type transmission electron microscope manufactured by JEOL Ltd.: JEM-2010F, acceleration voltage 200 kv) at a magnification of 100000, and a length in a substantially horizontal direction at the interface of this oxide phase containing Mn and Si at a total amount of 1 at % or more, in the same interface region as that of the EDX is obtained. A ratio of a total length of this oxide phase, occupying for a length of 1 μm in a substantially horizontal direction of an interface was obtained. This was performed in three fields, respectively, and the average value thereof of them was obtained.

(Inner Oxide Occupation Area Rate)

Regarding an inner oxide, setting an inner oxide in a steel region in which the depth from a steel body surface of a steel plate is a depth from a steel body surface of this steel material to 10 μm or less to be inner oxide 1, and an inner oxide in a steel region at a depth from a steel body surface of a steel plate to more than 10 μm and 20 μm or less to be inner oxide 2, the compositions thereof were analyzed. Composition analysis is performed as an average area ratio of an oxide containing Mn and Si at a total amount of 1 at % or more in these respective steel regions. First, the oxide containing Mn and Si at a total amount of 1 at % or more in these respective steel regions is specified by distinguishing from other phases, with the EDX. A cross section is observed with TEM (field emission type transmission electron microscope manufactured by JEOL Ltd.: JEM-2010F, acceleration voltage 200 kV) at a magnification of 30000, and each area ratio occupied in a field area (body iron area) per 10 pmt of the oxide phase containing Mn and Si at a total amount of 1 at % or more, in the same interface region as that of the EDX was obtained. Herein, an area occupied by a grain boundary oxide is added to the oxide containing Mn and Si at a total amount of 1 at % or more. This is performed in three fields, respectively, and the average thereof was obtained.

Each of these steel plates having different oxidation structures, and a 6000 series aluminum alloy plate having a plate thickness of 1 to 1.6 mm, at a composition of 1 to 3 shown in Table 13, were processed into a shape of a cross tensile test piece described in JIS A 3137, and laminated, and spot welding was performed under each condition of a, b, c, d, e and f shown in Table 15, thereby, dissimilar joint was performed. Herein, as assessed from peeling strengths shown in Table 16 described later, a to d shown in Table 15 are improper spot welding conditions, and e and f are proper spot welding conditions.

In addition, in spot welding shown in Table 16, spot welding per one point was performed, commonly, using a direct current resistance welding testing machine, at a pressurizing force, a welding current and a welding time shown in Table 4. In addition, commonly, a dome-type electrode including a Cu—Cr alloy was used, and a positive electrode was an aluminum material and a negative electrode was a steel material.

(Thickness and Formation Range of Interface Reaction Layer)

A thickness and a formation range of an interface reaction layer of each of the thus manufactured joined bodies of dissimilar metals were measured. The results thereof are shown in Table 16. In measurement of the thickness of an interface reaction layer, each spot welding part was cut at a center, the cut part was embedded in a resin to be polished, and subjected to SEM observation at an interval of 0.5 mm over the entire joining part. When the thickness of a reaction layer is 1 um or more, measurement was performed at the field of a magnification of 2000 and, when the thickness thereof was less than 1 μm, measurement was performed at the field of a magnification of 10000, and an average for every each spot welding part was obtained, and an average of 30 spot welding parts was defined as an average thickness of the interface reaction layer. In addition, regarding the formation range of an interface reaction layer, a ratio of a reaction layer formation area relative to the total spot area was obtained at each spot welding part, and an average of 30 spot welding parts was obtained.

(Amount of Elements at Joint Interface on Aluminum Alloy Material Side)

Similarly, a content of Fe (mass %: expressed as Fe concentration in Al at interface in Table 16) at a joint interface on the aluminum alloy material side of each of the manufactured joined bodies of dissimilar metals was measured. The results thereof are shown in Table 16.

For analysis, EPMA: X-ray microanalyzer manufactured by JEOL Ltd. (JXA-8800RL) was used, and measurement was performed at a constant acceleration voltage of 15 kV, and a constant irradiation current of 0.3 μA. A subject to be analyzed was a cross section obtained by cutting the each spot welding part at a center, and analysis was performed centering in a joint interface between an aluminum alloy material and a steel material, and up to the interior each 0.5 mm inner of the aluminum alloy material side and the steel material side. A content of Fe originally possessed by the aluminum alloy material on the inner side of the aluminum alloy material was subtracted therefrom, and the content of Fe (mass %: expressed as Fe concentration in Al at interface in Table 16) at joint interface on the aluminum alloy material side was measured.

A cross tensile test of each of these manufactured jointed bodies of dissimilar materials was performed to obtain a peeling strength. These results are also shown in Table 5. The peeling strength was o when the strength is 2.0 kN or more, or x when the strength was less than 2.0 kN, referring to a spot welding joining strength between A6022 aluminum materials=1.0 kN.

As apparent from Table 16, in respective Invention Examples 1 to 23 in which steel plates and 6000 series aluminum alloy plates having proper component compositions shown in Tables 12 and 13 were used, and treatment was performed under annealing conditions of C and D having a preferable oxygen partial pressure (dew point) shown in Table 14, an outer oxide layer and an inner oxide layer of a steel plate after annealing satisfy the condition of the present invention. In addition, in respective Invention Examples 1 to 23 in which steels satisfying these oxide conditions were used, and the welding condition was the proper spot welding condition of e and f, a content of Fe at a joint interface on the aluminum alloy material side at a joint interface of a joined body of dissimulate metals is 2.0 mass % or less. Further, a formation area (formation range) of the reaction layer of Fe and Al formed at a joint interface between a steel material and an aluminum alloy material is 70% or more of a spot welding joining area, and this thickness of the reaction layer is also proper. As a result, as apparent from Table 16, it is seen that, in respective Invention Examples 1 to 23, a joining strength (peeling strength) of joined bodies of dissimilar metals becomes high, being 2 kN or more.

In addition, in respective Comparative Examples 24 to 38 in which steel plates and 6000 series aluminum alloy plates having proper component compositions shown in Tables 12 and 13 were used, and treatment was performed under the annealing condition of C and D having a preferable oxygen partial pressure (dew point) shown in Table 14, naturally, an outer oxide layer and an inner oxide layer of steel plates after annealing are within the condition of the present invention. However, in Comparative Examples 23 to 31 in which the spot welding condition in Table 15 was improper condition of a to d, a content of Fe at a joint interface on the aluminum alloy material side, a formation area (formation ratio) of the reaction layer of Fe and Al formed at a joint interface between a steel material and an aluminum alloy material, or a thickness of this reaction layer is improper. As a result, as apparent from Table 16, it is seen that a thickness and a formation range of an interface reaction layer of joined bodies of dissimilar metals do not satisfy the condition of the present invention, and a joining strength of joined bodies of dissimilar metals is remarkably reduced.

In addition, in Comparative Examples 32 to 38, the welding condition is proper spot welding condition of e and f, and a content of Fe at a joint interface on the aluminum alloy material side, and a formation area (formation ratio) of the reaction layer of Fe and Al, or a thickness of this reaction layer are generally proper. However, since steel plate component compositions 18 to 25 shown in Table 12 are outside the range of the present invention, a joining strength of joined bodies of dissimilar metals is remarkably reduced, as apparent from Table 16.

In Comparative Example 32, C was too high, a supercooled texture was generated at a spot welding part, and a crack was generated. In Comparative Example 33, Si was too high, and an optimal reaction layer of Fe and Al could not be formed at a joint interface. In Comparative Example 34, Mn was too high, a supercooled texture was generated at a spot welding part, and a crack was generated. In Comparative Example 35, Al was too high, ductility of a steel material was reduced, the material was brittlely broken in a cross tensile test, and a peeling strength was low. In Comparative Example 36, N was too high, ductility of a steel material was reduced, the material was brittlely broken in a cross tensile test, and a peeling strength was low. In Comparative Example 37, Cr was too high, a supercooled texture was generated at a spot welding part, the material was brittlely broken, and a peeling strength was low. In Comparative Example 38, Nb was too high, ductility of a steel material was reduced, the material was brittlely broken in a cross tensile test, and a peeling strength was low.

Therefore, from these facts, critical meaningfulness of the oxide condition on the steel material side of the present invention is supported. In addition, meaningfulness of a thickness and a formation range of an interface reaction layer of joined bodies of dissimilar metals is seen. In addition, in order that a thickness and a formation range of the interface reaction layer of joined bodies of dissimilar metals satisfy the condition of the present invention, and a joining strength of joined bodies of dissimilar metals is enhanced, it is necessary to not only use steel plates satisfying the oxide condition, but also make the welding condition proper.

TABLE 12

Chemical component composition of steel material
(mass %, wherein N is ppm, reminder is Fe and unavoidable impurities)

| Section | No. | C | Si | Mn | P | S | Al | N | Cr | Mo | Cu | Ni | Nb | Ti | V | Zr |
|---|---|---|---|---|---|---|---|---|---|---|---|---|---|---|---|---|
| Invention | 1 | 0.06 | 0.23 | 0.55 | 0.01 | 0.01 | 0.04 | 21 | 0.06 | 0.02 | 0.00 | 0.00 | 0.05 | 0.07 | 0.00 | 0.00 |
| Examples | 2 | 0.13 | 1.00 | 1.45 | 0.00 | 0.00 | 0.03 | 31 | 0.07 | 0.02 | 0.00 | 0.00 | 0.09 | 0.10 | 0.00 | 0.00 |
|  | 3 | 0.08 | 1.69 | 1.23 | 0.00 | 0.00 | 0.03 | 35 | 0.20 | 0.10 | 0.00 | 0.00 | 0.00 | 0.00 | 0.00 | 0.00 |
|  | 4 | 0.28 | 1.45 | 1.60 | 0.02 | 0.01 | 0.02 | 95 | 0.00 | 0.00 | 0.00 | 0.00 | 0.00 | 0.00 | 0.00 | 0.00 |
|  | 5 | 0.10 | 1.30 | 2.01 | 0.03 | 0.01 | 1.88 | 77 | 0.80 | 0.00 | 0.00 | 0.00 | 0.00 | 0.00 | 0.00 | 0.00 |
|  | 6 | 0.14 | 1.50 | 1.38 | 0.02 | 0.01 | 0.01 | 91 | 0.40 | 0.50 | 0.00 | 0.00 | 0.00 | 0.00 | 0.00 | 0.00 |
|  | 7 | 0.10 | 2.66 | 2.05 | 0.03 | 0.01 | 0.01 | 119 | 0.00 | 0.80 | 0.02 | 0.10 | 0.00 | 0.00 | 0.00 | 0.00 |
|  | 8 | 0.08 | 2.62 | 1.81 | 0.04 | 0.01 | 0.00 | 184 | 2.20 | 0.00 | 0.00 | 0.00 | 0.00 | 0.00 | 0.00 | 0.00 |
|  | 9 | 0.14 | 2.63 | 1.30 | 0.07 | 0.01 | 0.00 | 92 | 0.00 | 2.40 | 0.00 | 0.00 | 0.00 | 0.00 | 0.00 | 0.00 |
|  | 10 | 0.17 | 2.71 | 1.26 | 0.05 | 0.01 | 0.01 | 197 | 0.00 | 0.00 | 0.00 | 2.80 | 0.00 | 0.00 | 0.00 | 0.00 |
|  | 11 | 0.17 | 1.65 | 1.25 | 0.08 | 0.01 | 0.00 | 71 | 0.20 | 0.00 | 0.00 | 0.11 | 0.05 | 0.00 | 0.00 | 0.00 |
|  | 12 | 0.24 | 1.57 | 2.00 | 0.08 | 0.01 | 0.01 | 165 | 0.00 | 0.12 | 0.03 | 0.00 | 0.00 | 0.04 | 0.00 | 0.00 |
|  | 13 | 0.21 | 1.96 | 1.68 | 0.08 | 0.01 | 0.00 | 138 | 1.25 | 0.05 | 0.00 | 0.00 | 0.00 | 0.00 | 0.07 | 0.00 |
|  | 14 | 0.11 | 1.43 | 1.60 | 0.05 | 0.01 | 0.01 | 126 | 0.00 | 0.00 | 0.04 | 0.22 | 0.00 | 0.00 | 0.00 | 0.01 |
|  | 15 | 0.22 | 1.96 | 1.67 | 0.08 | 0.01 | 0.01 | 136 | 0.00 | 0.00 | 0.00 | 0.00 | 0.42 | 0.00 | 0.00 | 0.00 |
|  | 16 | 0.26 | 2.66 | 1.92 | 0.07 | 0.01 | 0.00 | 118 | 0.00 | 0.00 | 0.00 | 0.00 | 0.00 | 0.45 | 0.00 | 0.00 |
|  | 17 | 0.11 | 2.35 | 2.06 | 0.03 | 0.01 | 0.00 | 84 | 0.00 | 0.00 | 0.00 | 0.00 | 0.00 | 0.00 | 0.80 | 0.00 |
|  | 18 | 0.16 | 2.46 | 1.37 | 0.02 | 0.01 | 0.00 | 110 | 0.00 | 0.00 | 0.00 | 0.00 | 0.00 | 0.00 | 0.00 | 0.47 |
| Comparative | 19 | 0.32 | 2.27 | 1.41 | 0.09 | 0.01 | 0.00 | 145 | 0.00 | 0.00 | 0.00 | 0.00 | 0.00 | 0.00 | 0.00 | 0.00 |
| Examples | 20 | 0.20 | 4.80 | 1.90 | 0.01 | 0.00 | 0.03 | 21 | 0.00 | 0.02 | 0.00 | 0.00 | 0.07 | 0.00 | 0.00 | 0.00 |
|  | 21 | 0.13 | 0.30 | 3.05 | 0.04 | 0.01 | 0.01 | 206 | 0.00 | 0.00 | 0.00 | 0.00 | 0.00 | 0.00 | 0.00 | 0.00 |
|  | 22 | 0.03 | 1.60 | 2.14 | 0.02 | 0.01 | 2.10 | 112 | 0.00 | 0.00 | 0.00 | 0.00 | 0.00 | 0.00 | 0.00 | 0.00 |
|  | 23 | 0.16 | 0.23 | 1.94 | 0.06 | 0.01 | 0.01 | 320 | 0.00 | 0.00 | 0.00 | 0.00 | 0.00 | 0.00 | 0.00 | 0.00 |
|  | 24 | 0.23 | 0.91 | 2.92 | 0.09 | 0.01 | 0.00 | 137 | 3.20 | 0.00 | 0.00 | 0.00 | 0.00 | 0.00 | 0.00 | 0.00 |
|  | 25 | 0.13 | 2.04 | 0.38 | 0.08 | 0.01 | 0.01 | 157 | 0.00 | 0.00 | 0.00 | 0.00 | 0.58 | 0.00 | 0.00 | 0.00 |

TABLE 13

Aluminum alloy material chemical component composition (mass %, reminder is Al and unavoidable impurities)

| Section | No. | Mg | Si | Cu | Fe | Li | Mn |
|---|---|---|---|---|---|---|---|
| Invention | 1 | 0.77 | 0.92 | 0.0 | 0.10 | 0 | 0.20 |
| Examples | 2 | 0.72 | 1.00 | 0.0 | 0.12 | 0.2 | 0.07 |
|  | 3 | 0.69 | 1.05 | 0.85 | 0.18 | 0 | 0.09 |

TABLE 14

| | Annealing condition | | | | Steel plate after annealing | | | |
| | | | | | Outer oxide layer | Inner oxide 1 | Inner oxide 2 | |
| Symbol | Atmospheric composition | Temperature (° C.) | Time (sec) | Dew point (° C.) | Length ratio (%) of oxide containing Mn and Si | Area ratio (%) of oxide containing Mn and Si | Area ratio (%) of oxide containing Mn and Si | Section |
|---|---|---|---|---|---|---|---|---|
| A | $N_2$: 97% $H_2$: 3% | 880 | 200 | −80 | 100 | Less than 1% | 0% | Comparative Example |
| B | | | | −60 | 90 | 1% or more and less than 3% | 0.01% | Comparative Example |
| C | | | | −40 | 72 | 3% or more and less than 5.0% | 0.05% | Invention Example |
| D | | | | −20 | 63 | 5% or more and less than 10% | 0.08% | Invention Example |
| E | | | | 0 | 47 | 10% or more | 5.30% | Comparative Example |

\* Inner oxide 1: oxide present in steel region at depth from body surface of steel plate to 10 μm \* Inner oxide 2: oxide present in steel region at depth from body surface of steel plate to more than 20 μm and 20 μm or less

TABLE 15

| Spot welding condition | Plate thickness (mm) of aluminum alloy plate | | | | | |
|---|---|---|---|---|---|---|
| | 1 | 1 | 1 | 1.6 | 1 | 1.6 |
| Pressurizing force (kN) | 1.5 | 1.5 | 3.5 | 3.5 | 3.0 | 3 |
| Current (kA) | 16 | 16 | 30 | 30 | 16 | 33 |
| Welding time (msec) | 40 | 400 | 40 | 400 | 40 | 60 |
| Electrode Positive electrode | Cu—Cr alloy/dome type Aluminum | | | | | |

TABLE 15-continued

| Spot welding condition | Plate thickness (mm) of aluminum alloy plate | | | | | |
|---|---|---|---|---|---|---|
| | 1 | 1 | 1 | 1.6 | 1 | 1.6 |
| Negative electrode | Steel | | | | | |
| Welding condition pattern | a | b | c | d | e | f |
| Properness of welding condition | x | x | x | x | ○ | ○ |

TABLE 16

| Section | No. | Dissimilar joint condition | | | | Joined body of dissimilar metals | | | | |
|---|---|---|---|---|---|---|---|---|---|---|
| | | Steel species | Aluminum species | Annealing condition | Welding condition | Reaction layer average thickness (μm) | Reaction layer formation ratio (%) | Fe concentration in Al at interface (%) | Peeling strength (kN) | Assessment |
| Invention Examples | 1 | 1 | 1 | C | e | 1.4 | 75 | 1.3 | 2.0 | ○ |
| | 2 | 1 | 1 | C | f | 2.7 | 82 | 1.5 | 2.1 | ○ |
| | 3 | 1 | 1 | D | e | 1.6 | 73 | 1.8 | 2.0 | ○ |
| | 4 | 1 | 1 | D | f | 2.2 | 80 | 1.4 | 2.3 | ○ |
| | 5 | 2 | 1 | C | f | 2.7 | 72 | 1.1 | 2.3 | ○ |
| | 6 | 3 | 1 | D | e | 2.1 | 71 | 1 | 2.1 | ○ |
| | 7 | 2 | 1 | C | e | 1.0 | 82 | 1.5 | 2.3 | ○ |
| | 8 | 3 | 1 | C | f | 2.9 | 73 | 1.0 | 2.5 | ○ |
| | 9 | 4 | 1 | C | e | 1.2 | 70 | 1.1 | 2.6 | ○ |
| | 10 | 5 | 1 | C | f | 2.7 | 88 | 1.6 | 2.4 | ○ |
| | 11 | 6 | 1 | C | e | 2.0 | 76 | 2.0 | 2.8 | ○ |
| | 12 | 7 | 2 | C | f | 2.2 | 77 | 1.4 | 2.1 | ○ |
| | 13 | 8 | 2 | C | e | 0.3 | 90 | 1.6 | 2.1 | ○ |
| | 14 | 9 | 2 | C | f | 2.0 | 82 | 1.2 | 2.5 | ○ |
| | 15 | 10 | 2 | C | e | 0.4 | 88 | 1.5 | 2.9 | ○ |
| | 16 | 11 | 2 | D | f | 1.5 | 75 | 1.8 | 2.2 | ○ |
| | 17 | 12 | 2 | D | e | 2.4 | 90 | 1.5 | 2.4 | ○ |
| | 18 | 13 | 2 | D | f | 0.9 | 85 | 1.0 | 2.7 | ○ |
| | 19 | 14 | 2 | D | e | 1.0 | 71 | 1.3 | 2.2 | ○ |
| | 20 | 15 | 2 | D | f | 1.2 | 77 | 1.1 | 2.4 | ○ |
| | 21 | 16 | 2 | D | e | 1.7 | 93 | 1.8 | 3.0 | ○ |
| | 22 | 17 | 2 | D | f | 0.8 | 82 | 1.7 | 3.0 | ○ |
| | 23 | 18 | 2 | D | e | 0.7 | 80 | 1.1 | 2.5 | ○ |
| Comparative Examples | 24 | 1 | 3 | C | a | 3.4 | 60 | 1.6 | 1.2 | x |
| | 25 | 1 | 3 | C | b | 13.5 | 68 | 3.3 | 0.2 | x |
| | 26 | 1 | 3 | D | a | 2.2 | 63 | 1.4 | 1.3 | x |
| | 27 | 1 | 3 | D | b | 12.6 | 53 | 4.5 | 0.7 | x |
| | 28 | 1 | 3 | C | c | 1.5 | 67 | 1.3 | 1.2 | x |
| | 29 | 1 | 3 | C | d | 11.1 | 50 | 3.5 | 0.7 | x |
| | 30 | 1 | 3 | D | c | 1.9 | 68 | 2.1 | 1.4 | x |
| | 31 | 1 | 3 | D | d | 3.7 | 54 | 1.87 | 0.9 | x |
| | 32 | 19 | 1 | C | e | 1.8 | 88 | 1.7 | 0.4 | x |
| | 33 | 20 | 1 | C | e | 1.7 | 49 | 2.2 | 0.8 | x |
| | 34 | 21 | 1 | C | e | 2.4 | 75 | 1.8 | 0.5 | x |
| | 35 | 22 | 1 | C | f | 2.8 | 77 | 1.9 | 0.7 | x |
| | 36 | 23 | 1 | C | f | 2.1 | 72 | 1.7 | 0.6 | x |
| | 37 | 24 | 1 | C | f | 2.2 | 75 | 1.9 | 0.8 | x |
| | 38 | 25 | 1 | C | f | 2.4 | 78 | 1.8 | 0.5 | x |

INDUSTRIAL APPLICABILITY

According to the present invention, a joined body of dissimilar metals in which a steel material and an aluminum alloy material are welding-joined, and a process for joining dissimilar metal materials can be proposed, in which there is little restriction of application condition of spot welding, general-use is excellent and, at the same time, a joining part having a high joining strength can be obtained without generating a brittle reaction layer (intermetallic compound layer) at a joining part to hamper reliance of joining. Such a joined body of dissimilar metals and process for joining dissimilar metal materials can be usefully applied as various structural members in transportation fields such as automobiles, rail vehicles etc., machine parts, constitutional structures etc., and a method of welding the same.

The invention claimed is:

1. A joined body of dissimilar metals, produced by joining a steel material and an aluminum alloy material, wherein the steel material comprises Fe and:
   C: 0.01 to 0.30 mass %;
   Si: 0.1 to 3.00 mass %;
   Mn: 0.1 to 3.00 mass %;
   P: 0 to 0.10 mass %;
   S: 0 to 0.05 mass %; and
   N: 0 to 300 ppm, and
   a ratio occupied by an outer oxide comprising Mn and Si at a total amount of 1 at % or more, which is present on the steel material surface, is 80 to 100% as an average ratio of a total length of the oxide occupied for a length of 1 μm in a substantially horizontal direction of an interface between a steel body and an outer oxide layer,
   wherein the aluminum alloy material is a 7000 series aluminum alloy comprising Al and 1.0 mass % or more of Mg, and
   wherein the joined body comprises a reaction layer comprising Fe and Al at a joint interface between the steel material and the aluminum alloy material, and a content of Fe at a joint interface on an aluminum alloy material side is 2.0% by mass or less.

2. The joined body of claim 1, joined by spot-welding, wherein, in every spot welding place, an average thickness in a nugget depth direction of the reaction layer is in a range of 0.1 to 3 μm, and a formation area of the reaction layer is 70% or more of a spot welding area.

3. The joined body of claim 1, having a peeling strength of 2 kN or more, measured by a cross tensile test piece.

4. The joined body of claim 1, in the form of a vehicle body structure of an automobile.

5. The joined body of claim 1, wherein the ratio occupied by the outer oxide comprising Mn and Si at a total amount of 1 at % or more is 90 to 100%.

6. The joined body of claim 1, wherein the 7000 series aluminum alloy material further comprises:
   Zn: 4.5 to 6.5 mass %; and
   Fe: 0.01 to 0.40 mass %,
   wherein a content of the Mg in the aluminum alloy is in a range from 1.0 to 2.0 mass %.

7. The joined body of claim 6, wherein the 7000 series aluminum alloy material further comprises at least one selected from the group consisting of:
   Mn: 0.01 to 0.6 mass %;
   Cr: 0.01 to 0.2 mass %;
   Zr: 0.01 to 0.25 mass %; and
   Ti: 0.001 to 0.10 mass %.

8. The joined body of claim 7, wherein a total content of the Mn, Cr, Zr, and Ti contained in the 7000 series aluminum alloy material is 0.30 mass % or less.

9. The joined body of claim 6, wherein the 7000 series aluminum alloy material further comprises:
   Cu: 0.01 to 0.2 mass %.

10. The joined body of claim 6, wherein the ratio occupied by the outer oxide comprising Mn and Si at a total amount of 1 at % or more is 90 to 100%.

11. The joined body of claim 6, having a peeling strength of 2 kN or more, measured by a cross tensile test piece.

12. A process for joining dissimilar metal materials, the process comprising:
   spot-welding or spot friction stir-welding a steel material and an aluminum alloy material,
   wherein the steel material comprises Fe and:
      C: 0.01 to 0.30 mass %;
      Si: 0.1 to 3.00 mass %;
      Mn: 0.1 to 3.00 mass %;
      P: 0 to 0.10 mass %;
      S: 0 to 0.05 mass %; and
      N: 0 to 300 ppm, and
      a ratio occupied by an outer oxide comprising Mn and Si at a total amount of 1 at % or more, which is present on the steel material surface, is 80 to 100% as an average ratio of a total length of the oxide occupied for a length of 1 μm in a substantially horizontal direction of an interface between a steel body and an outer oxide layer, and
   wherein the aluminum alloy material is a 7000 series aluminum alloy comprising Al and 1.0 mass % or more of Mg.

13. The process of claim 12, wherein the spot welding comprises applying an interelectrode current of 10 to 35 kA at an interelectrode pressure of 2.0 to 3.0 kN for a time of 200×tmsec or shorter at every spot welding place, wherein t is a thickness, in mm, of an aluminum alloy material part to be welded.

* * * * *